United States Patent
Ma et al.

(10) Patent No.: US 10,508,237 B2
(45) Date of Patent: *Dec. 17, 2019

(54) LIQUID CRYSTAL COMPOSITION AND LIQUID CRYSTAL DISPLAY DEVICE THEREOF

(71) Applicant: JIANGSU HECHENG DISPLAY TECHNOLOGY CO., LTD., Jiangsu (CN)

(72) Inventors: Wenyang Ma, Jiangsu (CN); Wenming Han, Jiangsu (CN); Haibin Xu, Jiangsu (CN); Wenquan Ding, Jiangsu (CN); Pengfei Li, Jiangsu (CN); Yunyun Liu, Jiangsu (CN); Di He, Jiangsu (CN); Lifang Yao, Jiangsu (CN); Heming Zhang, Jiangsu (CN)

(73) Assignee: JIANGSU HECHENG DISPLAY TECHNOLOGY CO., LTD., Jiangsu (CN)

(*) Notice: Subject to any disclaimer, the term of this patent is extended or adjusted under 35 U.S.C. 154(b) by 83 days.

This patent is subject to a terminal disclaimer.

(21) Appl. No.: 15/567,973

(22) PCT Filed: Apr. 21, 2016

(86) PCT No.: PCT/CN2016/079945
§ 371 (c)(1),
(2) Date: Oct. 20, 2017

(87) PCT Pub. No.: WO2016/169501
PCT Pub. Date: Oct. 27, 2016

(65) Prior Publication Data
US 2018/0119011 A1 May 3, 2018

(30) Foreign Application Priority Data
Apr. 23, 2015 (CN) .......................... 2015 1 0196731

(51) Int. Cl.
*G02F 1/1333* (2006.01)
*C09K 19/34* (2006.01)
(Continued)

(52) U.S. Cl.
CPC ...... *C09K 19/3402* (2013.01); *C09K 19/3003* (2013.01); *C09K 19/3066* (2013.01);
(Continued)

(58) Field of Classification Search
USPC ...................................................... 252/99.61
See application file for complete search history.

(56) References Cited

U.S. PATENT DOCUMENTS

| | | | |
|---|---|---|---|
| 2018/0037818 A1* | 2/2018 | Dai | C09K 19/12 |
| 2018/0105747 A1* | 4/2018 | Liu | C09K 19/12 |
| 2018/0142154 A1* | 5/2018 | Han | C09K 19/44 |

FOREIGN PATENT DOCUMENTS

| | | |
|---|---|---|
| CN | 102712844 | 10/2012 |
| CN | 102858918 | 1/2013 |

(Continued)

OTHER PUBLICATIONS

"International Search Report (Form PCT/ISA/210)", dated Jun. 7, 2016, with English translation thereof, pp. 1-4.

*Primary Examiner* — Geraldina Visconti
(74) *Attorney, Agent, or Firm* — JCIPRNET

(57) ABSTRACT

Provided is a liquid crystal composition, comprising: 1-30% of one or more compounds of general formula I; 1-50% of one or more compounds of general formula II; 1-20% of one or more compounds of general formula III; 20-70% of one or more compounds of general formula IV; and 1-30% of one or more compounds of general formula V. The liquid crystal composition has properties such as a large maximum absolute transmittance, a high voltage holding ratio, better anti-UV properties, and high temperature reliability, and has a suitable optical anisotropy, a suitable dielectric anisotropy, and a relatively high clearing point, and is environmentally friendly. The liquid crystal composition is suitable for use in a liquid crystal display device, especially a transmissive liquid crystal display element, enabling the liquid crystal display device to have properties such as a high maximum absolute transmittance, a high voltage holding ratio, good anti-UV properties and high temperature reliability, and to be energy-saving and environmentally-friendly.

20 Claims, No Drawings

(51) Int. Cl.
*C09K 19/30* (2006.01)
*C09K 19/32* (2006.01)
*C09K 19/04* (2006.01)

(52) U.S. Cl.
CPC ...... *C09K 19/32* (2013.01); *C09K 2019/0466* (2013.01); *C09K 2019/301* (2013.01); *C09K 2019/3004* (2013.01); *C09K 2019/3016* (2013.01); *C09K 2019/3422* (2013.01)

(56) References Cited

FOREIGN PATENT DOCUMENTS

| | | |
|---|---|---|
| CN | 104371740 | 2/2015 |
| CN | 104419427 | 3/2015 |
| CN | 105505402 | 4/2016 |

* cited by examiner

LIQUID CRYSTAL COMPOSITION AND LIQUID CRYSTAL DISPLAY DEVICE THEREOF

CROSS-REFERENCE TO RELATED APPLICATION

This application is a 371 application of the international PCT application serial no. PCT/CN2016/079945, filed on Apr. 21, 2016, which claims the priority benefit of China application no. 201510196731.2, filed on Apr. 23, 2015. The entirety of each of the abovementioned patent applications is hereby incorporated by reference herein and made a part of this specification.

BACKGROUND OF THE INVENTION

Field of the Invention

The present invention relates to a liquid crystal composition having a high voltage holding ratio, better anti-UV properties and high temperature reliability, and a large maximum absolute transmittance, and a liquid crystal display device containing the liquid crystal composition, especially a transmissive liquid crystal display device.

Description of Related Art

Liquid crystal display (LCD) devices are used in many fields of information display, including a direct-view display and a projection type display.

According to the type of a light source, LCD devices are divided into a reflection type using natural light, a transmission type using backlight, and a semi-transmission type using natural light and back light.

According to the type of a display mode, LCD devices are divided into PC (phase change), TN (twist nematic), STN (super twisted nematic), ECB (electrically controlled birefringence), OCB (optically compensated bend), IPS (in-plane switching), VA (vertical alignment), and other types. An element operating in a TN or STN mode uses a positive dielectric anisotropic liquid crystal, an element operating in an ECB or VA mode uses a negative dielectric anisotropic liquid crystal, and an element operating in an IPS mode uses a positive or negative dielectric anisotropic liquid crystal.

With technological advances, increasing demands have been placed upon the performance of display devices, such as nearly perfect display effect, large dielectric constant, low power consumption, high contrast, short response time, and long lifetime etc., which also requires continuous improvement in performance parameters of liquid crystal materials.

A liquid crystal composition having a large absolute value of dielectric anisotropy can reduce a base voltage value of an LCD device, reduce a drive voltage, and thus reduce electric power consumption.

A liquid crystal composition having low viscosity can increase the response speed of an LCD device. When the response speed is fast, the LCD device is suitable for animation display. Additionally, when the liquid crystal composition is injected into a liquid crystal cell of the LCD device, the injection time can be reduced, thus improving operability.

A transmissive liquid crystal display device adjusts the transmitance of backlight through liquid crystal molecules to achieve the display effect, and a large optical transmitance is a sought-after characteristic of an LCD device. A greater brightness and a higher contrast can be obtained by increasing the maximum optical transmitance. In an environment of strong light (such as sunlight), a liquid crystal screen will whiten, and the content in the liquid crystal screen cannot be clearly seen. In this case, by increasing the brightness of the screen, the displayed content can be more clearly exhibited.

In addition, the UV stability and thermal stability of a liquid crystal composition are associated with the lifetime of an LCD device. Increasing the UV stability and thermal stability of a liquid crystal composition can prolong the lifetime of an LCD device.

Thus, those skilled in the art have strived to increase the maximum optical transmitance, UV stability and thermal stability through optimization of a liquid crystal material.

Liquid crystal compositions having low power consumption and short response time have been disclosed in the prior art, as in CN102858918A. However, the compositions in the prior art suffer from problems such as being environmentally unfriendly (e.g., use of a chlorine-containing compound), short service life (e.g., poor UV or thermal stability), and low contrast (e.g., whiting of a display screen in sunlight), and cannot achieve a good compromise between a suitable optical anisotropy, a suitable dielectric anisotropy, a high voltage holding ratio, UV stability and high temperature stability required by LCD TVs and tablet PCs and the like.

From the perspective of preparation of a liquid crystal material, the properties of the liquid crystal material affect each other and improvement of a performance indicator may result in changes in other performance indicators. Therefore, preparing a liquid crystal material having all suitable properties often requires creative efforts.

A liquid crystal material is an important component of an LCD, and there is currently a large market demand for LCDs worldwide, where they are mostly used in electronic and electrical products, which have a short life cycle. The short life cycle naturally causes wastes and contamination, and in the case where environmental protection is receiving much attention today, if sources can be controlled, that is, environmentally friendly raw materials are selected in formulating a liquid crystal material, the environmental cost caused by disposal of waste LCDs can be greatly reduced. Therefore, preparing an economic and environmentally friendly liquid crystal material having all suitable properties often requires creative efforts.

The present invention utilizes a saturated alkyl neutral monomer to increase the reliability of liquid crystal, achieving a high voltage holding ratio, better UV stability, and a higher maximum absolute transmittance. In addition, the present invention uses no chlorine containing monomers to achieve the technical effect of being environmentally friendly, and increases the contents of neutral and neutral and polar monomers to remedy the problem of reduced dielectric constant and clearing point.

An object of the present invention is to provide a liquid crystal composition which has properties such as a large maximum absolute transmittance, a high voltage holding ratio, better anti-UV properties, and high temperature reliability, and has a suitable optical anisotropy, a suitable dielectric anisotropy, and a relatively high clearing point, and is environmentally friendly. Another object of the present invention is to provide a liquid crystal display device, especially a transmissive liquid crystal display device, which has a large maximum absolute transmittance, a high voltage holding ratio, good anti-UV properties, and high temperature reliability and is environmentally friendly.

SUMMARY OF THE INVENTION

An object of the present invention is to provide a liquid crystal composition which has properties such as a large maximum absolute transmittance, a high voltage holding ratio, better anti-UV properties, and high temperature reliability, and has a suitable optical anisotropy, a suitable dielectric anisotropy, and a relatively high clearing point, and is environmentally friendly.

Another object of the present invention is to provide a liquid crystal display device, especially a transmissive liquid crystal display device, comprising a liquid crystal composition which has properties such as a large maximum absolute transmittance, a high voltage holding ratio, better anti-UV properties, and high temperature reliability, and has a suitable optical anisotropy, a suitable dielectric anisotropy, and a relatively high clearing point, and is environmentally friendly, enabling the liquid crystal display device to have properties such as a high maximum absolute transmittance, a high voltage holding ratio, good anti-UV properties and high temperature reliability, and to be energy-saving and environmentally-friendly.

To achieve the above objects of the present invention, the present invention provides a liquid crystal composition, comprising: 1-30% of one or more compounds of general formula I based on the total weight of the liquid crystal composition

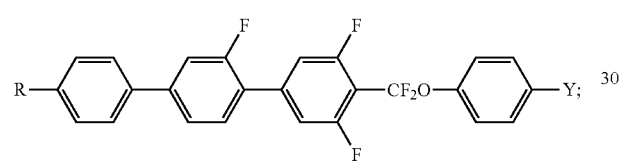

I 1-50% of one or more compounds of general formula II based on the total weight of the liquid crystal composition

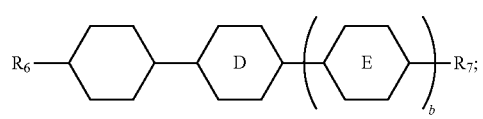

II 1-20% of one or more compounds of general formula III based on the total weight of the liquid crystal composition

III 20-70% of one or more compounds of general formula IV based on the total weight of the liquid crystal composition

IV and
1-30% of one or more compounds of general formula V based on the total weight of the liquid crystal composition

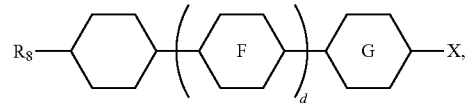

V wherein,

R and $R_8$ are the same or different and each independently represent an alkyl group having 1 to 7 carbon atoms;

$R_3$ represents H or an alkyl group having 1 to 7 carbon atoms;

$R_4$ and $R_5$ are the same or different and each independently represent an alkyl group having 1 to 7 carbon atoms or an alkoxy group having 1 to 7 carbon atoms;

$R_6$ and $R_7$ are the same or different and each independently represent an alkyl group having 1 to 7 carbon atoms, an alkoxy group having 1 to 7 carbon atoms, or an alkenyl group having 2 to 7 carbon atoms;

the ring

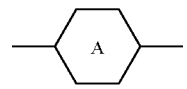

represents

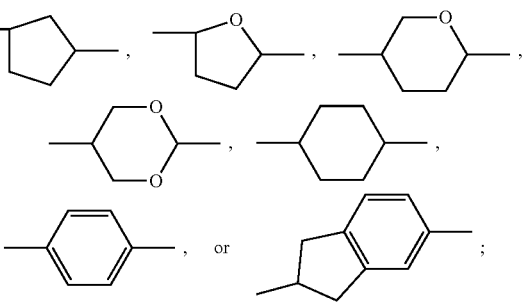

the ring

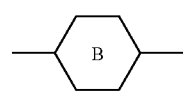

represents

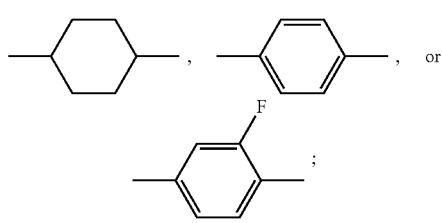

the ring  represents

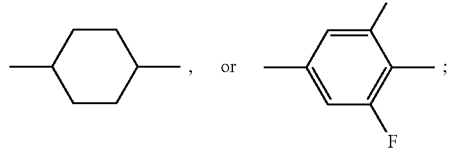

the ring  represents

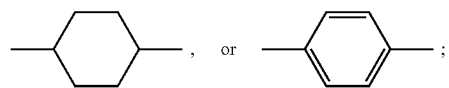

the ring 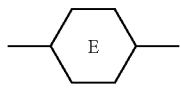 represents 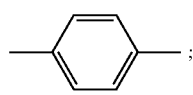

the ring 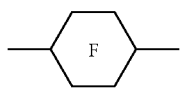 represents

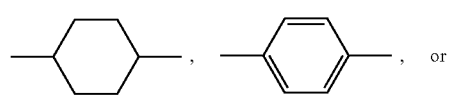

-continued

the ring  represents

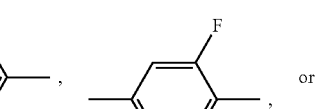

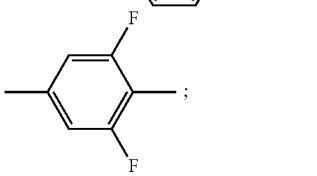

Y represents —CF$_3$ or —OCF$_3$;
X represents —F, —OCF$_3$, or —OCF$_2$—CF=CF$_2$;
b and c are the same or different and each independently represent 0 or 1;
a and d are the same or different and each independently represent 0, 1 or 2;
when X is —OCF$_3$, the ring 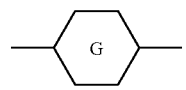 represents

;

when a is 2, the number of the ring

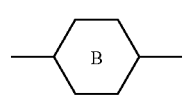

in the compound of general formula II is greater than one, and the rings

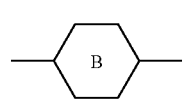

may be the same or different and each independently represent

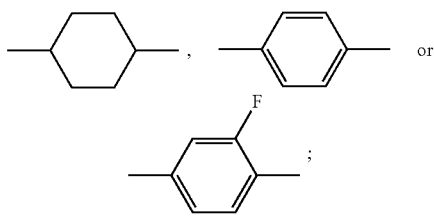

when d is 2, the number of the ring

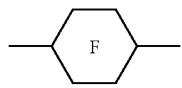

in the compound of general formula V is greater than one, and the rings

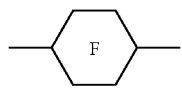

may be the same or different and each independently represent

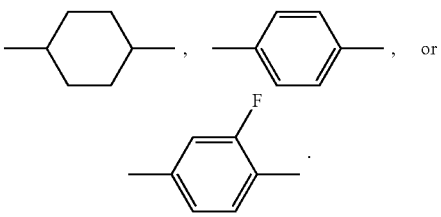

In embodiments of the present invention, the compound of general formula I is selected from the group consisting of the following compounds:

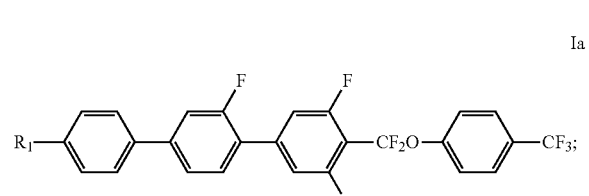

Ia

Ib

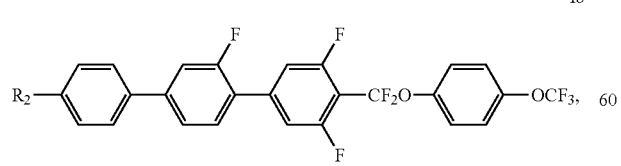

wherein, $R_1$ and $R_2$ are the same or different and each independently represent an alkyl group having 1 to 7 carbon atoms.

In embodiments of the present invention, the compound of general formula Ia comprises 1-30% of the total weight of the liquid crystal composition.

In embodiments of the present invention, preferably, the compound of general formula Ia comprises 1-25% of the total weight of the liquid crystal composition.

In embodiments of the present invention, more preferably, the compound of general formula Ia comprises 2-22% of the total weight of the liquid crystal composition.

In embodiments of the present invention, the compound of general formula Ib comprises 1-30% of the total weight of the liquid crystal composition.

In embodiments of the present invention, preferably, the compound of general formula Ib comprises 1-25% of the total weight of the liquid crystal composition.

In embodiments of the present invention, more preferably, the compound of general formula Ib comprises 2-22% of the total weight of the liquid crystal composition.

In embodiments of the present invention, preferably, the compound of general formula Ia is selected from the group consisting of the following compounds:

Ia-1

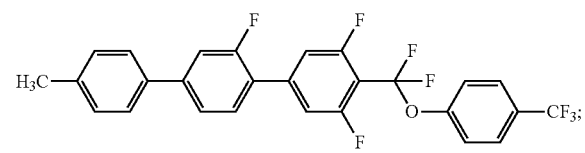

Ia-2

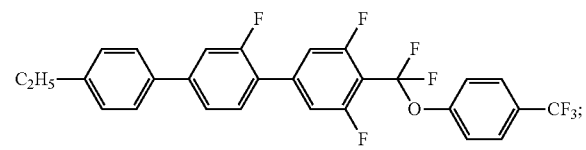

Ia-3

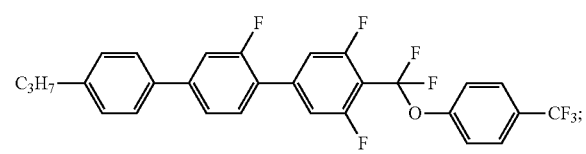

Ia-4

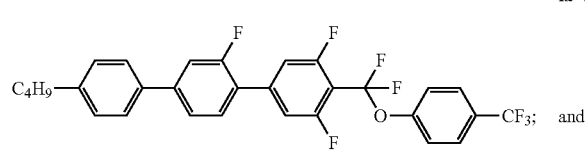

and

Ia-5

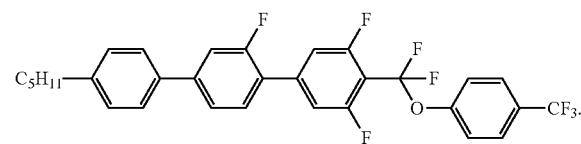

In embodiments of the present invention, preferably, the compound of general formula Ib is selected from the group consisting of the following compounds:

Ib-1
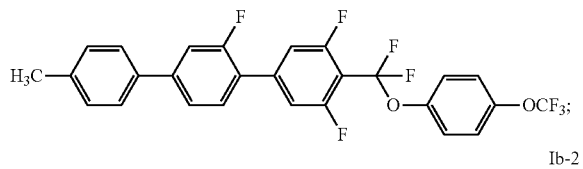
Ib-2
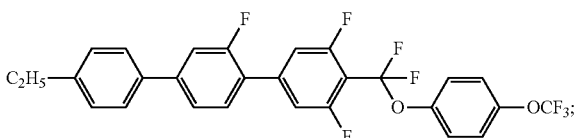
Ib-3
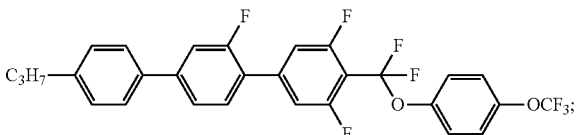
Ib-4
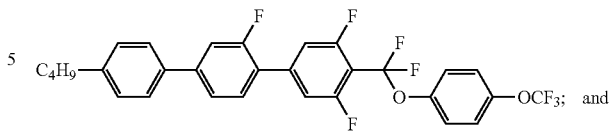
and
Ib-5
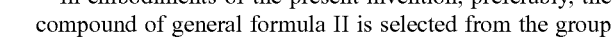
In embodiments of the present invention, preferably, the compound of general formula II is selected from the group consisting of the following compounds:
II-1
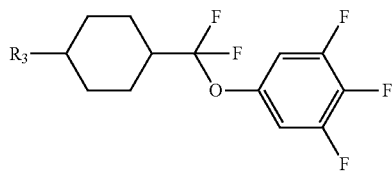
II-2
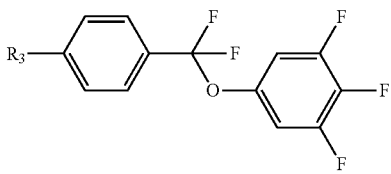
II-3
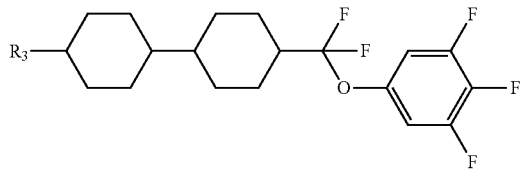
II-4
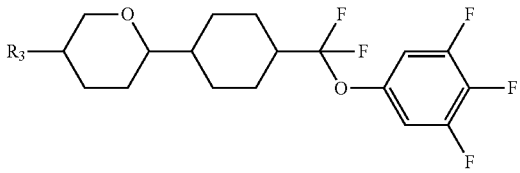
II-5
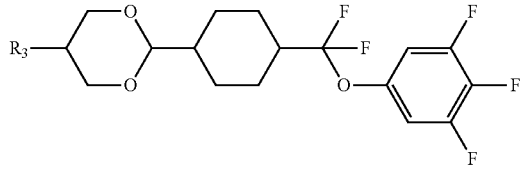
II-6
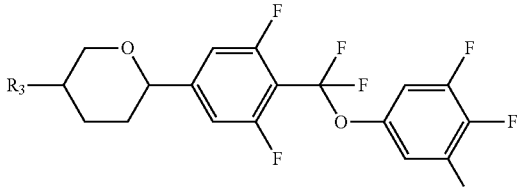
II-7
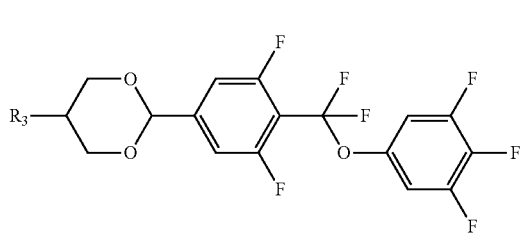
II-8
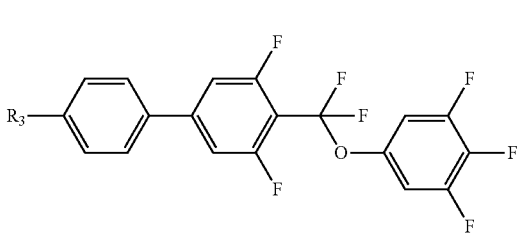
II-9
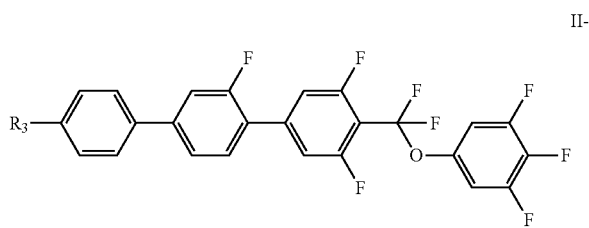
II-10
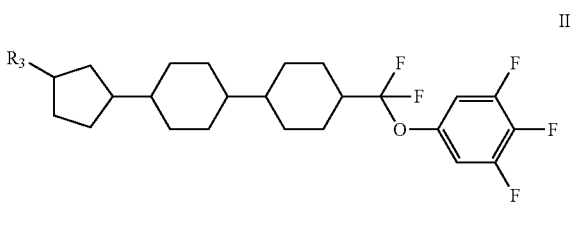

-continued

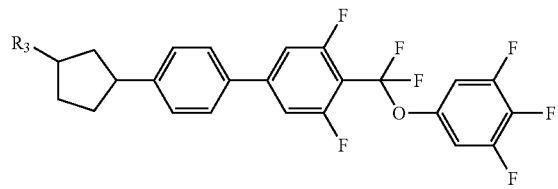
II-11

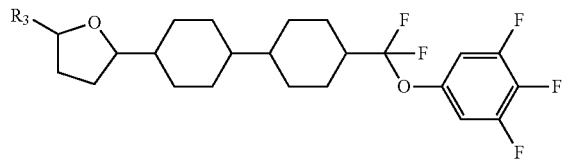
II-12

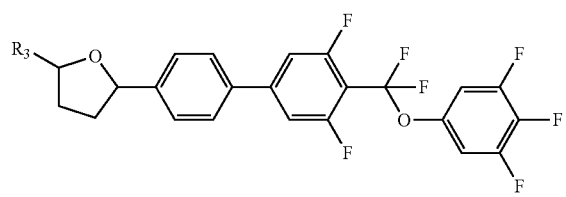
II-13

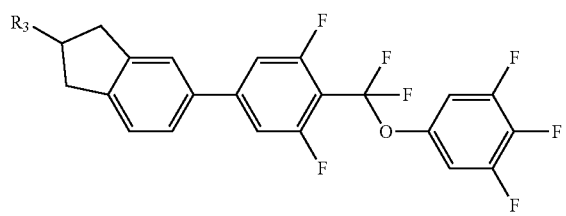
II-14

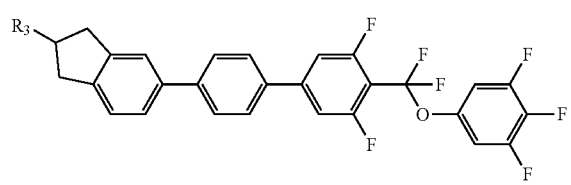
II-15

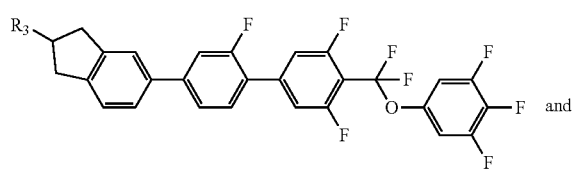
II-16 and

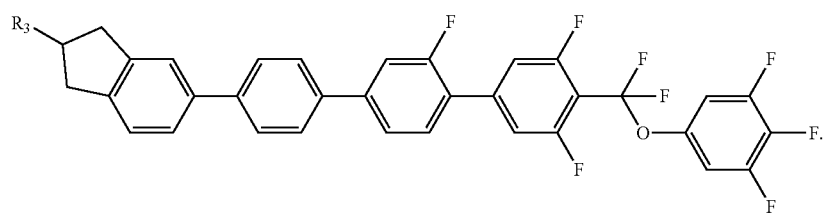
II-17 wherein,
$R_3$ represents H or an alkyl group having 1 to 7 carbon atoms.

In embodiments of the present invention, more preferably, the compound of general formula II-1 is selected from the group consisting of the following compounds:

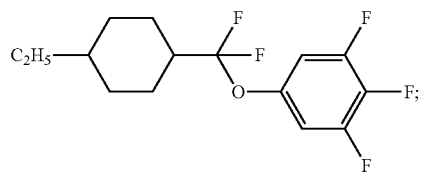
II-1-1

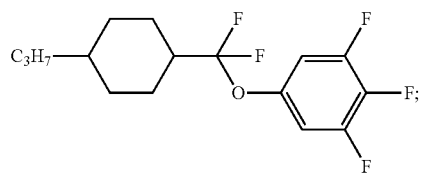
II-1-2

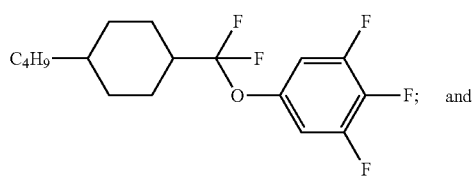
II-1-3 and

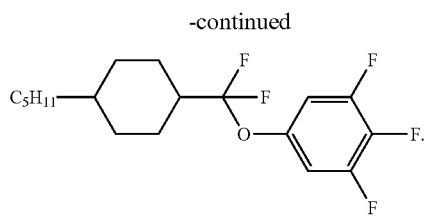
II-1-4

In embodiments of the present invention, more preferably, the compound of general formula II-2 is selected from the group consisting of the following compounds:

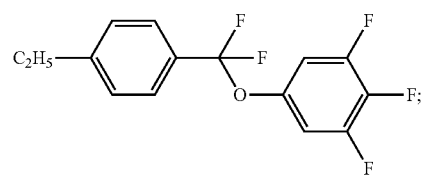
II-2-1

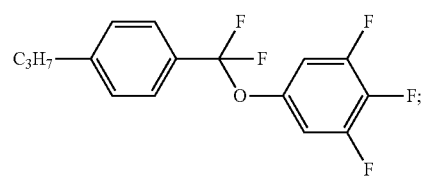
II-2-2

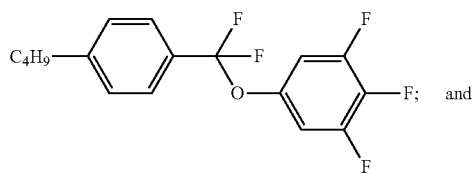
II-2-3

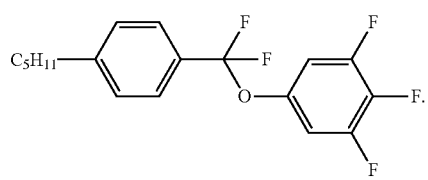
II-2-4

In embodiments of the present invention, more preferably, the compound of general formula II-3 is selected from the group consisting of the following compounds:

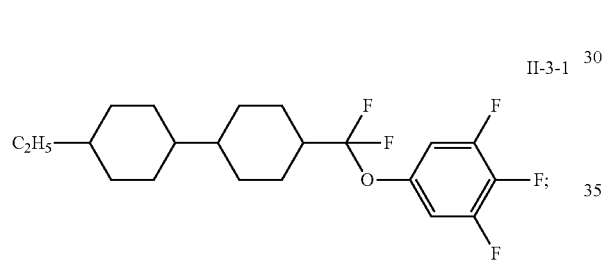
II-3-1

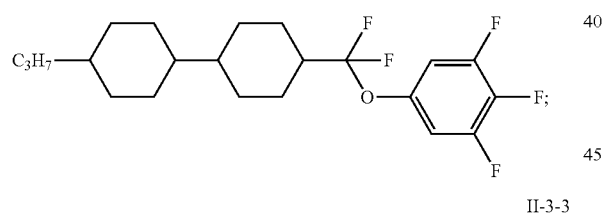
II-3-2

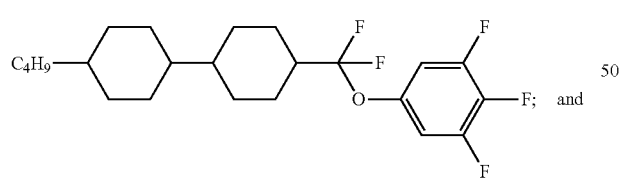
II-3-3

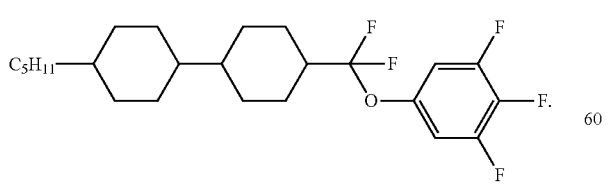
II-3-4

In embodiments of the present invention, more preferably, the compound of general formula II-4 is selected from the group consisting of the following compounds:

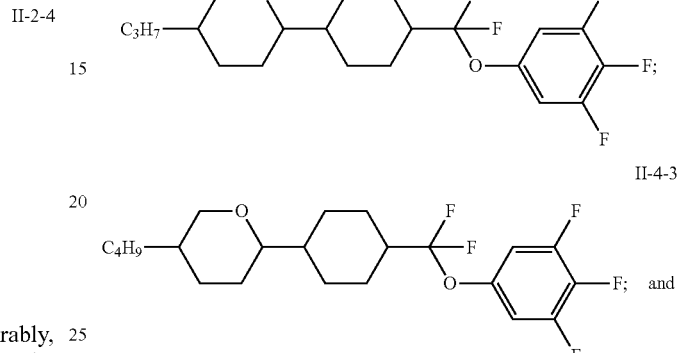
II-4-1

II-4-2

II-4-3

II-4-4

In embodiments of the present invention, more preferably, the compound of general formula II-5 is selected from the group consisting of the following compounds:

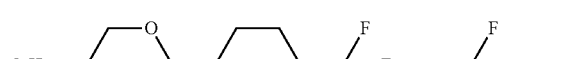
II-5-1

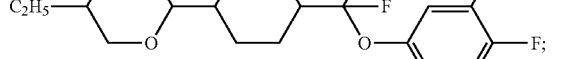
II-5-2

II-5-3

-continued

II-5-4
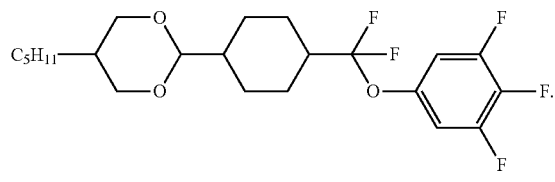

In embodiments of the present invention, more preferably, the compound of general formula II-6 is selected from the group consisting of the following compounds:

II-6-1
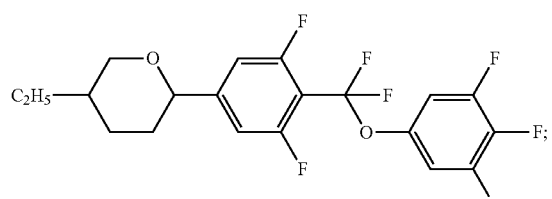

II-6-2

II-6-3

II-6-4
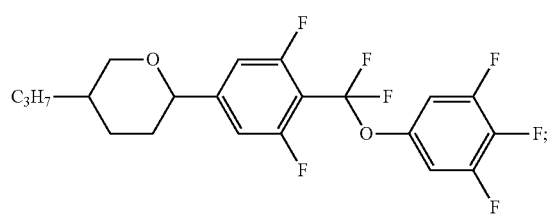

In embodiments of the present invention, more preferably, the compound of general formula II-7 is selected from the group consisting of the following compounds:

II-7-1
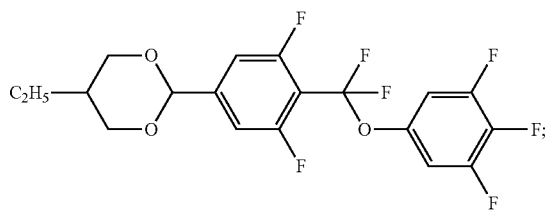

II-7-2

II-7-3

II-7-4
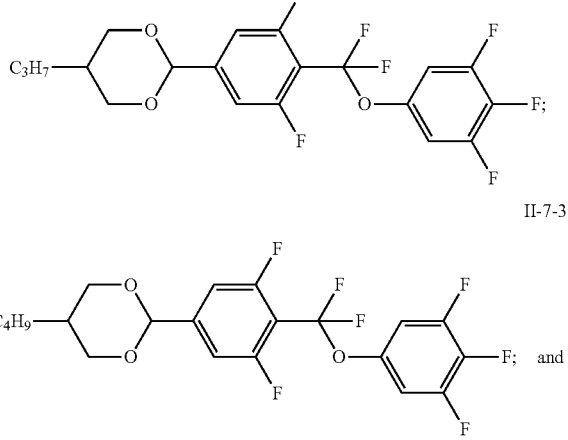

In embodiments of the present invention, more preferably, the compound of general formula II-8 is selected from the group consisting of the following compounds:

II-8-1
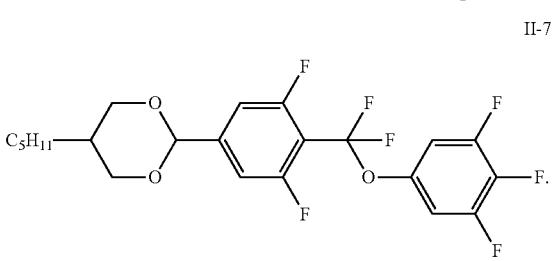

II-8-2

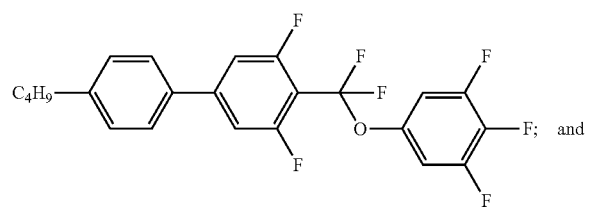

II-8-3

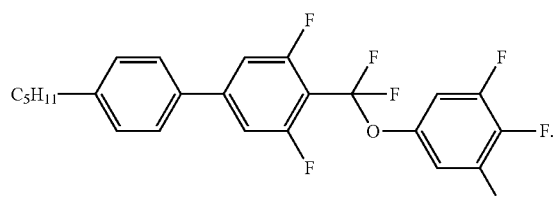

II-8-4

In embodiments of the present invention, more preferably, the compound of general formula II-9 is selected from the group consisting of the following compounds:

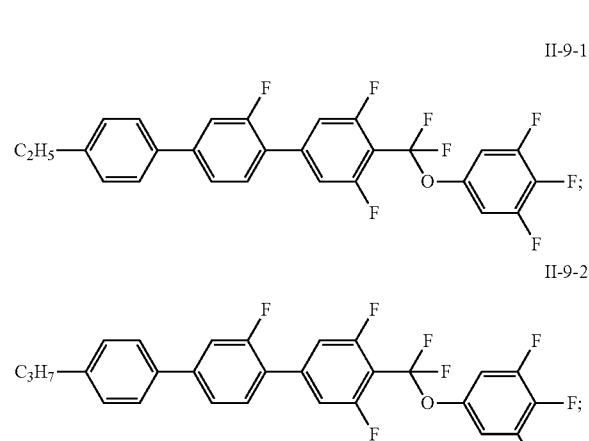

II-9-1

II-9-2

II-9-3

II-9-4

In embodiments of the present invention, more preferably, the compound of general formula II-10 is selected from the group consisting of the following compounds:

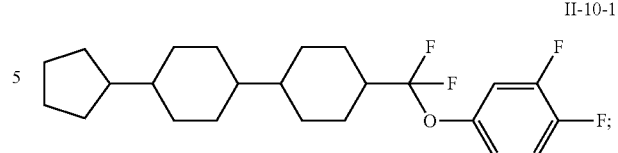

II-10-1

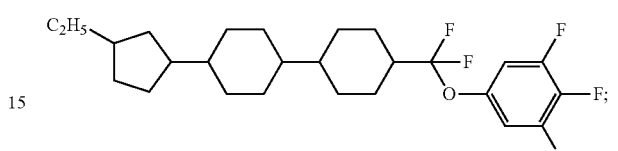

II-10-2

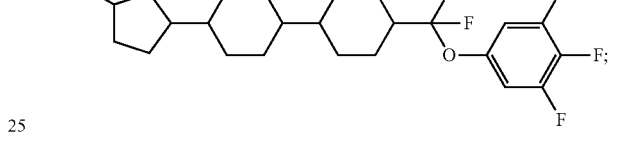

II-10-3

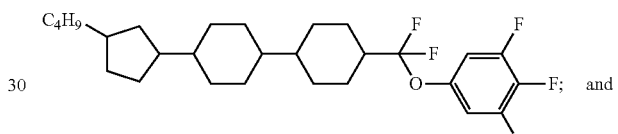

II-10-4

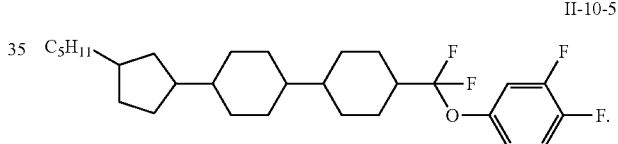

II-10-5

In embodiments of the present invention, more preferably, the compound of general formula II-11 is selected from the group consisting of the following compounds:

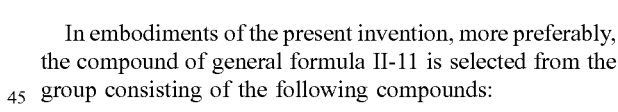

II-11-1

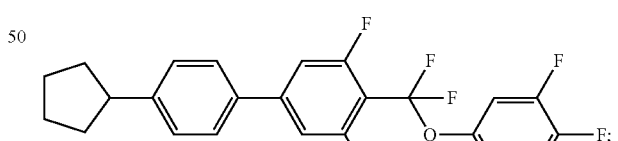

II-11-2

II-11-3

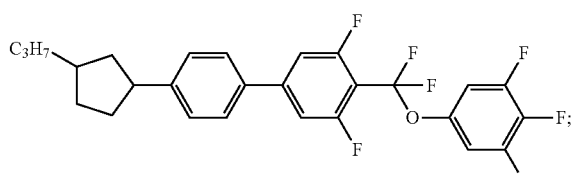

II-11-4

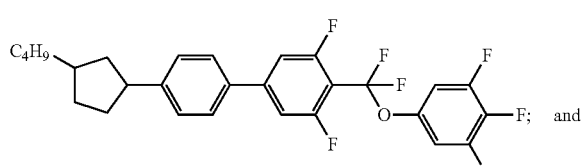
and

II-11-5

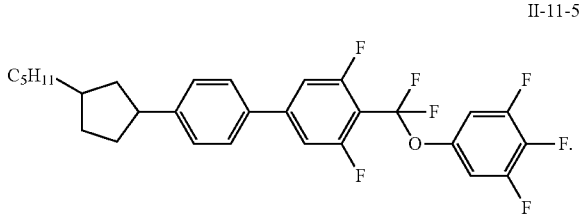

In embodiments of the present invention, more preferably, the compound of general formula II-12 is selected from the group consisting of the following compounds:

II-12-1

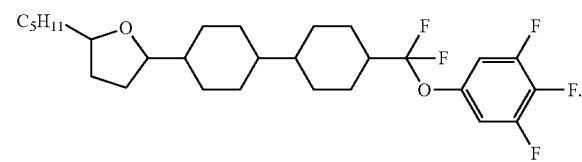

II-12-2

II-12-3

II-12-4

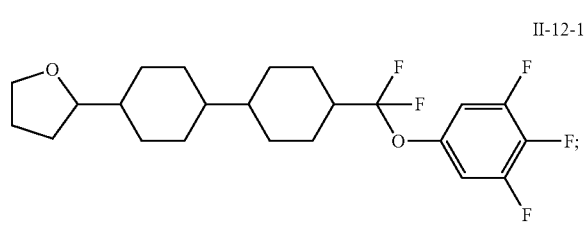
and

II-12-5

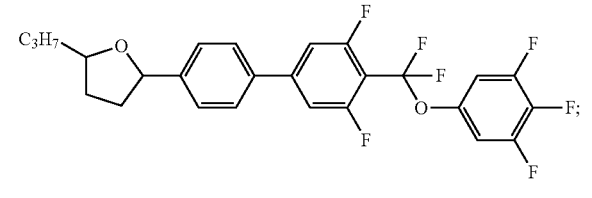

In embodiments of the present invention, more preferably, the compound of general formula II-13 is selected from the group consisting of the following compounds:

II-13-1

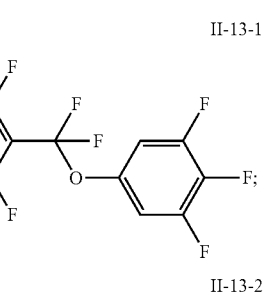

II-13-2

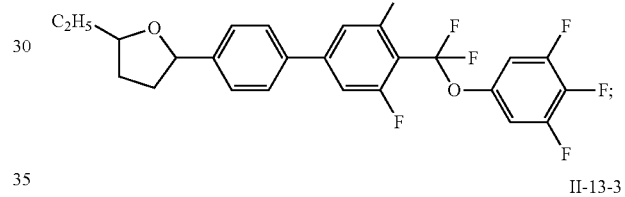

II-13-3

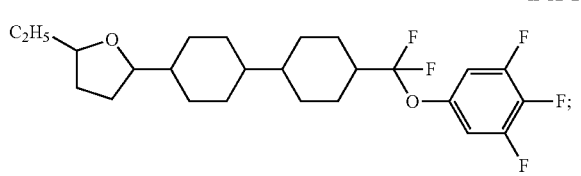

II-13-4

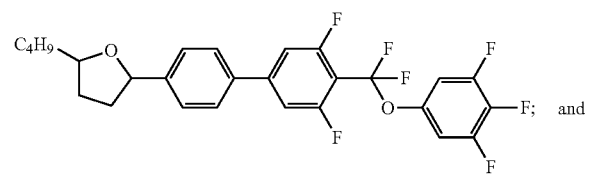
and

II-13-5

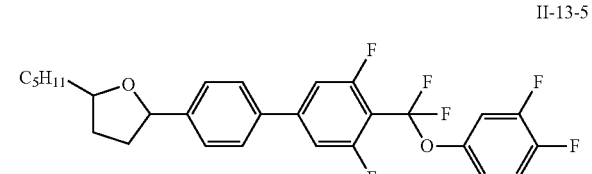

In embodiments of the present invention, more preferably, the compound of general formula II-14 is selected from the group consisting of the following compounds:

II-14-1
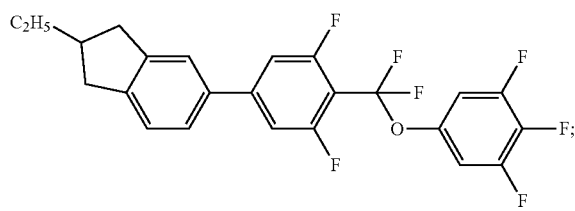

II-14-2
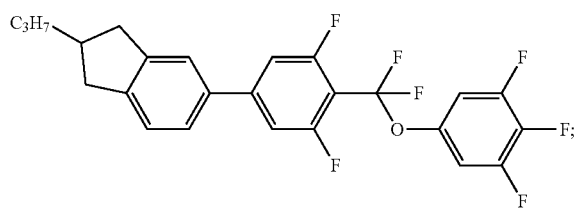

II-14-3
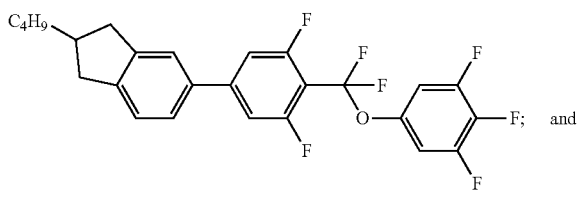

II-14-4
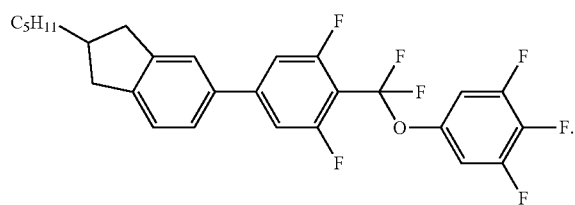

In embodiments of the present invention, more preferably, the compound of general formula II-15 is selected from the group consisting of the following compounds:

II-15-1
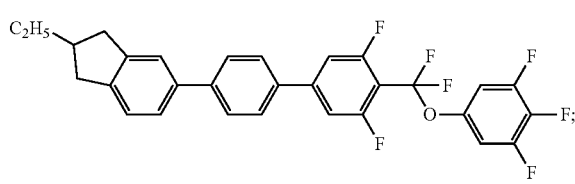

II-15-2
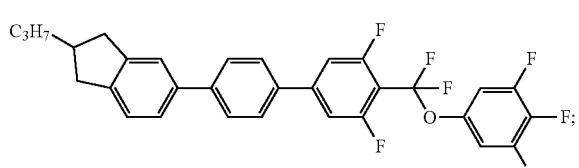

II-15-3
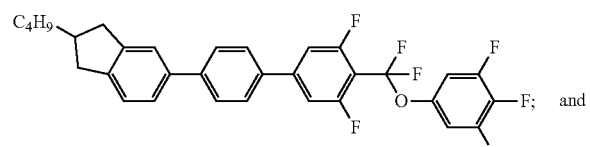

II-15-4
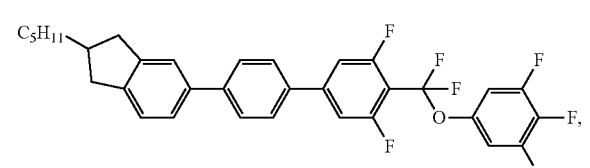

In embodiments of the present invention, more preferably, the compound of general formula II-16 is selected from the group consisting of the following compounds:

II-16-1
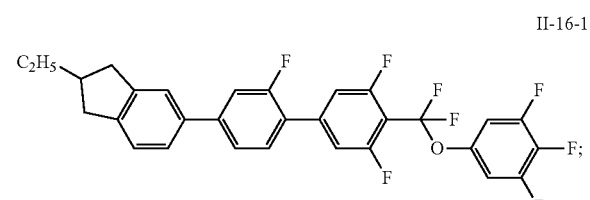

II-16-2
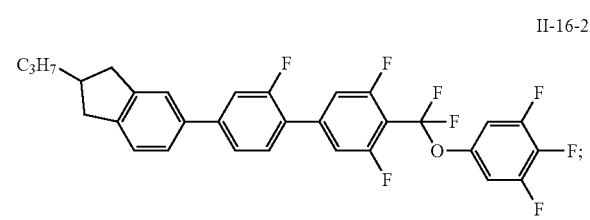

II-16-3
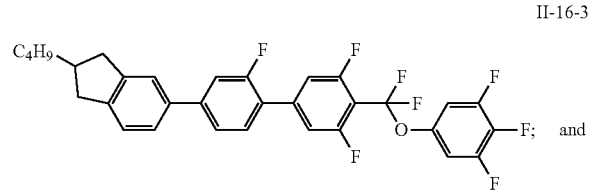

II-16-4
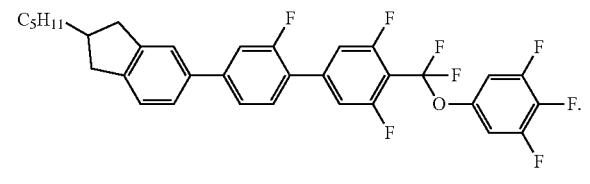

In embodiments of the present invention, more preferably, the compound of general formula II-17 is selected from the group consisting of the following compounds:

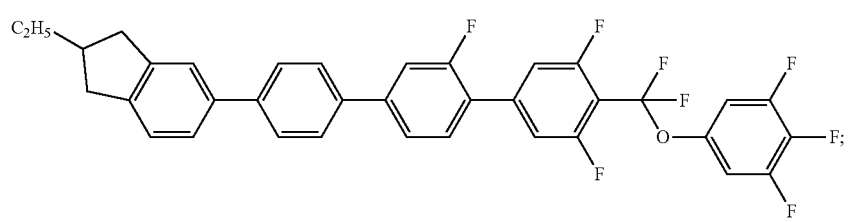

II-17-1

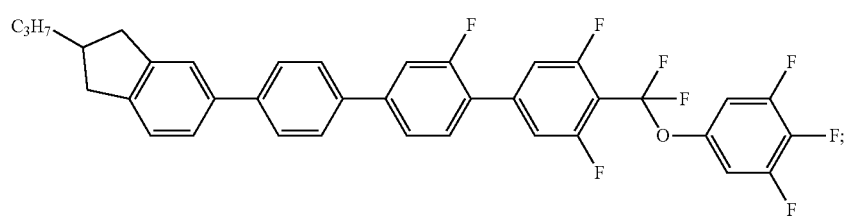

II-17-2

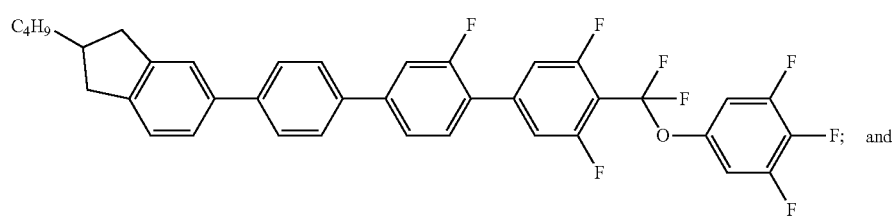

II-17-3

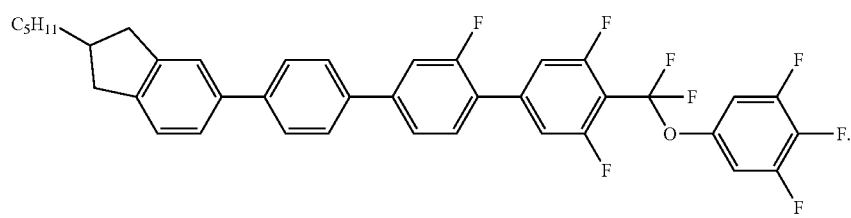

II-17-4

In embodiments of the present invention, preferably, the compound of general formula III is selected from the group consisting of the following compounds:

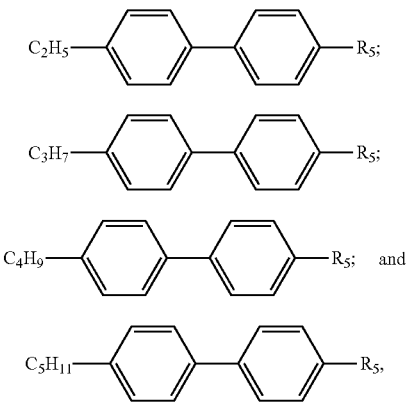

III-1

III-2

III-3

III-4 wherein, $R_5$ represents an alkyl group having 1 to 5 carbon atoms or an alkoxy group having 1 to 5 carbon atoms.

In embodiments of the present invention, more preferably, the compound of general formula III-1 is selected from the group consisting of the following compounds:

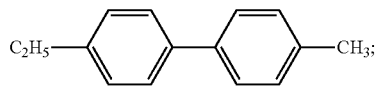

III-1-1

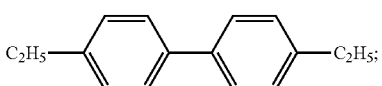

III-1-2

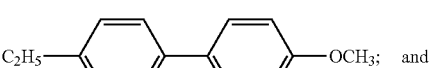

III-1-3 and

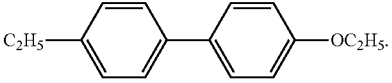

III-1-4

In embodiments of the present invention, more preferably, the compound of general formula III-2 is selected from the group consisting of the following compounds:

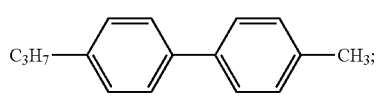

III-2-1

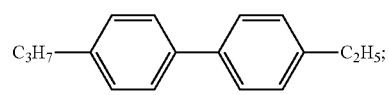 III-2-2

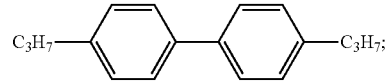 III-2-3

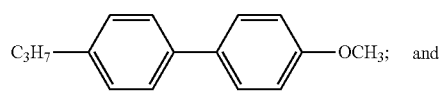 III-2-4

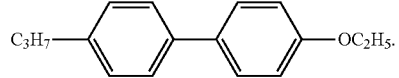 III-2-5

In embodiments of the present invention, more preferably, the compound of general formula III-3 is selected from the group consisting of the following compounds:

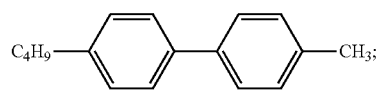 III-3-1

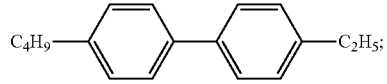 III-3-2

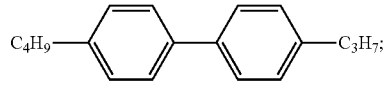 III-3-3

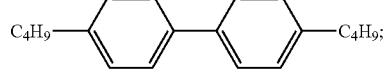 III-3-4

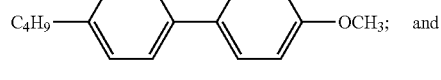 III-3-5

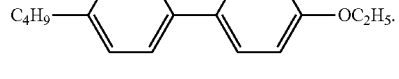 III-3-6

In embodiments of the present invention, more preferably, the compound of general formula III-4 is selected from the group consisting of the following compounds:

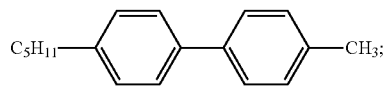 III-4-1

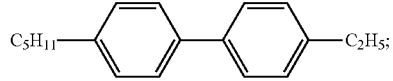 III-4-2

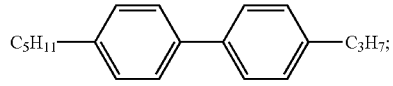 III-4-3

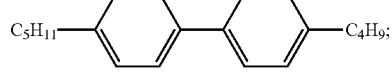 III-4-4

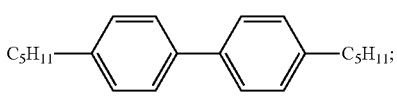 III-4-5

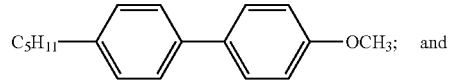 III-4-6

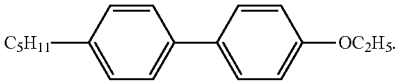 III-4-7

In embodiments of the present invention, preferably, the compound of general formula IV is selected from the group consisting of the following compounds:

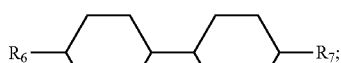 IV-1

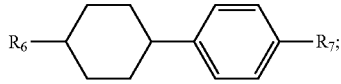 IV-2

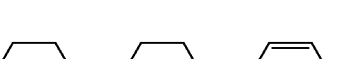 IV-3

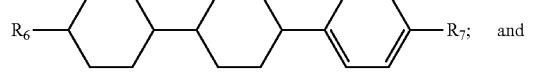 IV-4 wherein, $R_6$ and $R_7$ are the same or different and each independently represent an alkyl group having 1 to 7 carbon atoms, an alkoxy group having 1 to 5 carbon atoms, or an alkenyl group having 2 to 5 carbon atoms.

In embodiments of the present invention, more preferably, the compound of general formula IV-1 is selected from the group consisting of the following compounds:

 IV-1-1

 IV-1-2

 IV-1-3

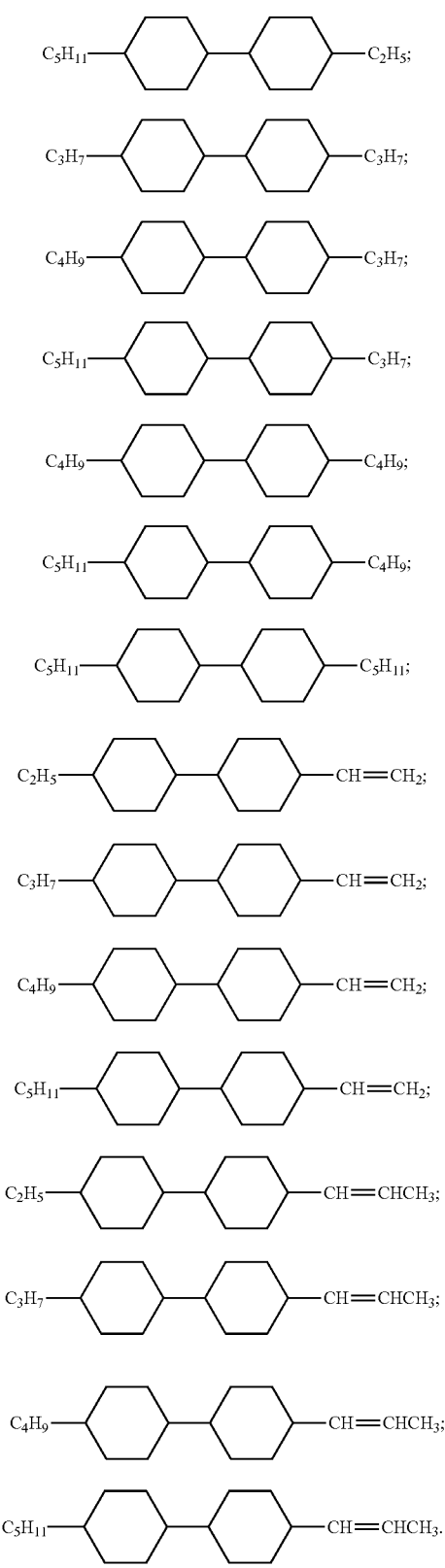
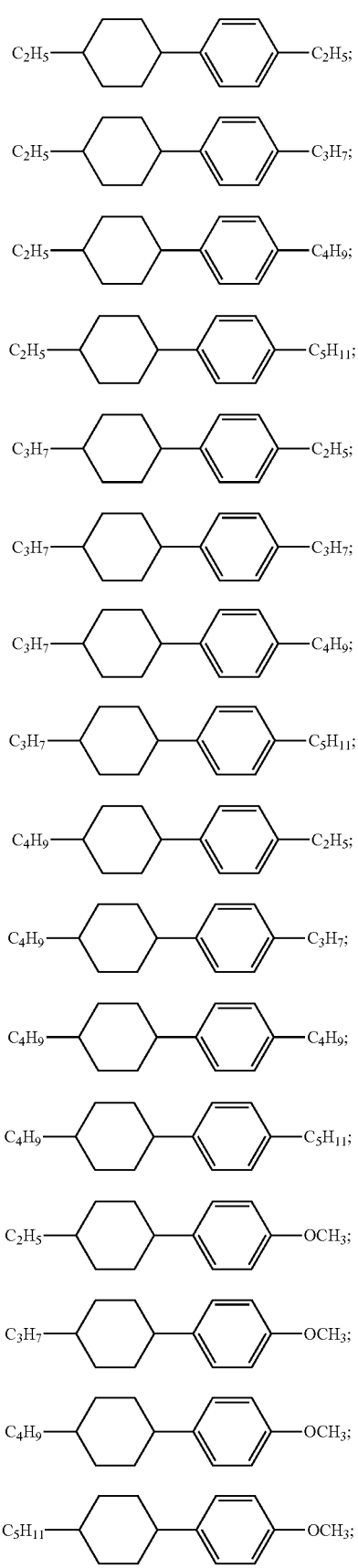
In embodiments of the present invention, more preferably, the compound of general formula IV-2 is selected from the group consisting of the following compounds:

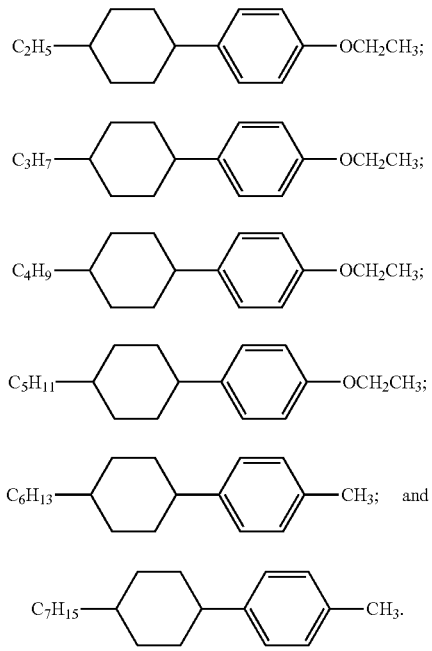
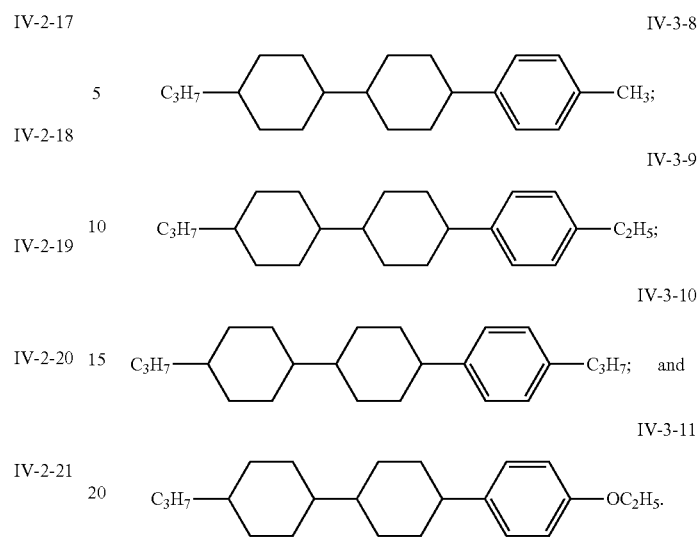
In embodiments of the present invention, more preferably, the compound of general formula IV-3 is selected from the group consisting of the following compounds:
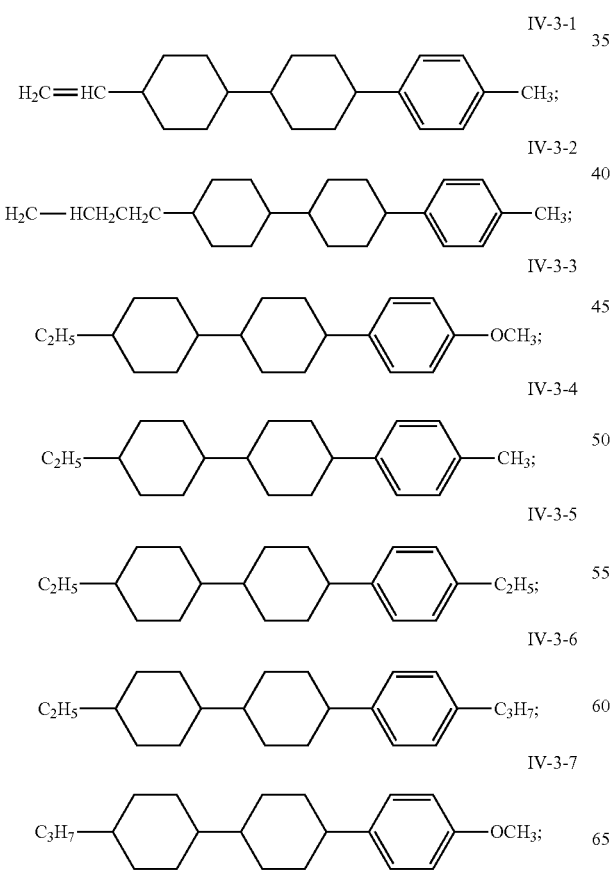
In embodiments of the present invention, more preferably, the compound of general formula IV-4 is selected from the group consisting of the following compounds:
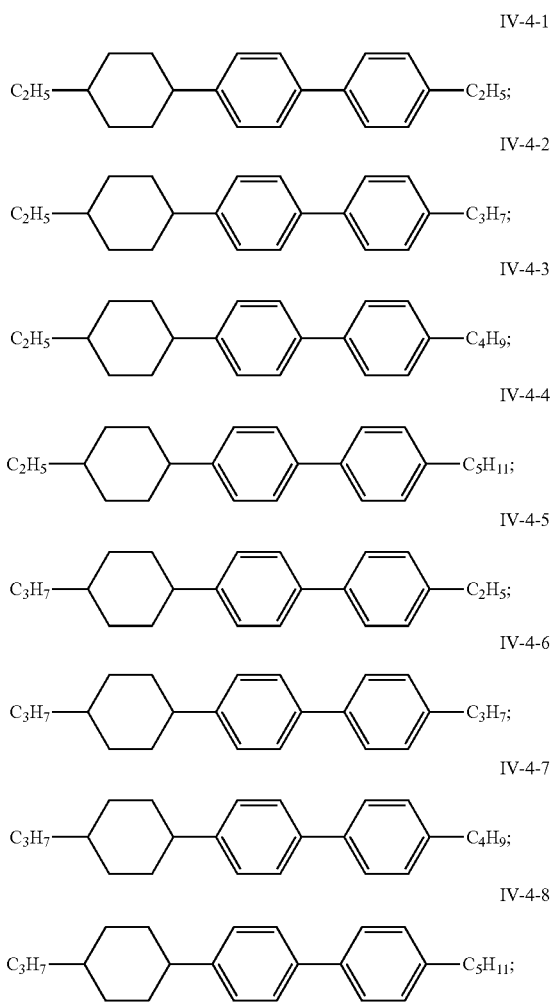

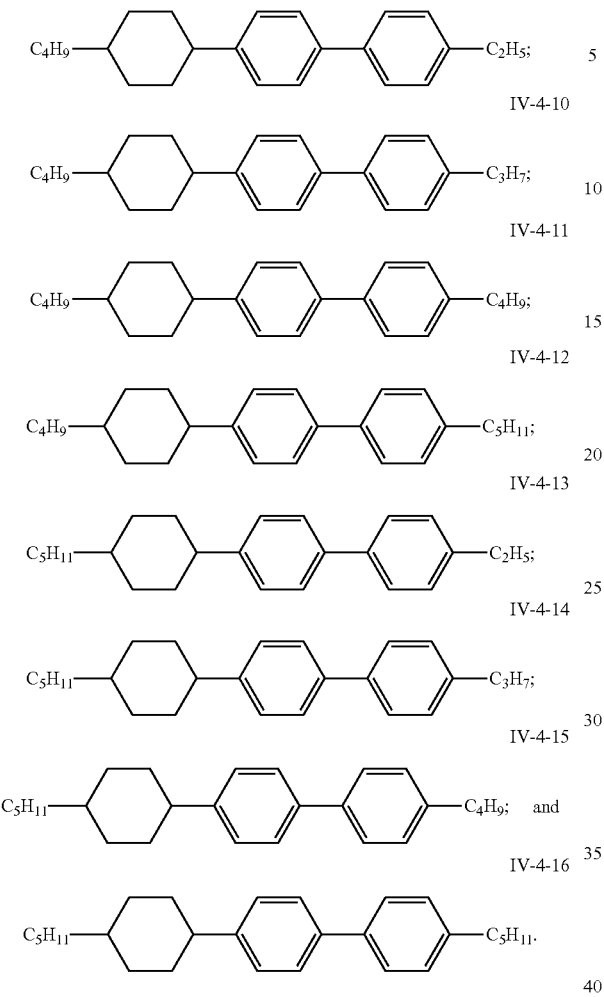
In embodiments of the present invention, preferably, the compound of general formula V is selected from the group consisting of the following compounds:
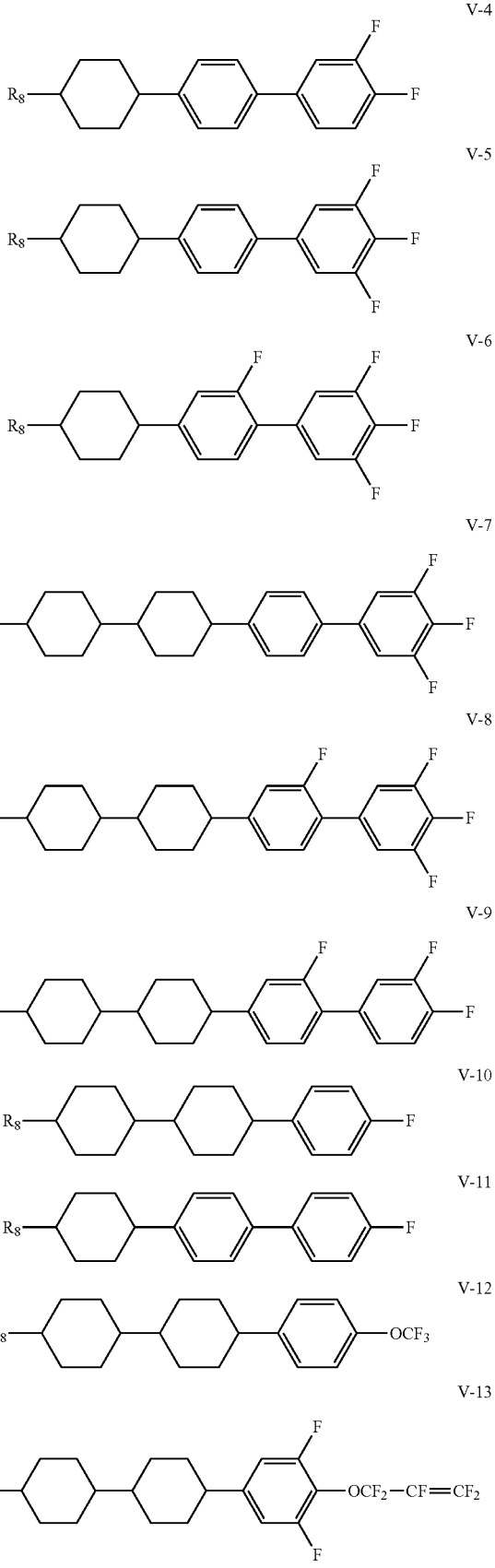

-continued

V-14
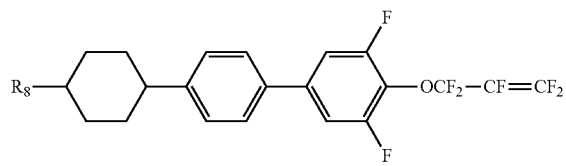

V-15
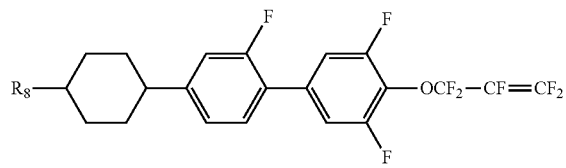

V-16
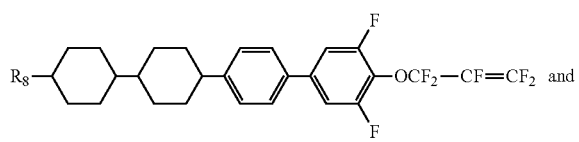

V-17
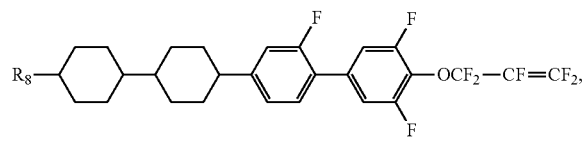

wherein,

R$_8$ represents an alkyl group having 1 to 7 carbon atoms.

In embodiments of the present invention, more preferably, the compound of general formula V-1 is selected from the group consisting of the following compounds:

V-1-1
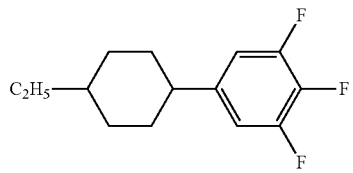

V-1-2
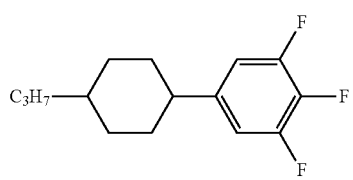

V-1-3
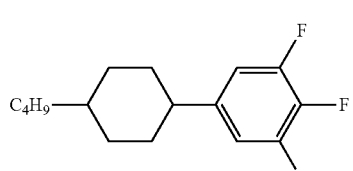

V-1-4
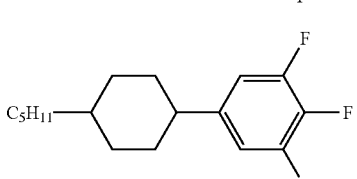

-continued

V-1-5
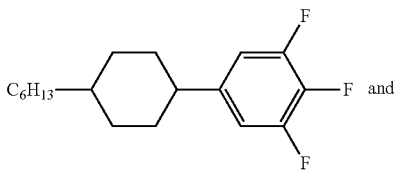

V-1-6
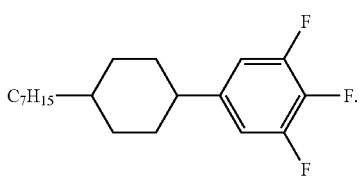

In embodiments of the present invention, more preferably, the compound of general formula V-2 is selected from the group consisting of the following compounds:

V-2-1
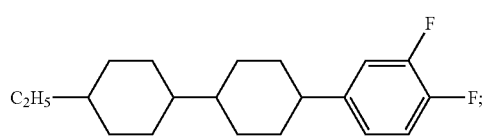

V-2-2
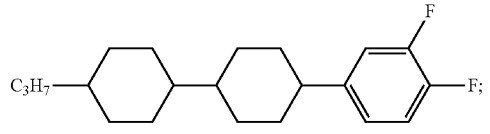

V-2-3
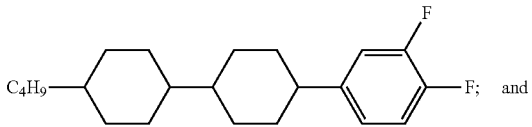

V-2-4
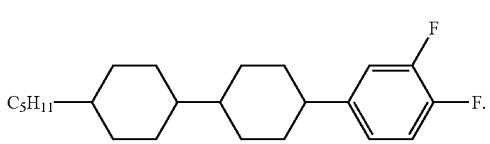

In embodiments of the present invention, more preferably, the compound of general formula V-3 is selected from the group consisting of the following compounds:

V-3-1
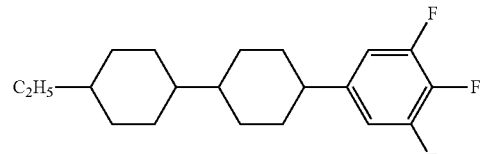

V-3-2
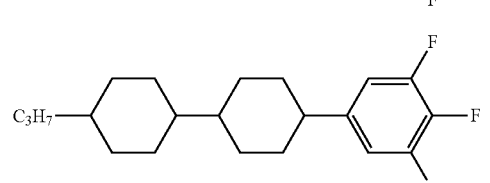

-continued

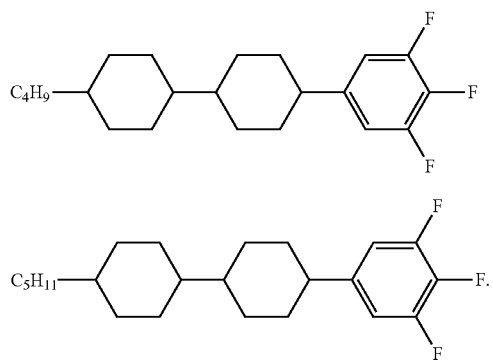

V-3-3

V-3-4

In embodiments of the present invention, more preferably, the compound of general formula V-4 is selected from the group consisting of the following compounds:

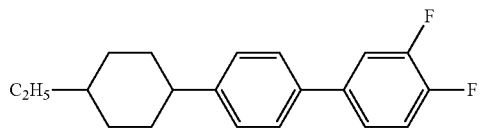

V-4-1

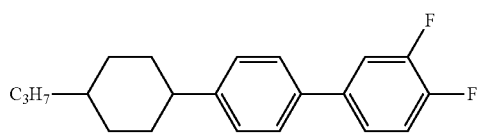

V-4-2

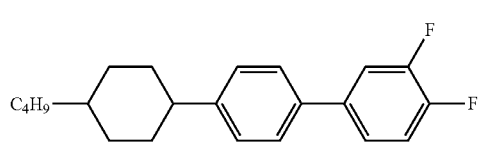

V-4-3

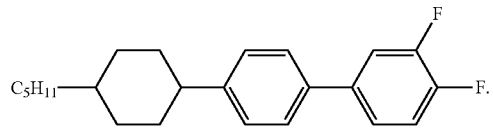

V-4-4

In embodiments of the present invention, more preferably, the compound of general formula V-5 is selected from the group consisting of the following compounds:

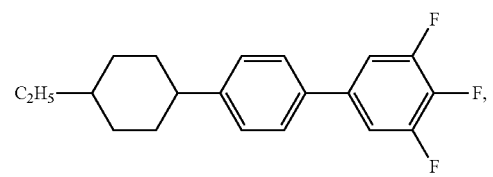

V-5-1

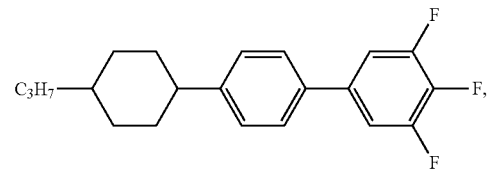

V-5-2

-continued

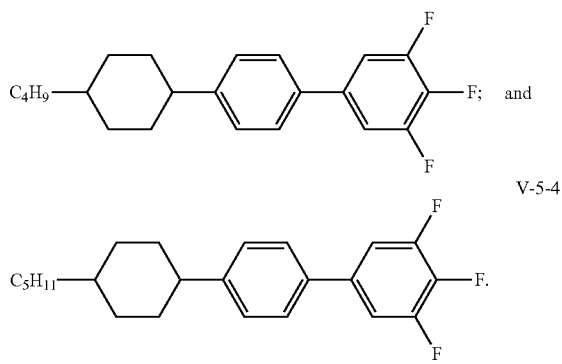

V-5-3

V-5-4

In embodiments of the present invention, more preferably, the compound of general formula V-6 is selected from the group consisting of the following compounds:

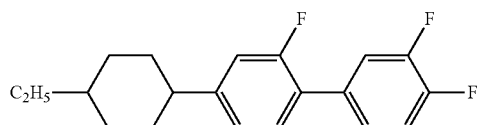

V-6-1

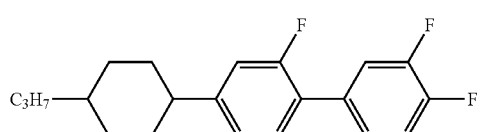

V-6-2

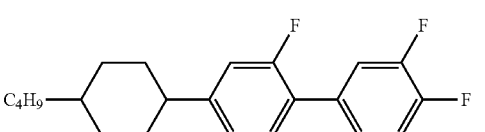

V-6-3

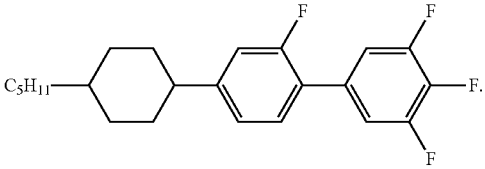

V-6-4

In embodiments of the present invention, more preferably, the compound of general formula V-7 is selected from the group consisting of the following compounds:

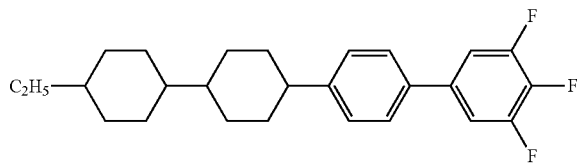

V-7-1

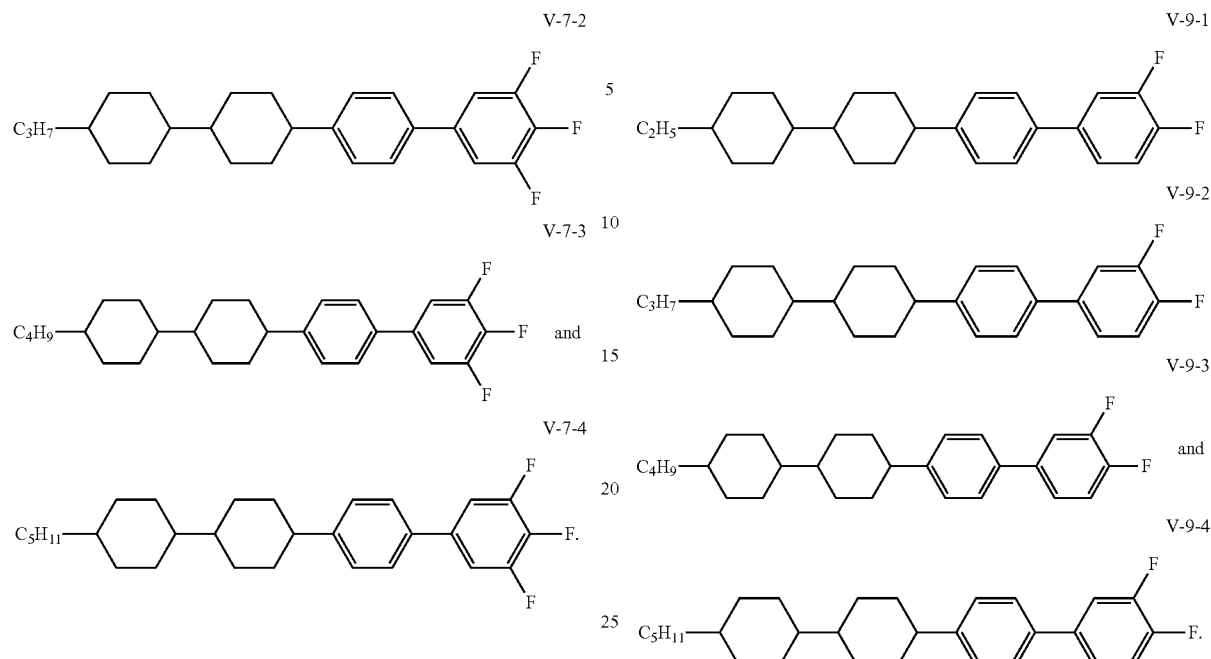

In embodiments of the present invention, more preferably, the compound of general formula V-8 is selected from the group consisting of the following compounds:

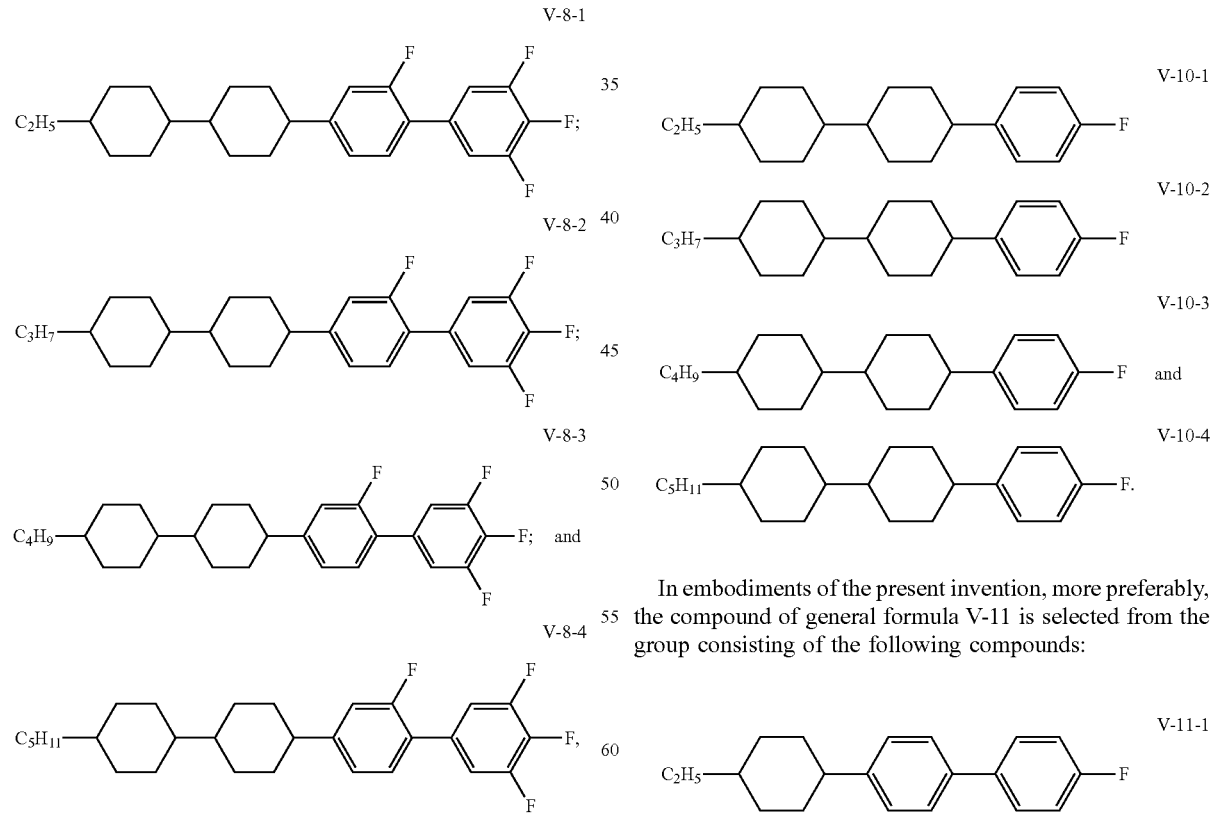

In embodiments of the present invention, more preferably, the compound of general formula V-9 is selected from the group consisting of the following compounds:

In embodiments of the present invention, more preferably, the compound of general formula V-10 is selected from the group consisting of the following compounds:

In embodiments of the present invention, more preferably, the compound of general formula V-11 is selected from the group consisting of the following compounds:

-continued

V-11-3
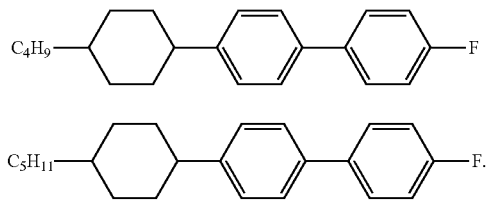 and

V-11-4
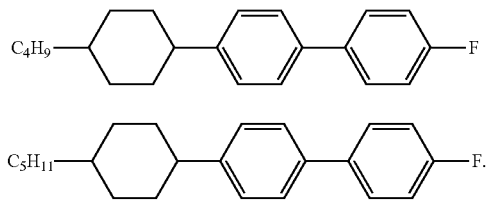

In embodiments of the present invention, more preferably, the compound of general formula V-12 is selected from the group consisting of the following compounds:

V-12-1
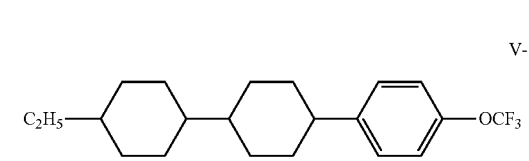

V-12-2
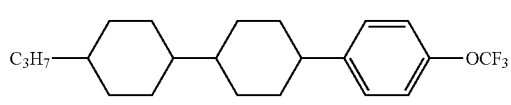

V-12-3
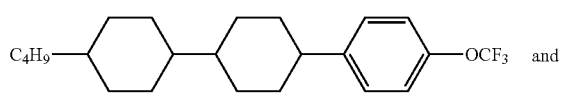 and

V-12-4
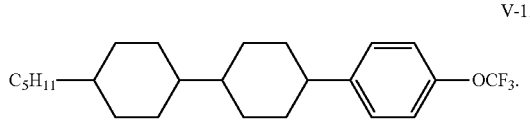

The compound of general formula V-13 is selected from the group consisting of the following compounds:

V-13-1
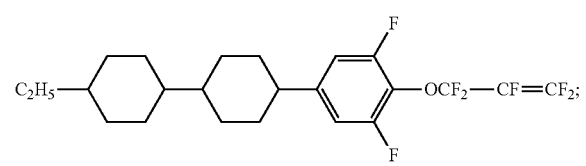

V-13-2
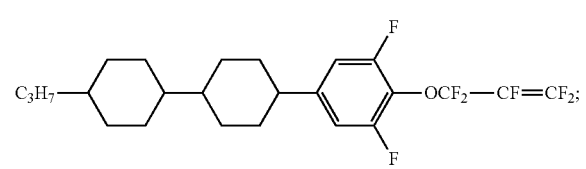

V-13-3
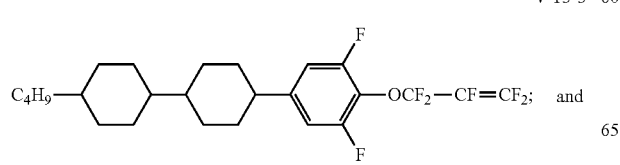 and

-continued

V-13-4
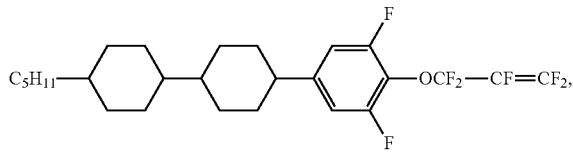

The compound of general formula V-14 is selected from the group consisting of the following compounds:

V-14-1
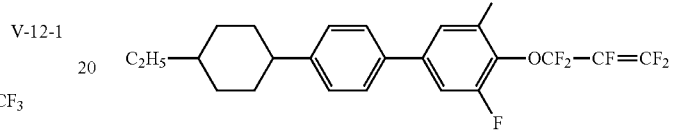

V-14-2
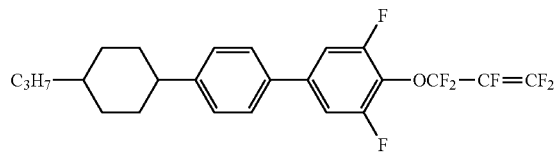

V-14-3
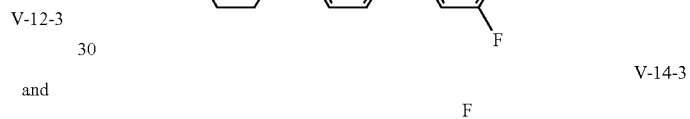 and

V-14-4
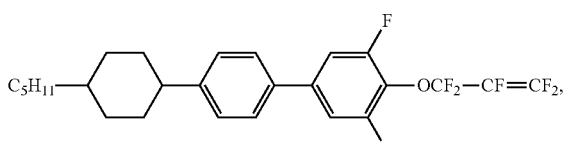

The compound of general formula V-15 is selected from the group consisting of the following compounds:

V-15-1
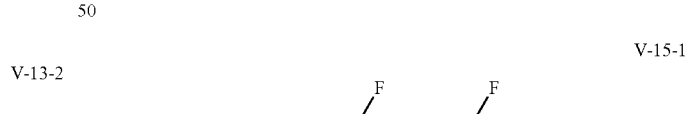

V-15-2
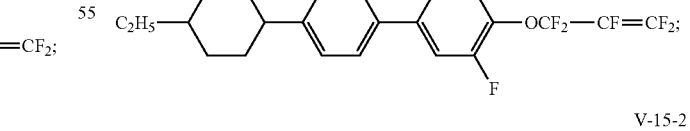

-continued
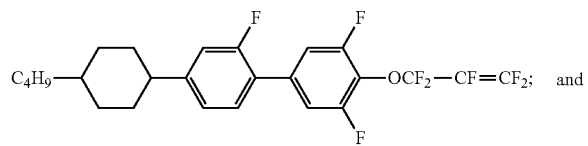
V-15-3
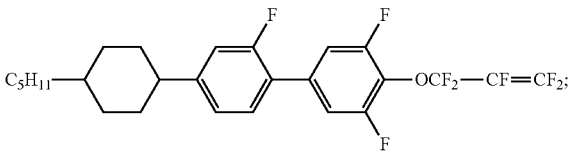
V-15-4
The compound of general formula V-16 is selected from the group consisting of the following compounds:
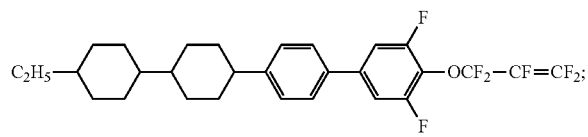
V-16-1
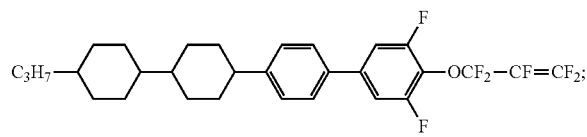
V-16-2
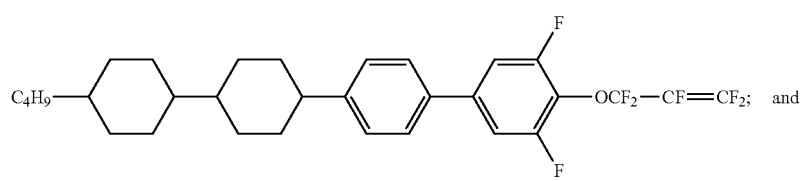
V-16-3
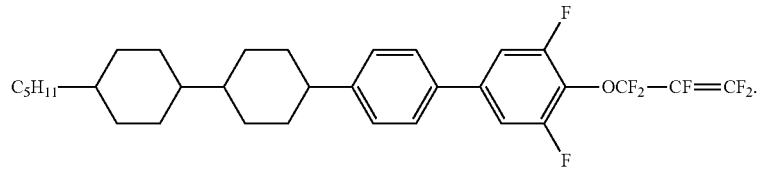
V-16-4
The compound of general formula V-17 is selected from the group consisting of the following compounds:
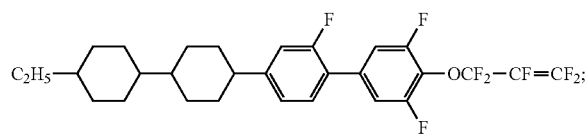
V-17-1
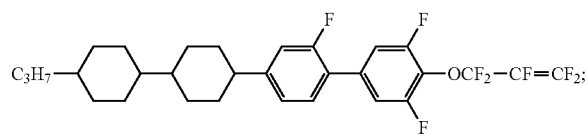
V-17-2
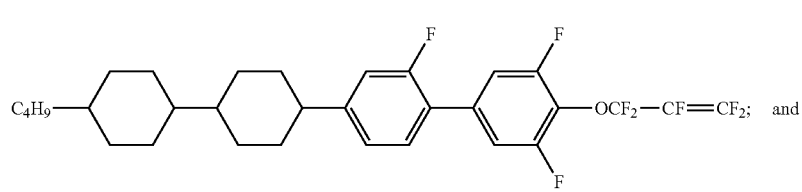
V-17-3
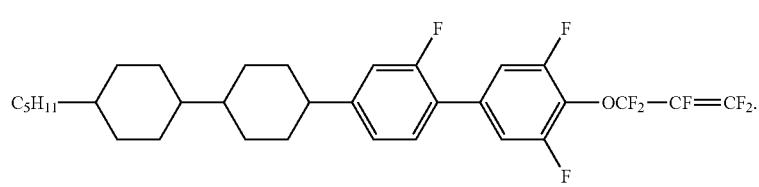
V-17-4

In embodiments of the present invention, preferably, the compound of general formula I comprises 5-30% of the total weight of the liquid crystal composition; the compound of general formula II comprises 1-40% of the total weight of the liquid crystal composition; the compound of general formula III comprises 1-15% of the total weight of the liquid crystal composition; the compound of general formula IV comprises 20-60% of the total weight of the liquid crystal composition; and the compound of general formula V comprises 1-25% of the total weight of the liquid crystal composition.

In embodiments of the present invention, more preferably, the compound of general formula I comprises 9-30% of the total weight of the liquid crystal composition; the compound of general formula II comprises 4-40% of the total weight of the liquid crystal composition; the compound of general formula III comprises 4-15% of the total weight of the liquid crystal composition; the compound of general formula IV comprises 25-60% of the total weight of the liquid crystal composition; and the compound of general formula V comprises 3-23% of the total weight of the liquid crystal composition.

The liquid crystal composition of the present invention further comprises 1-15% of one or more compounds of general formula VI based on the total weight of the liquid crystal composition

VI

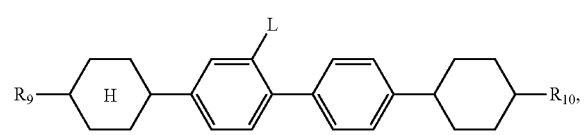

wherein, $R_9$ and $R_{10}$ are the same or different and each independently represent an alkyl group having 1 to 7 carbon atoms;

the ring

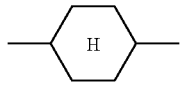

represents

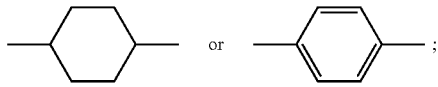

and

L represents H or F.

In embodiments of the present invention, preferably, the compound of general formula VI comprises 1-10% of the total weight of the liquid crystal composition.

In embodiments of the present invention, more preferably, the compound of general formula VI comprises 3-10% of the total weight of the liquid crystal composition.

In embodiments of the present invention, preferably, the compound of general formula VI is selected from the group consisting of the following compounds:

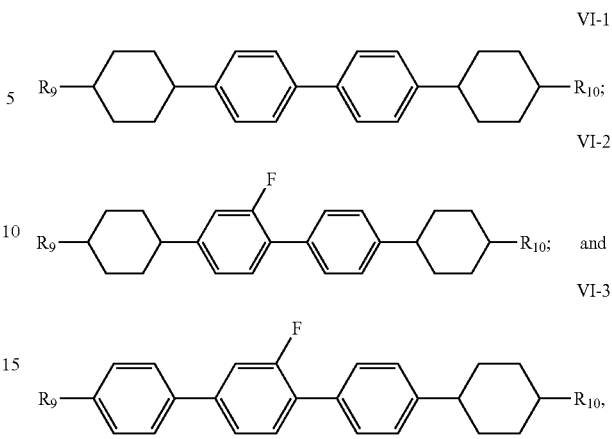

VI-1

VI-2

VI-3 wherein, $R_9$ and $R_{10}$ are the same or different and each independently represent an alkyl group having 1 to 5 carbon atoms.

In embodiments of the present invention, more preferably, the compound of general formula VI-1 is selected from the group consisting of the following compounds:

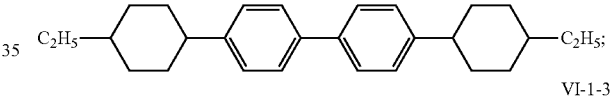

VI-1-1

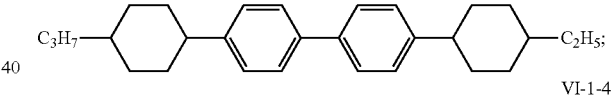

VI-1-2

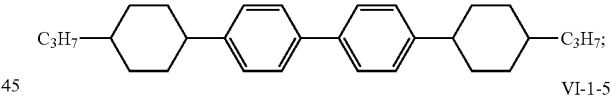

VI-1-3

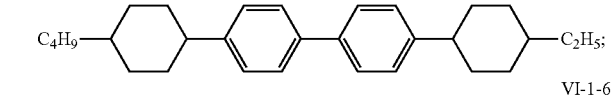

VI-1-4

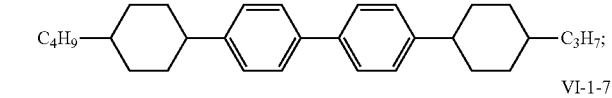

VI-1-5

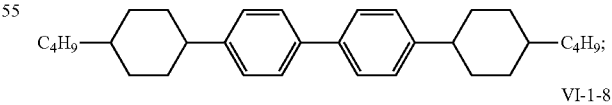

VI-1-6

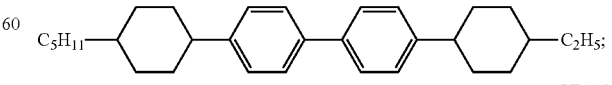

VI-1-7

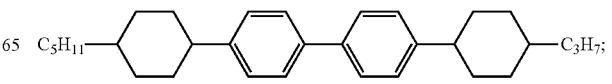

VI-1-8

VI-1-9

-continued

VI-1-10
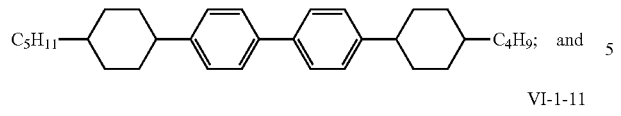
and

VI-1-11
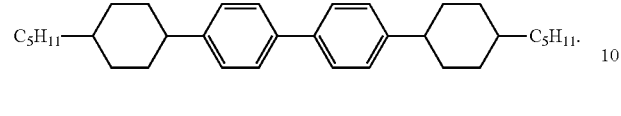

In embodiments of the present invention, more preferably, the compound of general formula VI-2 is selected from the group consisting of the following compounds:

VI-2-1
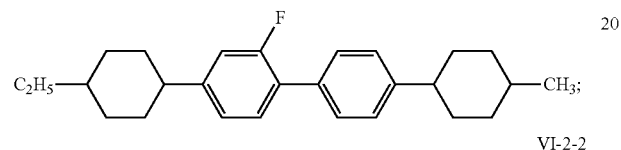

VI-2-2
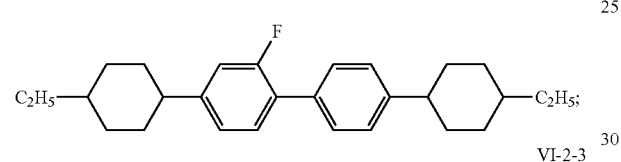

VI-2-3
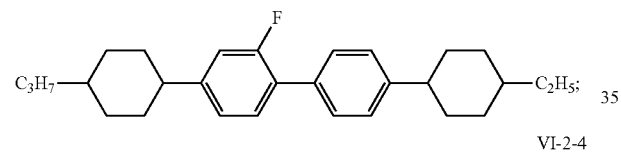

VI-2-4
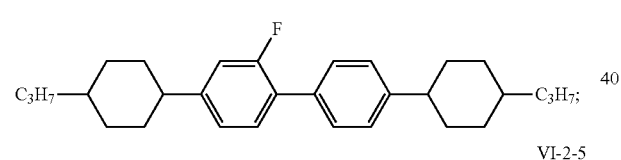

VI-2-5
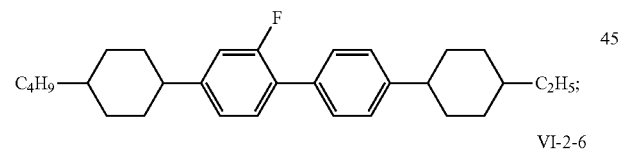

VI-2-6
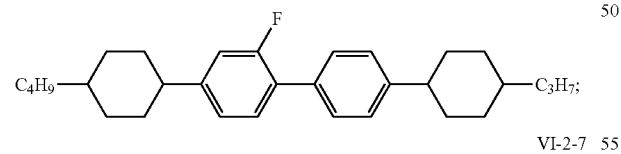

VI-2-7
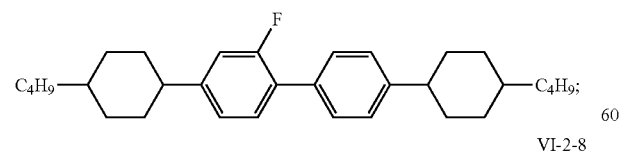

VI-2-8
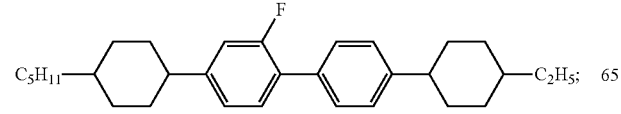

VI-2-9
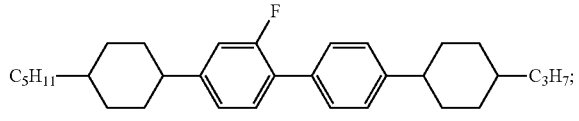

VI-2-10
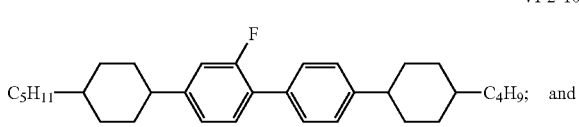

and

VI-2-11
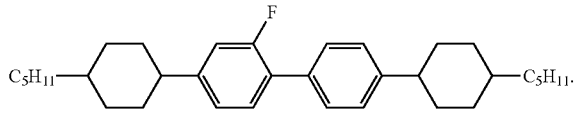

In embodiments of the present invention, more preferably, the compound of general formula VI-3 is selected from the group consisting of the following compounds:

VI-3-1
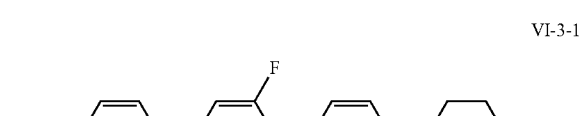

VI-3-2
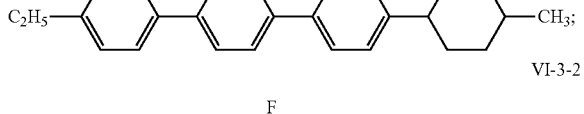

VI-3-3
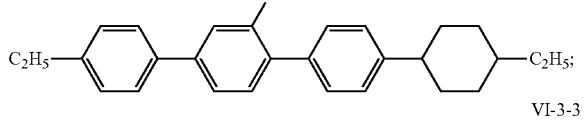

VI-3-4
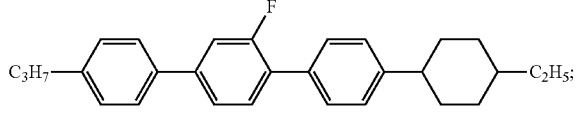

VI-3-5
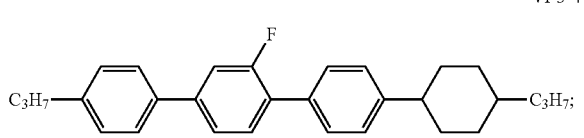

VI-3-6
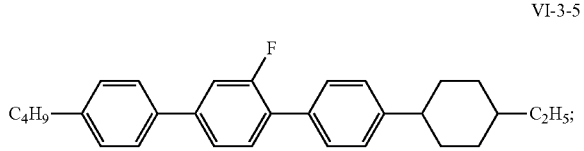

VI-3-7
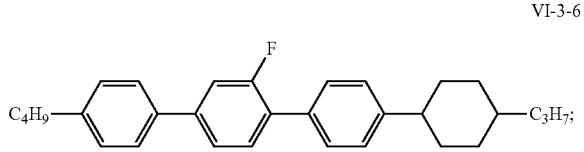

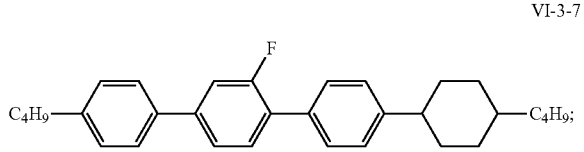

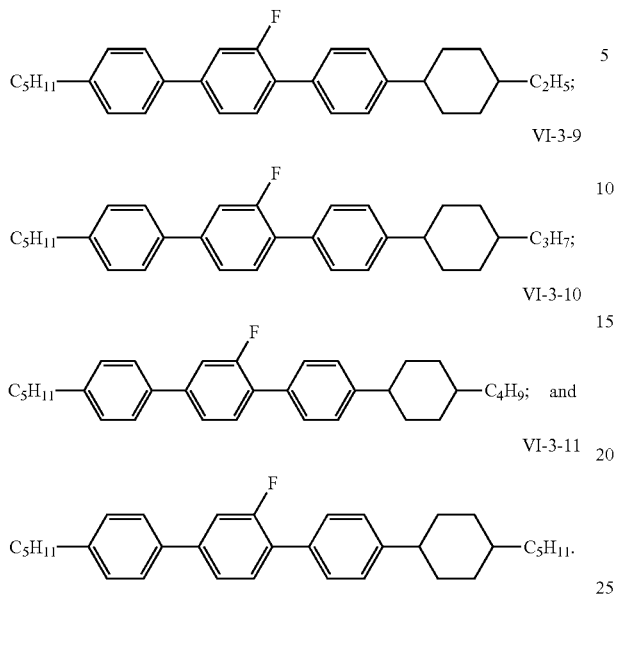

In another aspect, the present invention provides a liquid crystal display device, especially a transmissive liquid crystal display device, comprising a liquid crystal composition of the present invention.

It is determined by comparison in the present invention that the liquid crystal composition of the present invention has properties such as a large maximum absolute transmittance, a high voltage holding ratio, better anti-UV properties, and high temperature reliability, and has a suitable optical anisotropy, a suitable dielectric anisotropy, and a relatively high clearing point, and that the liquid crystal composition of the present invention is suitable for use in a liquid crystal display device, especially a transmissive liquid crystal display device, enabling the liquid crystal display device to have properties such as a high maximum absolute transmittance, a high voltage holding ratio, good anti-UV properties and high temperature reliability.

Unless otherwise stated, in the present invention, all ratios are weight ratios, all temperatures are given in degree Celsius, and a cell gap in the test of response time data is selected to be a 7 μm.

DETAILED DESCRIPTION OF THE EMBODIMENTS

The present invention will be described below in connection with specific embodiments. It is noted that the following examples are merely illustrative of the invention and are not intended to be limiting. Other combinations and various modifications can be made based on the concept of the invention without departing from the spirit or scope of the invention.

For convenience of expression, in the following examples, the group structures of the liquid crystal composition are represented by codes listed in Table 1:

TABLE 1

Codes for group structures in liquid crystal compounds

| Unit structure of the group | Code | Name of the group |
|---|---|---|
|  | C | 1,4-cyclohexylene |
|  | P | 1,4-phenylene |
|  | G | 2-fluoro-1,4-phenylene |
|  | U | 2,5-difluoro-1,4-phenylene |
|  | A | Oxanyl |
|  | D | Dioxanyl |
|  | C(5) | Cyclopentyl |
|  | D(5) | Tetrahydrofuryl |
|  | I | Indan-2,5-diyl |
| —OCF$_3$ | —OCF$_3$ | Trifluoromethoxy |
| —F | F | Fluoro substituent |
| —COO— | E | Carboxy |
| —CF$_2$O— | Q | Difluoromethyleneoxy |
| —OCF$_2$—CF=CF$_2$ | OCF2(F)V(2F) | Perfluoroallyloxy |
| —O— | O | Oxy substituent |
| —C$_n$H$_{2n+1}$ or —C$_m$H$_{2m+1}$ | n or m | Alkyl |
| —CH=CH— | V | Vinyl |
| —CH$_2$CH$_2$— | 2 | Ethylene |

A compound of the following formula is taken as an example:

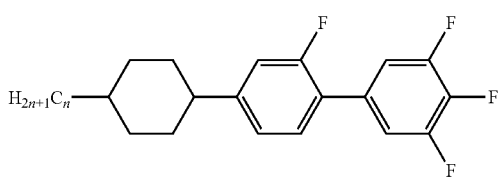

With the codes listed in Table 1, the structural formula may be expressed as nCGUF, in which n represents the number of carbon atoms of the alkyl at the left end and is, for example, "2", indicating that the alkyl is —$C_2H_5$; C represents "cyclohexyl"; G represents "2-fluoro-1,4-phenylene"; U represents "2,5-difluoro-1,4-phenylene"; and F represents "fluoro".

The test items in the following examples are abbreviated as follows:
Cp: clearing point (nematic-isotropic phase transition temperature, ° C.)
Δn: optical anisotropy (589 nm, 20° C.)
Δε: dielectric anisotropy (1 KHz, 25° C.)
VHR (initial): initial voltage holding ratio (%)
VHR (UV): voltage holding ratio after 20 min of solar irradiation (%)
VHR (high temperature): voltage holding ratio after being maintained at a high temperature of 150° C. for 1 h (%)

The optical anisotropy is measured using an Abbe refractometer under a sodium lamp (589 nm) as a light source at 20° C.

Δε=ε∥−ε⊥, where ε∥ is the dielectric constant parallel to the molecular axis, ε⊥ is the dielectric constant perpendicular to the molecular axis, and the test conditions include: 25° C., 1 KHz, a test cell of type TN90, and a cell gap of 7 μm.

VHR (initial) is tested using TOY06254 liquid crystal physical property evaluation system, where the test temperature is 60° C., the test voltage is 5 V, and the test frequency is 6 Hz.

VHR (UV) is tested by TOY06254 liquid crystal physical property evaluation system, where the liquid crystal is irradiated using light having a wavelength of 365 nm and an energy of 6000 mJ/cm2 before testing, the test temperature is 60° C., the test voltage is 5 V, and the test frequency is 6 Hz.

VHR (high temperature) is tested by TOY06254 liquid crystal physical property evaluation system, where the liquid crystal is maintained at a high temperature of 150° C. for 1 h before testing, the test temperature is 60° C., the test voltage is 5 V, and the test frequency is 6 Hz.

Maximum absolute transmittance is tested by DMS505 type LCD-screen measuring system, where the liquid crystal is filled in a test cell, a voltage is applied across the electrodes of the test cell in such a manner that the voltage is gradually increased from 0 V to 5 V by 0.1 V, and optical absolute transmittance at each voltage is recorded, and the maximum absolute transmittance is the largest value among the recorded absolute transmittances.

Each of the components used in the following examples can be synthesized by a known method or is commercially available. These synthesis techniques are conventional and the resulting liquid crystal compounds are tested to conform to the standards for electronic compounds.

A liquid crystal composition is prepared according to a mixing ratio of the liquid crystal compositions defined in the following examples. The liquid crystal composition is prepared by a conventional method in the art, for example, mixing according to the defined ratio by heating, ultrasonicating, and suspending, etc.

The liquid crystal compositions given in the following examples are prepared and investigated. Composition and performance test results of each liquid crystal composition are shown below.

Comparative Example 1

The compounds and percentages by weight listed in Table 2 have been disclosed by Comparative Example 1 in CN102858918A. The liquid crystal composition of Comparative Example 1 was prepared with the compounds in percentages by weight shown in Table 2, filled between two substrates of a liquid crystal display, and subjected to performance test under the test conditions of the present invention. The test data is shown in the table below.

TABLE 2

Formulation of liquid crystal composition and performances tested

| Code of component | Content, % | Test result of performance parameters | |
|---|---|---|---|
| 3PGUQGF | 4 | Δn | 0.116 |
| 3CCV | 30 | Δε | 3.9 |
| 7CP1 | 3 | Cp | 70.4 |
| 3CPO2 | 3 | VHR (initial) | 98.5 |
| V2PP2V | 5 | VHR (UV) | 96.3 |
| 3CPP2 | 7 | VHR (high temperature) | 94.7 |
| 2PGP3 | 5 | maximum absolute transmittance/% | 25.52 |
| 1PGP2V | 5 | | |
| 3CCEPC3 | 3 | | |
| 3CCV (2F) | 15 | | |
| 1V2PPF | 3 | | |
| 1V2PPC1 | 3 | | |
| 3CCQGOCF3 | 3 | | |
| 3CCPUF | 3 | | |
| 4PGUQPOCF3 | 4 | | |
| 3PUUQGOCF3 | 4 | | |
| Total | 100 | | |

Comparative Example 2

The compounds and percentages by weight listed in Table 3 have been disclosed by example 3 in WO2011065299A1. The liquid crystal composition of Comparative Example 2 was prepared with the compounds in percentages by weight shown in Table 3, filled between two substrates of a liquid crystal display, and subjected to performance test under the test conditions of the present invention. The test data is shown in the table below.

TABLE 3

Formulation of liquid crystal composition and performances tested

| Code of component | Content, % | Test result of performance parameters | |
|---|---|---|---|
| 3PGUQUF | 4 | Δn | 0.121 |
| 4PGUQUF | 10 | Δε | 11.5 |
| 3PGUQGOCF3 | 9 | Cp | 70.3 |
| 3CCV | 15 | VHR (initial) | 96.5 |
| 3CCV1 | 3 | VHR (UV) | 84.2. |
| V2PP1 | 5 | VHR (high temperature) | 93.5 |

TABLE 3-continued

Formulation of liquid crystal composition and performances tested

| Code of component | Content, % | Test result of performance parameters | |
|---|---|---|---|
| VCCP1 | 4 | maximum absolute transmittance/% | 26.43 |
| 3CPP2 | 3 | | |
| 2PGP3 | 3 | | |
| 3GPP2 | 3 | | |
| 7CUF | 6 | | |
| 5CQUF | 6 | | |
| 3CCQUF | 5 | | |
| 2CCUF | 3 | | |
| 3CCUF | 3 | | |
| 3CPUF | 5 | | |
| 3PUQUF | 7 | | |
| 3CCPUF | 3 | | |
| 4CCPUF | 3 | | |
| Total | 100 | | |

Example 1

The liquid crystal composition of Example 1 was prepared with the compounds in percentages by weight shown in Table 4, filled between two substrates of a liquid crystal display, and subjected to performance test. The test data is shown in the table below.

TABLE 4

Formulation of liquid crystal composition and performances tested

| Code of component | Code of structure | Content, % | Test result of performance parameters | |
|---|---|---|---|---|
| 3PGUQUF | II-9-2 | 4 | Δn | 0.112 |
| 3CCV | IV-1-12 | 30 | Δε | 3.8 |
| 7CP1 | IV-2-22 | 3 | Cp | 73.2 |
| 3CPO2 | IV-2-18 | 3 | VHR (initial) | 98.5 |
| 3PPO2 | III-2-5 | 5 | VHR (UV) | 97.2 |
| 3CPP2 | IV-4-5 | 12 | VHR (high temperature) | 96.9 |
| 3CPPC3 | VI-1-4 | 3 | maximum absolute transmittance/% | 27.65 |
| 5PP1 | III-4-1 | 10 | | |
| 3CCP1 | IV-3-8 | 12 | | |
| 3PGUQPOCF3 | Ib-3 | 3 | | |
| 3CCPUF | V-7-2 | 7 | | |
| 4PGUQPOCF3 | Ib-4 | 4 | | |
| 3PGUQPCF3 | Ia-3 | 4 | | |
| Total | | 100 | | |

Example 2

The liquid crystal composition of Example 2 was prepared with the compounds in percentages by weight shown in Table 5, filled between two substrates of a liquid crystal display, and subjected to performance test. The test data is shown in the table below.

TABLE 5

Formulation of liquid crystal composition and performances tested

| Code of component | Code of structure | Content, % | Test result of performance parameters | |
|---|---|---|---|---|
| 3PGUQUF | II-9-2 | 4 | Δn | 0.122 |
| 4PGUQUF | II-9-3 | 10 | Δε | 11.3 |
| 3PGUQPOCF3. | Ib-3 | 9 | Cp | 71.5 |
| 3CCV | IV-1-12 | 15 | VHR (initial) | 96.7 |
| 3CCV1 | IV-1-16 | 3 | VHR (UV) | 92.3 |
| 5PP1 | III-4-1 | 8 | VHR (high temperature) | 94.1 |
| VCCP1 | IV-3-1 | 4 | maximum absolute transmittance/% | 28.35 |
| 3CPP2 | IV-4-5 | 3 | | |
| 5CPPC2 | VI-1-8 | 3 | | |
| 7CUF | V-1-6 | 6 | | |
| 5CQUF | II-1-4 | 6 | | |
| 3CCQUF | II-3-2 | 5 | | |
| 2CCUF | V-3-1 | 3 | | |
| 3CCUF | V-3-2 | 3 | | |
| 3CPUF | V-5-2 | 5 | | |
| 3PUQUF | II-8-2 | 7 | | |
| 3CCPUF | V-7-2 | 3 | | |
| 4CCPUF | V-7-3 | 3 | | |
| Total | | 100 | | |

Example 3

The liquid crystal composition of Example 3 was prepared with the compounds in percentages by weight shown in Table 6, filled between two substrates of a liquid crystal display, and subjected to performance test. The test data is shown in the table below.

TABLE 6

Formulation of liquid crystal composition and performances tested

| Code of component | Code of structure | Content, % | Test result of performance parameters | |
|---|---|---|---|---|
| 3CPP2 | IV-4-5 | 5 | Δn | 0.095 |
| 2PGUQPCF3 | Ia-2 | 5 | Δε | 8.3 |
| 3CPPC3 | VI-1-4 | 5 | Cp | 74.2 |
| 3PGUQPOCF3 | Ib-3 | 5 | VHR (initial) | 98.20 |
| 3CCPF | V-10-2 | 5 | VHR (UV) | 94.50 |
| 3CCUF | V-3-2 | 8 | VHR (high temperature) | 94.60 |
| 2CCQUF | II-3-1 | 10 | maximum absolute transmittance/% | 27.9 |
| 3CCQUF | II-3-2 | 15 | | |
| 3CCV | IV-1-12 | 22 | | |
| 3PP2 | III-2-2 | 5 | | |
| 3PUQUF | II-8-2 | 5 | | |
| 2PUQUF | II-8-1 | 5 | | |
| 3IGUQUF | II-16-2 | 5 | | |
| Total | | 100 | | |

Example 4

The liquid crystal composition of Example 4 was prepared with the compounds in percentages by weight shown in Table 1, filled between two substrates of a liquid crystal display, and subjected to performance test. The test data is shown in the table below.

TABLE 7

Formulation of liquid crystal composition and performances tested

| Code of component | Code of structure | Content, % | Test result of performance parameters | |
|---|---|---|---|---|
| 3CPPC3 | VI-1-4 | 5 | Δn | 0.1 |
| 3PGUQPCF3 | Ia-3 | 10 | Δε | 5.9 |
| 5CC2 | IV-1-4 | 10 | Cp | 68.2 |
| 3CCP1 | IV-3-8 | 3 | VHR (initial) | 97.40 |
| 4CCPF | V-10-3 | 3 | VHR (UV) | 95.50 |
| 3CCV | IV-1-12 | 40 | VHR (high temperature) | 94.30 |
| 3PUQUF | II-8-2 | 4 | maximum absolute transmittance/% | 28.1 |
| 5PP1 | III-4-1 | 5 | | |
| 2IUQUF | II-14-1 | 5 | | |
| 3IUQUF | II-14-2 | 5 | | |
| 3PGUQUF | II-9-2 | 5 | | |
| 5PGUQUF | II-9-4 | 5 | | |
| Total | | 100 | | |

Example 5

The liquid crystal composition of Example 5 was prepared with the compounds in percentages by weight shown in Table 8, filled between two substrates of a liquid crystal display, and subjected to performance test. The test data is shown in the table below.

TABLE 8

Formulation of liquid crystal composition and performances tested

| Code of component | Code of structure | Content, % | Test result of performance parameters | |
|---|---|---|---|---|
| 3CP2 | IV-2-5 | 5 | Δn | 0.113 |
| 3CPO2 | IV-2-18 | 6 | Δε | 5.61 |
| 3CPPC2 | VI-1-3 | 5 | Cp | 75.3 |
| 3CPPC3 | VI-1-4 | 5 | VHR (initial) | 96.40 |
| 3CPPF | V-10-2 | 5 | VHR (UV) | 94.30 |
| 3CCUF | V-3-2 | 9 | VHR (high temperature) | 96.10 |
| 3PGUQPOCF3 | Ib-3 | 10 | maximum absolute transmittance/% | 27.3 |
| 3CCV | IV-1-12 | 30 | | |
| 3PPO2 | III-2-5 | 5 | | |
| 2PUQUF | II-8-1 | 5 | | |
| 2IUQUF | II-14-1 | 5 | | |
| 3IUQUF | II-14-2 | 5 | | |
| 3PGUQUF | II-9-2 | 5 | | |
| Total | | 100 | | |

Example 6

The liquid crystal composition of Example 6 was prepared with the compounds in percentages by weight shown in Table 9, filled between two substrates of a liquid crystal display, and subjected to performance test. The test data is shown in the table below.

TABLE 9

Formulation of liquid crystal composition and performances tested

| Code of component | Code of structure | Content, % | Test result of performance parameters | |
|---|---|---|---|---|
| 4PGUQPCF3 | Ia-4 | 2 | Δn | 0.103 |
| 3CPGF | V-4-2 | 8 | Δε | 4.4 |
| 5PGUQPOCF3 | Ib-5 | 13 | Cp | 68.4 |
| 4CC3 | IV-1-6 | 10 | VHR (initial) | 97.80 |
| 3CCV | IV-1-12 | 42 | VHR (UV) | 95.60 |
| 3CCUF | V-3-2 | 5 | VHR (high temperature) | 96.80 |
| 3IUQUF | II-14-2 | 5 | maximum absolute transmittance/% | 27.6 |
| 3PPO2 | III-2-5 | 5 | | |
| 5PP1 | III-4-1 | 5 | | |
| 5PGUQUF | II-9-4 | 5 | | |
| Total | | 100 | | |

Example 7

The liquid crystal composition of Example 7 was prepared with the compounds in percentages by weight shown in Table 10, filled between two substrates of a liquid crystal display, and subjected to performance test. The test data is shown in the table below.

TABLE 10

Formulation of liquid crystal composition and performances tested

| Code of component | Code of structure | Content, % | Test result of performance parameters | |
|---|---|---|---|---|
| 3CPO2 | IV-2-18 | 10 | Δn | 0.12 |
| 4PGUQPOCF3 | Ib-4 | 2 | Δε | 7.9 |
| 3CPGF | V-4-2 | 8 | Cp | 62 |
| 3PGUQPCF3 | Ia-3 | 13 | VHR (initial) | 96.50 |
| 3CC2 | IV-1-2 | 15 | VHR (UV) | 95.30 |
| 5CC2 | IV-1-4 | 10 | VHR (high temperature) | 94.30 |
| 3CCV | IV-1-12 | 12 | maximum absolute transmittance/% | 26.9 |
| 4PPO2 | III-3-6 | 5 | | |
| 3PUQUF | II-8-2 | 5 | | |
| 3IUQUF | II-14-2 | 5 | | |
| 3PGUQUF | II-9-2 | 10 | | |
| 5PGUQUF | II-9-4 | 5 | | |
| Total | | 100 | | |

Example 8

The liquid crystal composition of Example 8 was prepared with the compounds in percentages by weight shown in Table 11, filled between two substrates of a liquid crystal display, and subjected to performance test. The test data is shown in the table below.

TABLE 11

Formulation of liquid crystal composition and performances tested

| Code of component | Code of structure | Content, % | Test result of performance parameters | |
|---|---|---|---|---|
| 2PGUQPCF3 | Ia-2 | 5 | Δn | 0.094 |
| 3CPPC3 | VI-1-4 | 5 | Δε | 6.35 |

TABLE 11-continued

Formulation of liquid crystal composition and performances tested

| Code of component | Code of structure | Content, % | Test result of performance parameters | |
|---|---|---|---|---|
| 3PGUQPOCF3 | Ib-3 | 5 | Cp | 73.4 |
| 3CCPF | V-10-2 | 5 | VHR (initial) | 97.00 |
| 3CCUF | V-3-2 | 10 | VHR (UV) | 95.20 |
| 3CC2 | IV-1-2 | 10 | VHR (high temperature) | 94.30 |
| 2CCQUF | II-3-1 | 5 | maximum absolute transmittance/% | 26.9 |
| 3CCQUF | II-3-2 | 5 | | |
| 3CCV | IV-1-12 | 25 | | |
| 5PPO1 | III-4-6 | 10 | | |
| 3PUQUF | II-8-2 | 5 | | |
| 2PUQUF | II-8-1 | 5 | | |
| 3IGUQUF | II-16-2 | 5 | | |
| Total | | 100 | | |

Example 9

The liquid crystal composition of Example 9 was prepared with the compounds in percentages by weight shown in Table 12, filled between two substrates of a liquid crystal display, and subjected to performance test. The test data is shown in the table below.

TABLE 12

Formulation of liquid crystal composition and performances tested

| Code of component | Code of structure | Content, % | Test result of performance parameters | |
|---|---|---|---|---|
| 2PGUQPOCF3 | Ib-2 | 8 | Δn | 0.114 |
| 3PGUQPOCF3 | Ib-3 | 5 | Δε | 9.84 |
| 4PGUQPOCF3 | Ib-4 | 4 | Cp | 88.3 |
| 5PGUQPOCF3 | Ib-5 | 5 | VHR (initial) | 95.20 |
| 3CCV | IV-1-12 | 36 | VHR (UV) | 91.60 |
| VCCP1 | IV-3-1 | 3 | VHR (high temperature) | 90.30 |
| 3CCPO2 | IV-3-11 | 4 | maximum absolute transmittance/% | 27.3 |
| 5PP1 | III-4-1 | 4 | | |
| 2CCPOCF3 | V-12-1 | 3 | | |
| 5CCGF | V-2-4 | 3 | | |
| 3CPUF | V-5-2 | 4 | | |
| 2CGUF | V-6-1 | 4 | | |
| 2PUQUF | II-8-1 | 7 | | |
| 3PUQUF | II-8-2 | 10 | | |
| Total | | 100 | | |

Example 10

The liquid crystal composition of Example 10 was prepared with the compounds in percentages by weight shown in Table 13, filled between two substrates of a liquid crystal display, and subjected to performance test. The test data is shown in the table below.

TABLE 13

Formulation of liquid crystal composition and performances tested

| Code of component | Code of structure | Content, % | Test result of performance parameters | |
|---|---|---|---|---|
| 2PGUQPCF3 | Ia-2 | 8 | Δn | 0.102 |
| 3PGUQPCF3 | Ia-3 | 5 | Δε | 6.26 |
| 4PGUQPCF3 | Ia-4 | 4 | Cp | 83.5 |
| 5PGUQPCF3 | Ia-5 | 5 | VHR (initial) | 97.20 |
| 3CCV | IV-1-12 | 44 | VHR (UV) | 96.30 |
| 3CCPO2 | IV-3-11 | 4 | VHR (high temperature) | 95.50 |
| 4PGPC3 | VI-3-6 | 3 | maximum absolute transmittance/% | 28.7 |
| 5PPO2 | III-4-7 | 6 | | |
| 3CCPGF | V-9-2 | 4 | | |
| 4CCPUF | V-7-3 | 3 | | |
| 3CCGUF | V-8-2 | 4 | | |
| 2PUQUF | II-8-1 | 5 | | |
| 3PUQUF | II-8-2 | 5 | | |
| Total | | 100 | | |

Example 11

The liquid crystal composition of Example 11 was prepared with the compounds in percentages by weight shown in Table 14, filled between two substrates of a liquid crystal display, and subjected to performance test. The test data is shown in the table below.

TABLE 14

Formulation of liquid crystal composition and performances tested

| Code of component | Code of structure | Content, % | Test result of performance parameters | |
|---|---|---|---|---|
| 2PGUQPOCF3 | Ib-2 | 7 | Δn | 0.106 |
| 3PGUQPOCF3 | Ib-3 | 8 | Δε | 10.33 |
| 2PGUQPCF3 | Ia-2 | 7 | Cp | 80 |
| 3PGUQPCF3 | Ia-3 | 8 | VHR (initial) | 97.60 |
| C(5)PUQUF | II-11-1 | 2 | VHR (UV) | 95.40 |
| D(5)PUQUF | II-13-1 | 3 | VHR (high temperature) | 95.70 |
| C(5)CCQUF | II-10-1 | 3 | maximum absolute transmittance/% | 27.1 |
| 3ACQUF | II-4-2 | 3 | | |
| 3DCQUF | II-5-2 | 4 | | |
| 4AUQUF | II-6-3 | 2 | | |
| 2DUQUF | II-7-1 | 3 | | |
| 2CCUF | V-3-1 | 5 | | |
| 3CCUF | V-3-2 | 5 | | |
| 5PP1 | III-4-1 | 10 | | |
| 3CCV | IV-1-12 | 30 | | |
| Total | | 100 | | |

Example 12

The liquid crystal composition of Example 12 was prepared with the compounds in percentages by weight shown in Table 15, filled between two substrates of a liquid crystal display, and subjected to performance test. The test data is shown in the table below.

TABLE 15

Formulation of liquid crystal composition and performances tested

| Code of component | Code of structure | Content, % | Test result of performance parameters | |
|---|---|---|---|---|
| 2PGUQPCF3 | Ia-2 | 8 | Δn | 0.107 |
| 3PGUQPCF3 | Ia-3 | 5 | Δε | 6.51 |
| 4PGUQPCF3 | Ia-4 | 4 | Cp | 90.2 |
| 5PGUQPCF3 | Ia-5 | 5 | VHR (initial) | 97.50 |
| 3CCV | IV-1-12 | 44 | VHR (UV) | 95.90 |
| 3CCPO2 | IV-3-11 | 4 | VHR (high temperature) | 96.30 |
| 4PGPC3 | VI-3-6 | 3 | maximum absolute transmittance/% | 27.4 |
| 5PPO2 | III-4-7 | 6 | | |
| 3CCPGF | V-9-2 | 4 | | |
| 4CCPUOCF2(F)V(2F) | V-16-3 | 3 | | |
| 3CCGUOCF2(F)V(2F) | V-17-2 | 4 | | |
| 2PUQUF | II-8-1 | 5 | | |
| 3PUQUF | II-8-2 | 5 | | |
| Total | | 100 | | |

By comparison between Example 1 and Comparative Example 1 and between Example 2 and Comparative Example 2, it can be known that with similar optical anisotropy, dielectric anisotropy, and clearing point, stable and environmentally friendly liquid crystal compositions used in the present invention have better UV and high temperature stability, high voltage holding ratio, and high optical transmitance.

In conjunction with Examples 1 to 12, it can be known that the liquid crystal compositions of the present invention have suitable optical anisotropy, dielectric anisotropy, and clearing point, better UV and high temperature stability, high voltage holding ratio, and higher optical transmitance.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

What is claimed is:

1. A liquid crystal composition, comprising:

1-30% of one or more compounds of general formula I based on the total weight of the liquid crystal composition

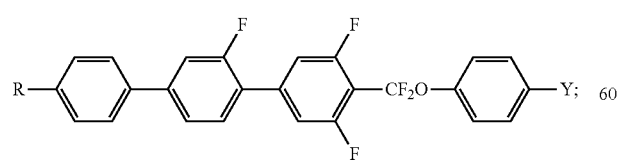

I 1-50% of one or more compounds of general formula II based on the total weight of the liquid crystal composition

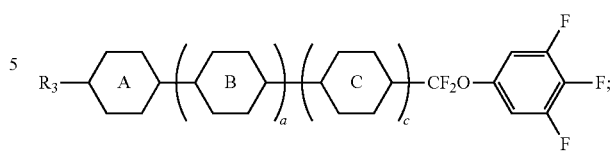

II 1-20% of one or more compounds of general formula III based on the total weight of the liquid crystal composition

III 20-70% of one or more compounds of general formula IV based on the total weight of the liquid crystal composition

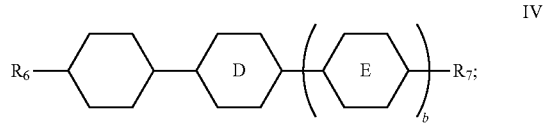

IV and 1-30% of one or more compounds of general formula V based on the total weight of the liquid crystal composition

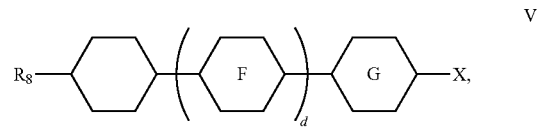

V wherein,

R and $R_8$ are the same or different and each independently represent an alkyl group having 1 to 7 carbon atoms;

$R_3$ represents H or an alkyl group having 1 to 7 carbon atoms;

$R_4$ and $R_5$ are the same or different and each independently represent an alkyl group having 1 to 7 carbon atoms or an alkoxy group having 1 to 7 carbon atoms;

$R_6$ and $R_7$ are the same or different and each independently represent an alkyl group having 1 to 7 carbon atoms, an alkoxy group having 1 to 5 carbon atoms, or an alkenyl group having 2 to 5 carbon atoms;

ring

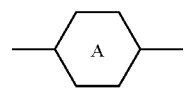

represents
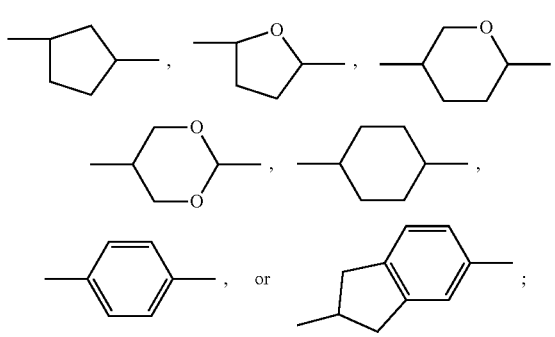
ring
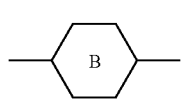
represents
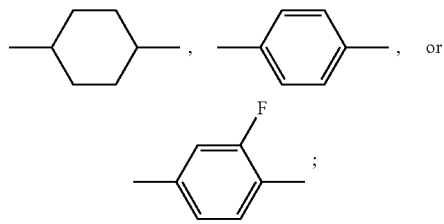
ring
represents
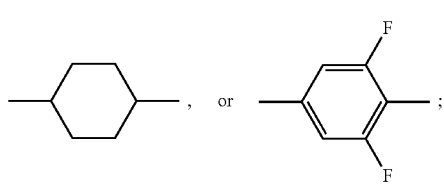
ring
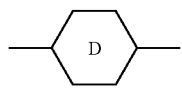
represents
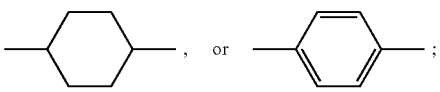
ring
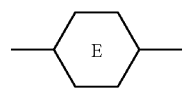
represents
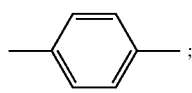
ring
represents
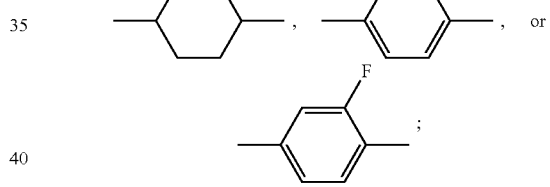
ring
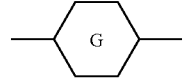
represents
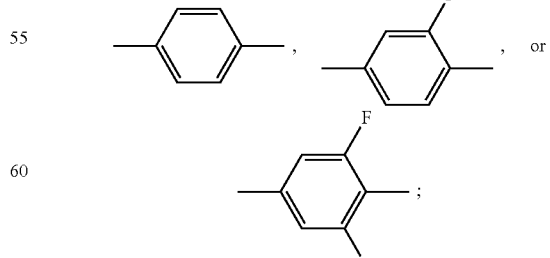
Y represents —CF₃ or —OCF₃; X represents —F, —OCF₃, or —OCF₂—CF=CF₂;

b and c are the same or different and each independently represent 0 or 1;

a and d are the same or different and each independently represent 0, 1 or 2;

when a is 2, rings

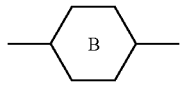

may be the same or different and each independently represent

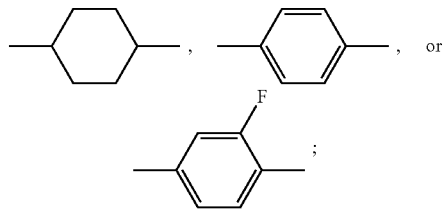

when d is 2, rings

may be the same or different and each independently represent

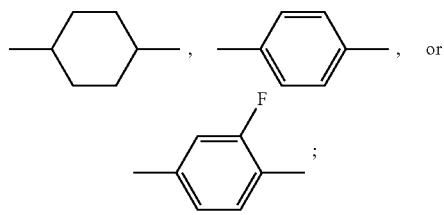

and when X is —OCF$_3$, ring

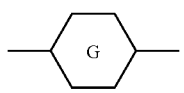

represents

.

2. The liquid crystal composition according to claim 1, wherein the compound of general formula I is selected from the group consisting of the following compounds:

wherein,

R$_1$ and R$_2$ are the same or different and each independently represent an alkyl group having 1 to 7 carbon atoms.

3. The liquid crystal composition according to claim 2, wherein the compound of general formula Ia is selected from the group consisting of the following compounds:

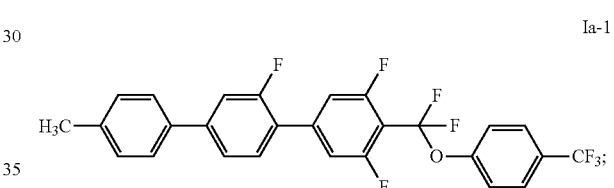

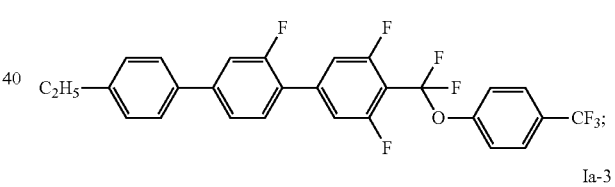

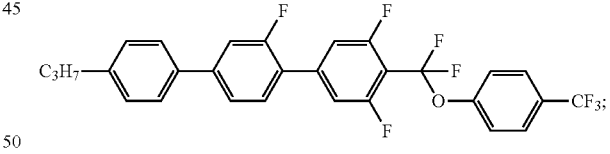

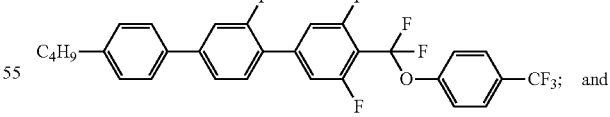

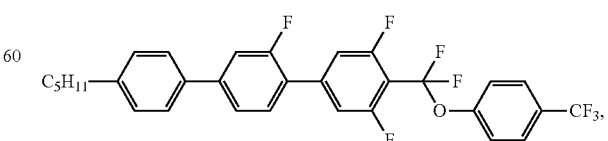

the compound of general formula Ib is selected from the group consisting of the following compounds:

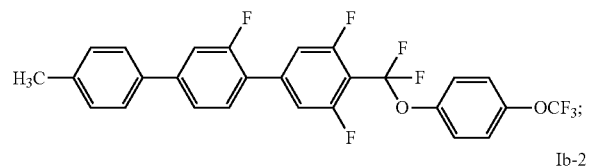
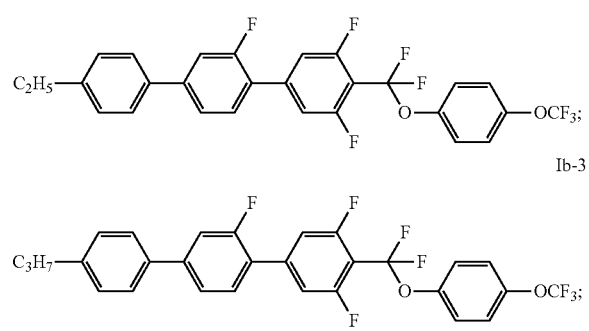
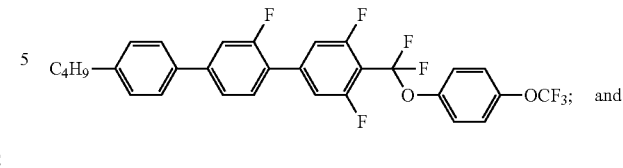
4. The liquid crystal composition according to claim 1, wherein
the compound of general formula II is selected from the group consisting of the following compounds:
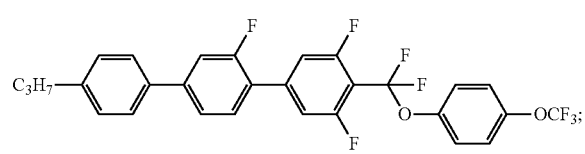
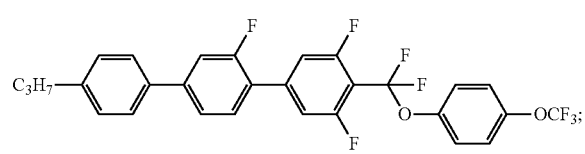

-continued

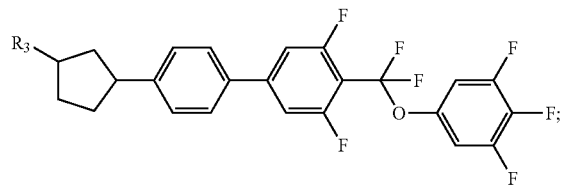
II-11

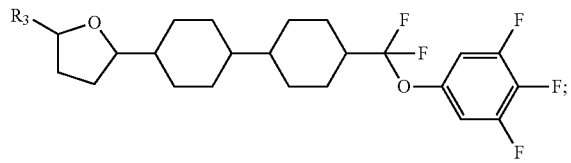
II-12

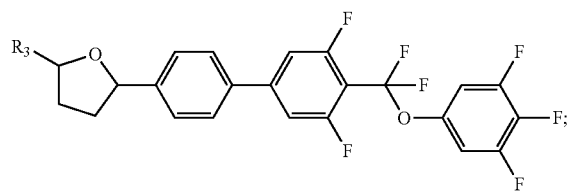
II-13

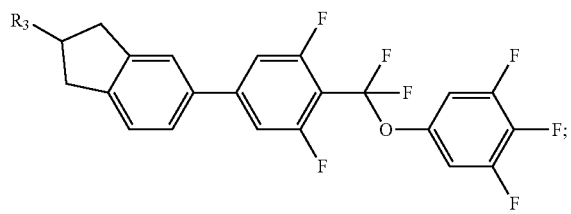
II-14

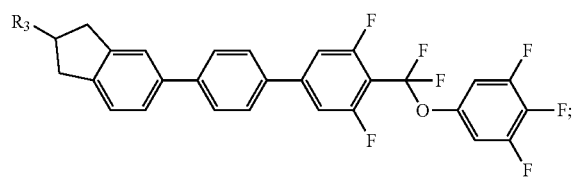
II-15

II-16

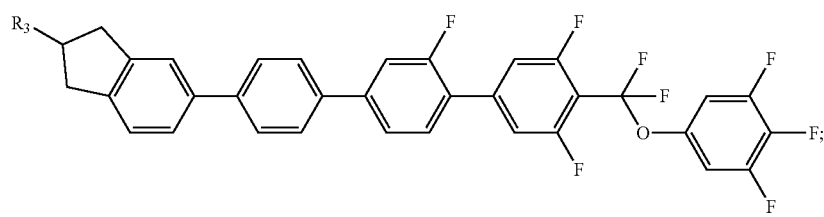
II-17 wherein, $R_3$ represents H or an alkyl group having 1 to 7 carbon atoms.

5. The liquid crystal composition according to claim 4, wherein the compound of general formula II-1 is selected from the group consisting of the following compounds:

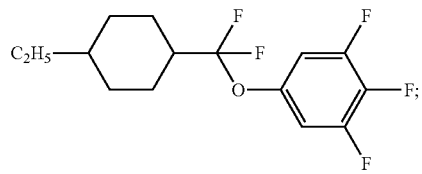
II-1-1

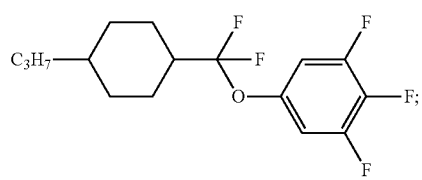
II-1-2

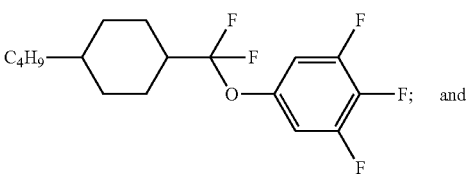
II-1-3

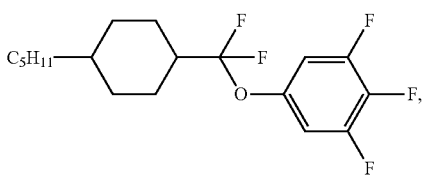
II-1-4 the compound of general formula II-2 is selected from the group consisting of the following compounds:

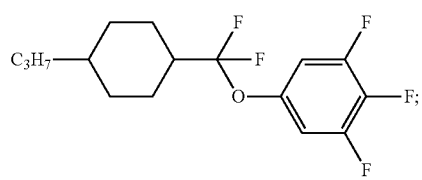
II-2-1

II-2-2
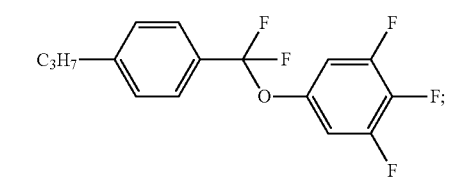
II-2-3
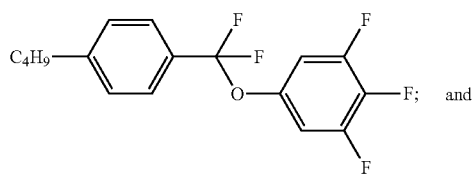
and
II-2-4
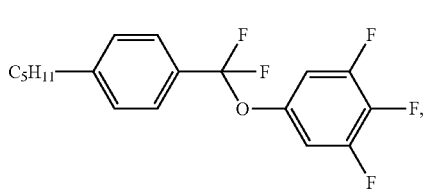
the compound of general formula II-3 is selected from the group consisting of the following compounds:
II-3-1
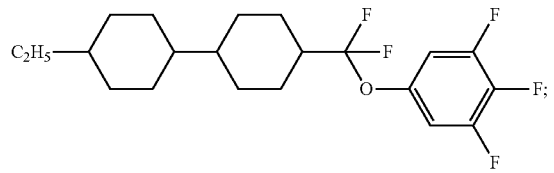
II-3-2
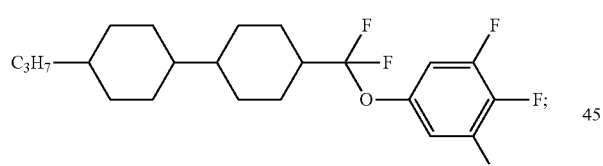
II-3-3
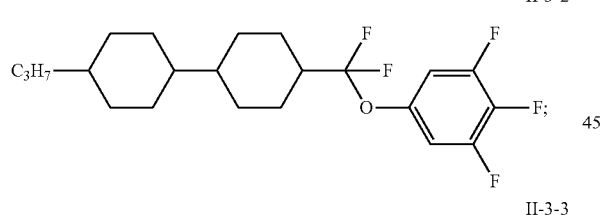
and
II-3-4
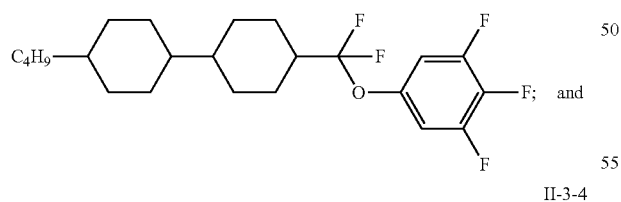
the compound of general formula II-4 is selected from the group consisting of the following compounds:
II-4-1
II-4-2
II-4-3
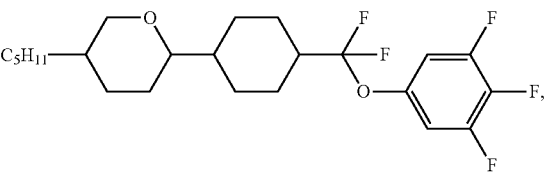
and
II-4-4
the compound of general formula II-5 is selected from the group consisting of the following compounds:
II-5-1
II-5-2
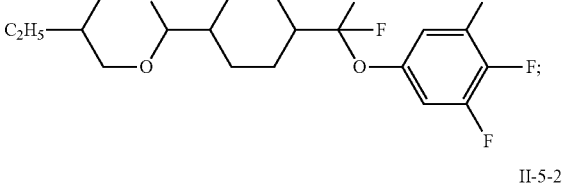
II-5-3
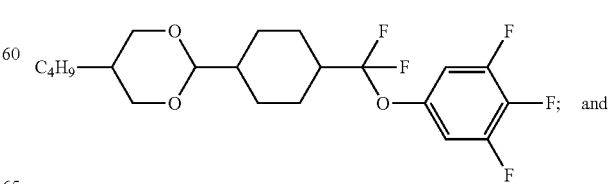
and

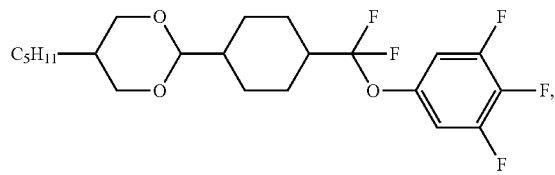
II-5-4
the compound of general formula II-6 is selected from the group consisting of the following compounds:
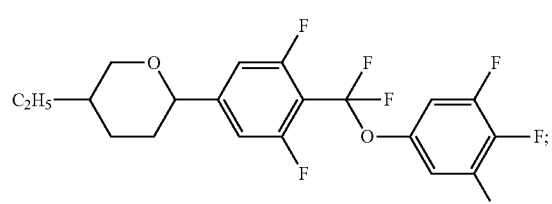
II-6-1
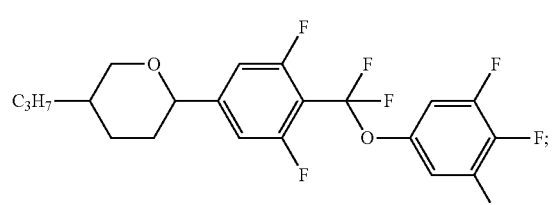
II-6-2
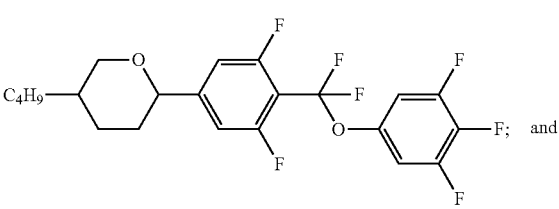
II-6-3
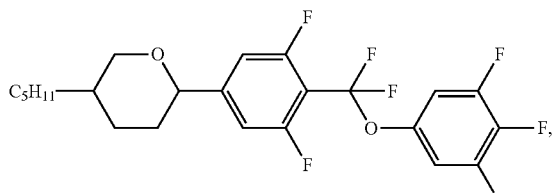
II-6-4
the compound of general formula II-7 is selected from the group consisting of the following compounds:
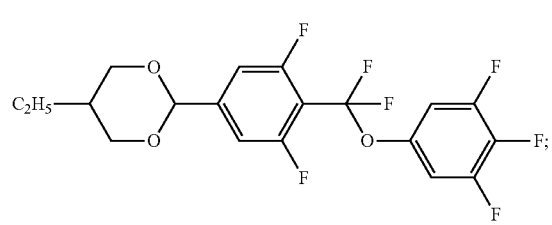
II-7-1
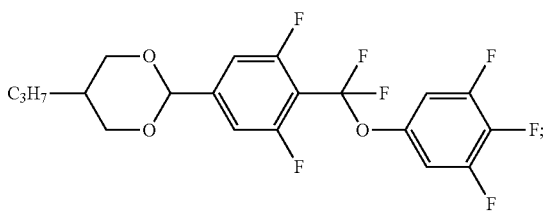
II-7-2
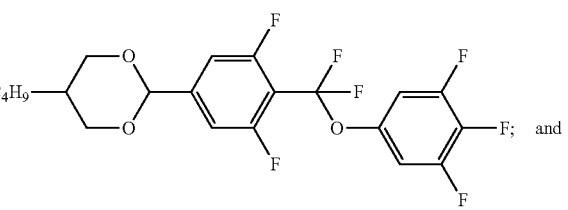
II-7-3
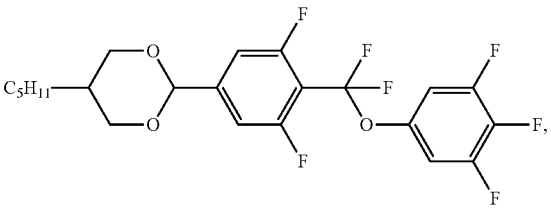
II-7-4
the compound of general formula II-8 is selected from the group consisting of the following compounds:
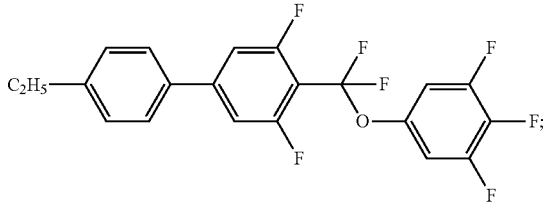
II-8-1
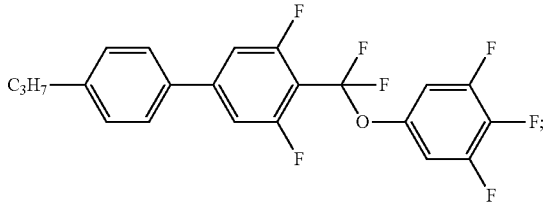
II-8-2
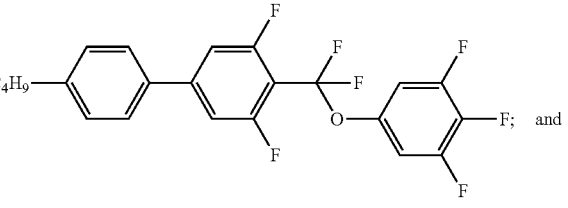
II-8-3

-continued

II-8-4
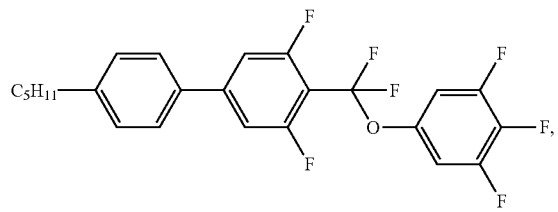

the compound of general formula II-9 is selected from the group consisting of the following compounds:

the compound of general formula II-10 is selected from the group consisting of the following compounds:

II-10-1
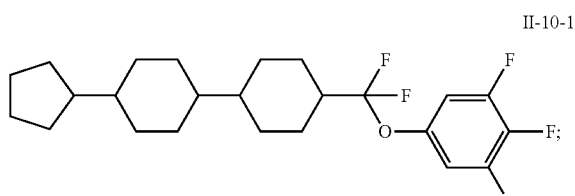

II-10-2
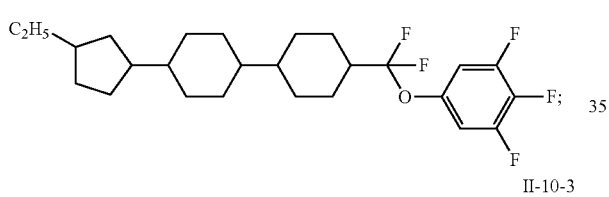

II-10-3
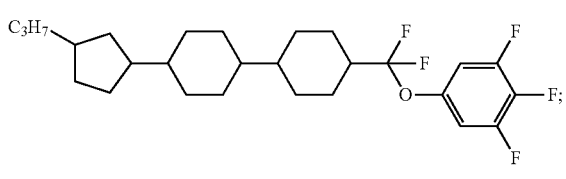

II-10-4
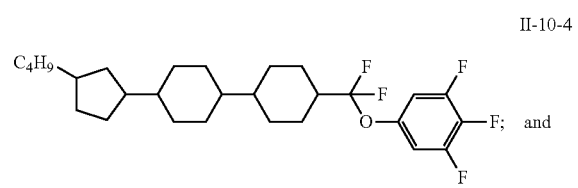

II-10-5
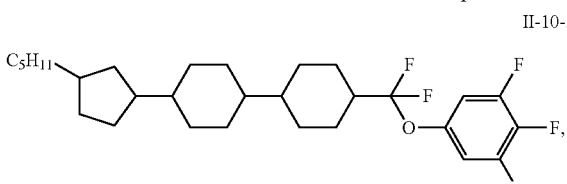

the compound of general formula II-11 is selected from the group consisting of the following compounds:

II-11-1
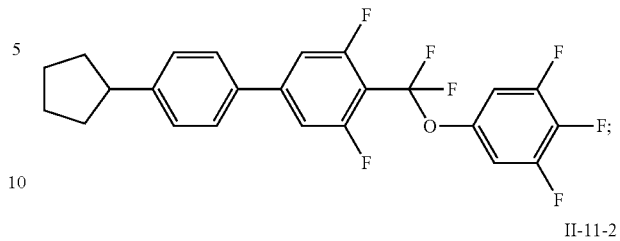

II-11-2

II-11-3
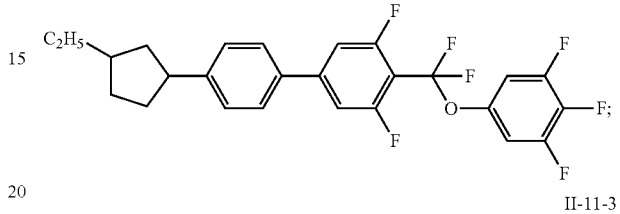

II-11-4

II-11-5 the compound of general formula 2 is selected from the group consisting of the following compounds:

II-12-1
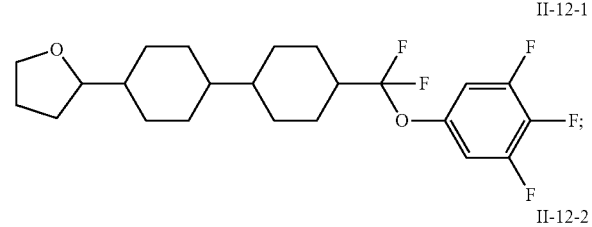

II-12-2
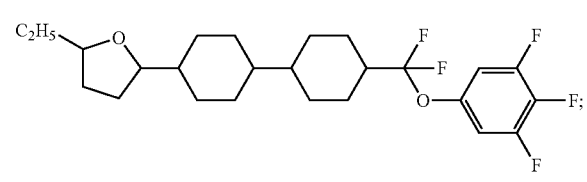

II-12-3
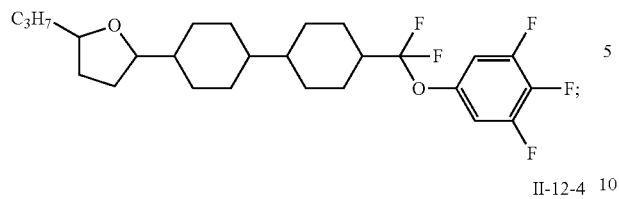
II-12-4
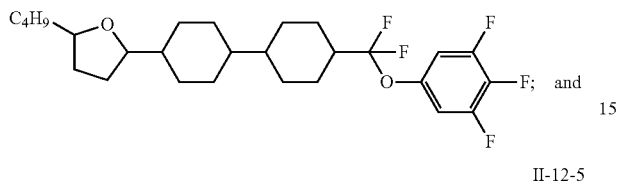
II-12-5
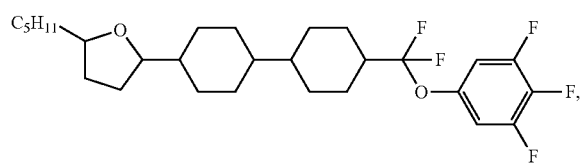
the compound of general formula II-13 is selected from the group consisting of the following compounds:
II-13-1
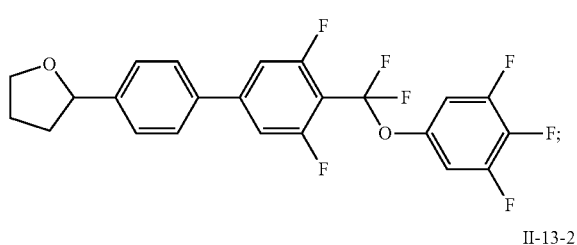
II-13-2
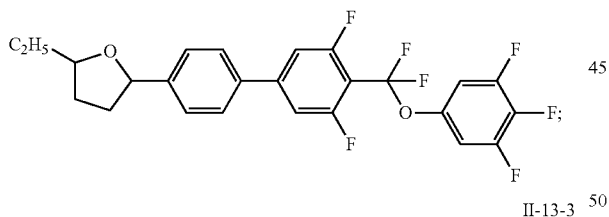
II-13-3
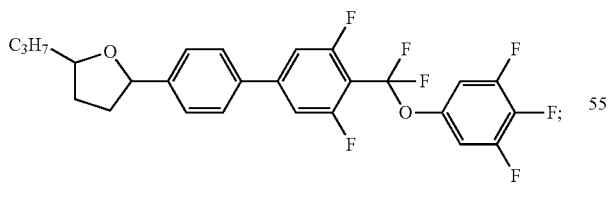
II-13-4
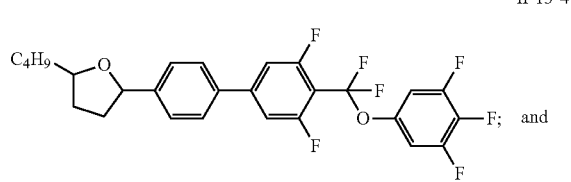
II-13-5
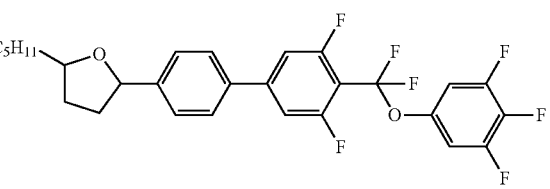
the compound of general formula II-14 is selected from the group consisting of the following compounds:
II-14-1
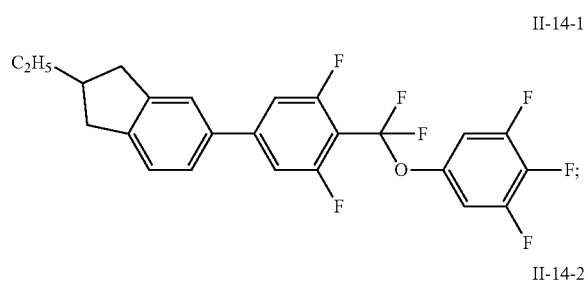
II-14-2
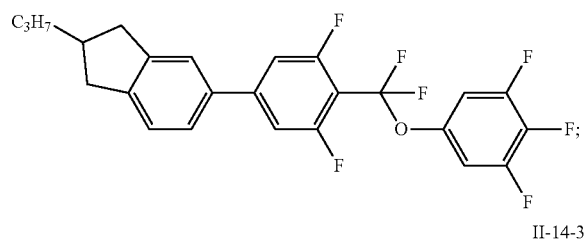
II-14-3
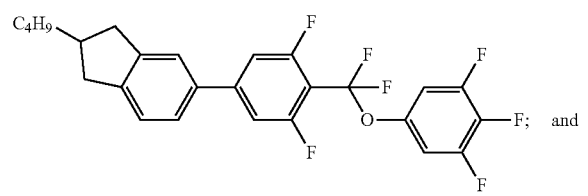
II-14-4
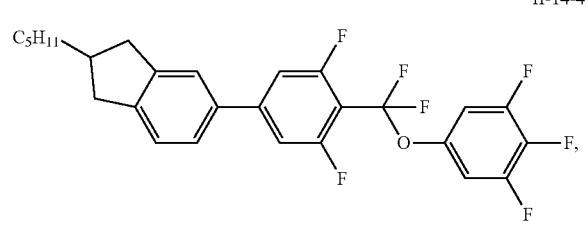
the compound of general formula II-15 is selected from the group consisting of the following compounds:
II-15-1
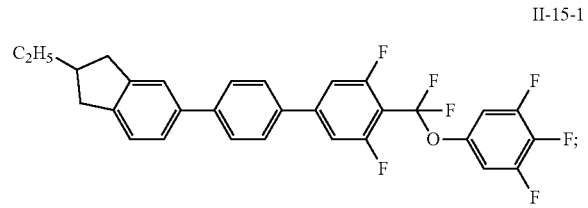

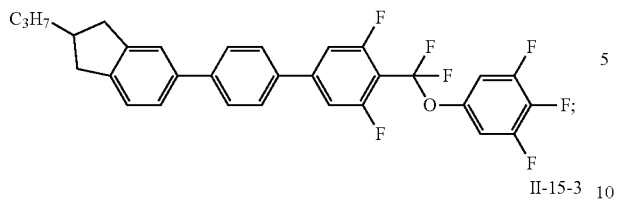
II-15-2
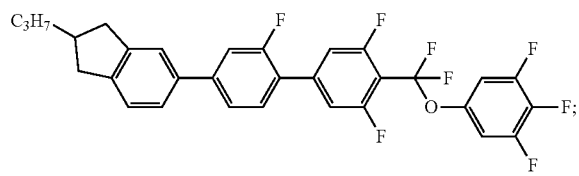
II-16-2
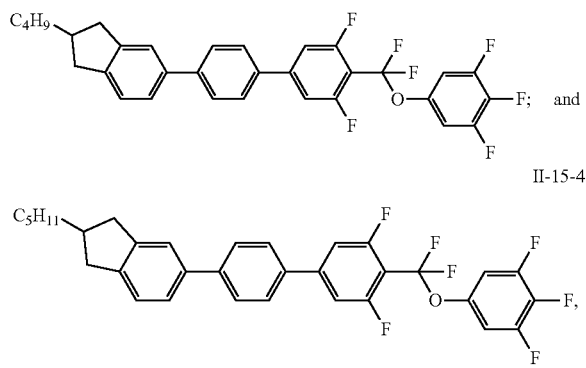
II-15-3 and II-15-4
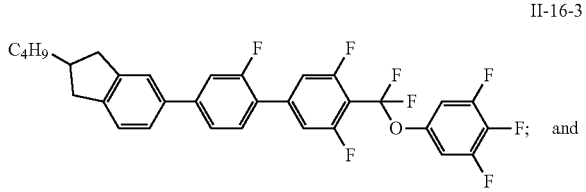
II-16-3
the compound of general formula II-16 is selected from the group consisting of the following compounds:
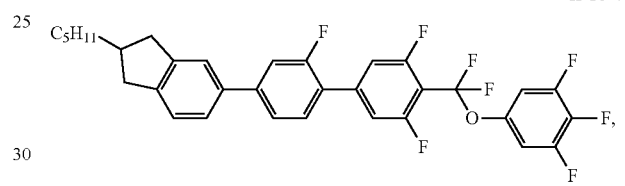
II-16-4
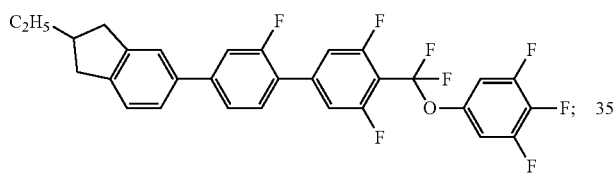
II-16-1
the compound of general formula II-17 is selected from the group consisting of the following compounds:
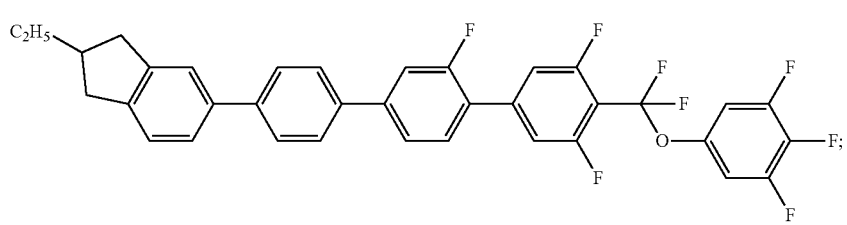
II-17-1
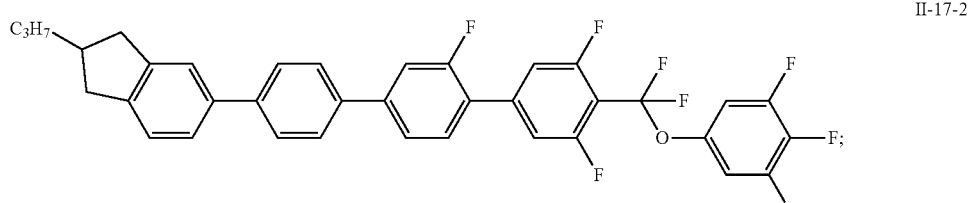
II-17-2
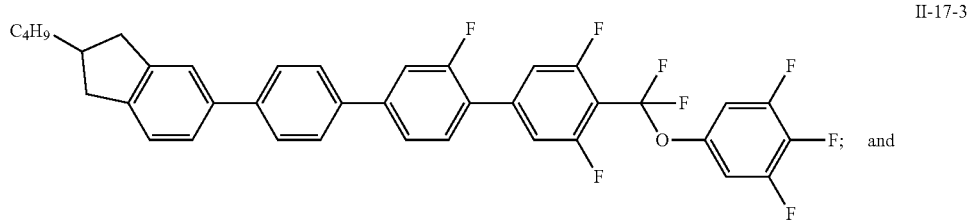
II-17-3 and

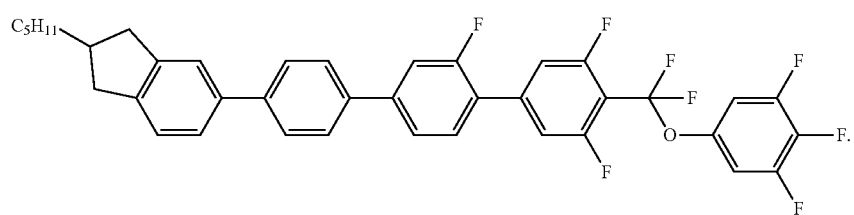

II-17-4

6. The liquid crystal composition according to claim 1, wherein the compound of general formula III is selected from the group consisting of the following compounds:

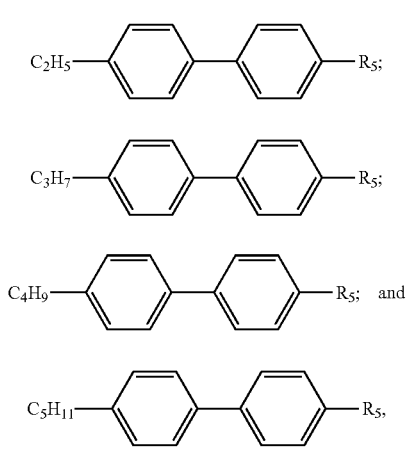

III-1

III-2

III-3

III-4 wherein,

R$_5$ represents an alkyl group having 1 to 5 carbon atoms or an alkoxy group having 1 to 5 carbon atoms.

7. The liquid crystal composition according to claim 6, wherein the compound of general formula III-1 is selected from the group consisting of the following compounds:

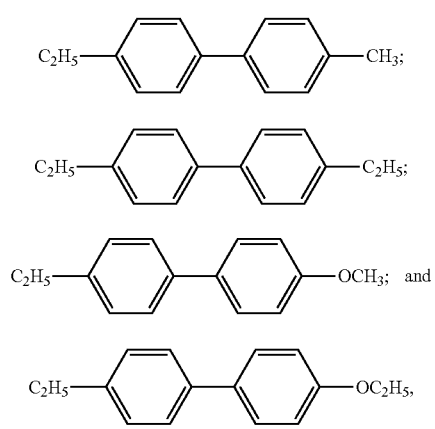

III-1-1

III-1-2

III-1-3

III-1-4 the compound of general formula 2 is selected from the group consisting of the following compounds:

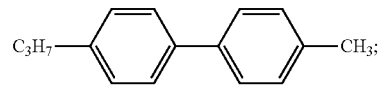

III-2-1

III-2-2

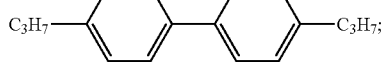

III-2-3

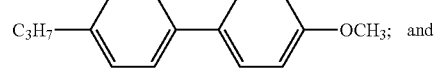

III-2-4

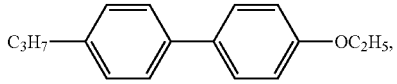

III-2-5 the compound of general formula III-3 is selected from the group consisting of the following compounds:

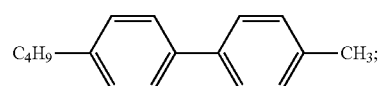

III-3-1

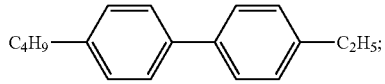

III-3-2

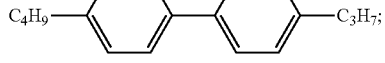

III-3-3

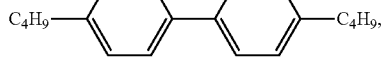

III-3-4

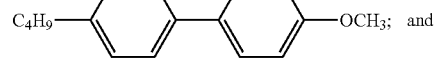

III-3-5

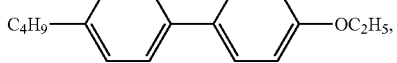

III-3-6 the compound of general formula III-4 is selected from the group consisting of the following compounds:

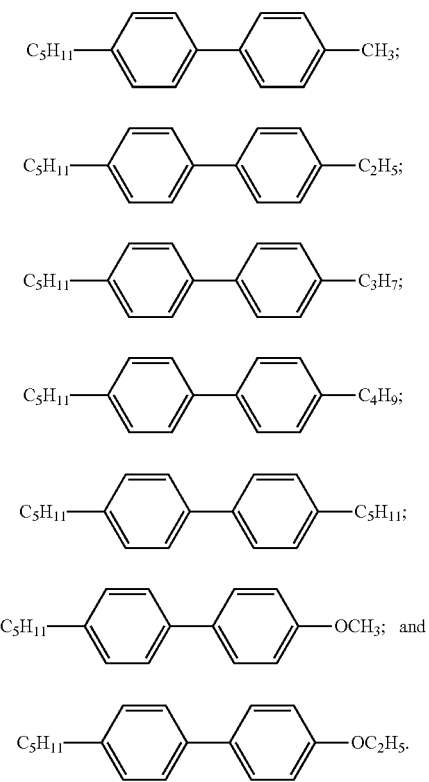

III-4-1
III-4-2
III-4-3
III-4-4
III-4-5
III-4-6
III-4-7

8. The liquid crystal composition according to claim 1, wherein the compound of general formula IV is selected from the group consisting of the following compounds:

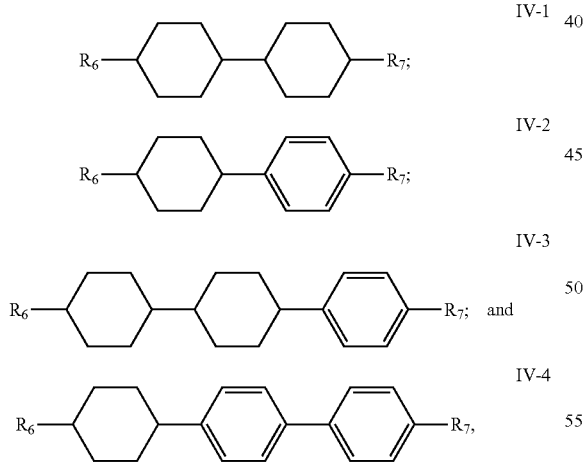

IV-1
IV-2
IV-3
IV-4 wherein, $R_6$ and $R_7$ are the same or different and each independently represent an alkyl group having 1 to 7 carbon atoms, an alkoxy group having 1 to 5 carbon atoms, or an alkenyl group having 2 to 5 carbon atoms.

9. The liquid crystal composition according to claim 8, wherein the compound of general formula IV-1 is selected from the group consisting of the following compounds:

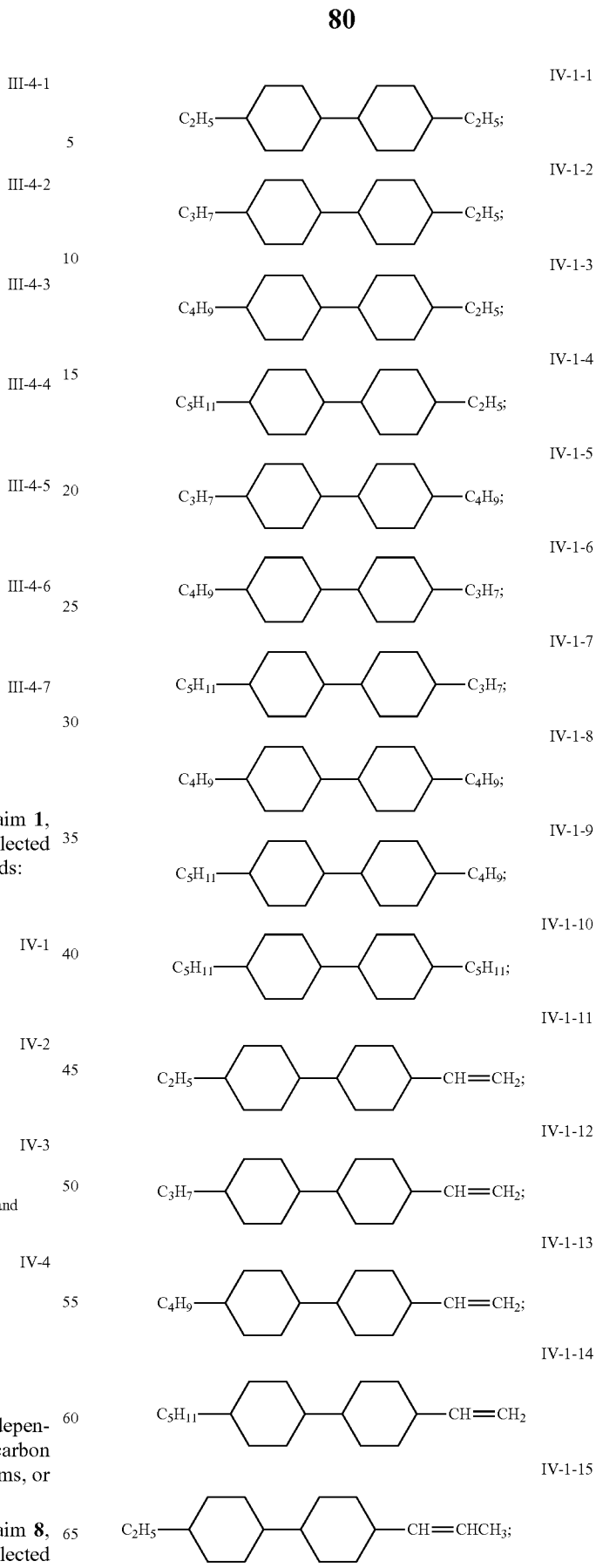

IV-1-1
IV-1-2
IV-1-3
IV-1-4
IV-1-5
IV-1-6
IV-1-7
IV-1-8
IV-1-9
IV-1-10
IV-1-11
IV-1-12
IV-1-13
IV-1-14
IV-1-15

IV-1-16
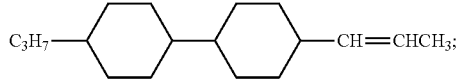
IV-1-17
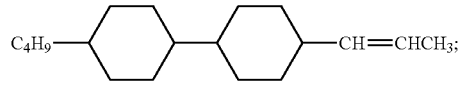 and
IV-1-18
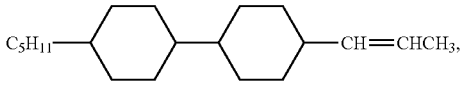
the compound of general formula IV-2 is selected from the group consisting of the following compounds:
IV-2-1
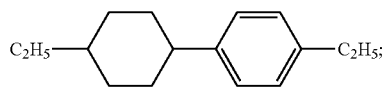
IV-2-2
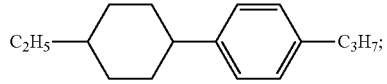
IV-2-3
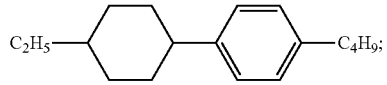
IV-2-4
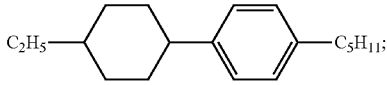
IV-2-5
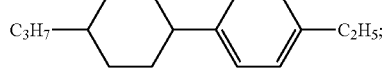
IV-2-6
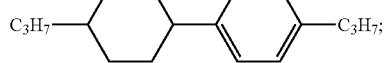
IV-2-7
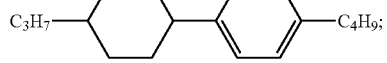
IV-2-8
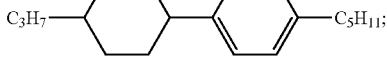
IV-2-9
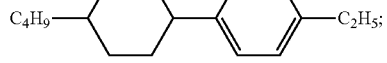
IV-2-10
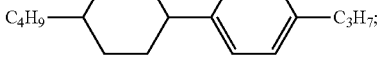
IV-2-11
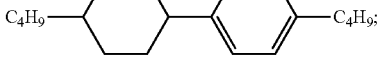
IV-2-12
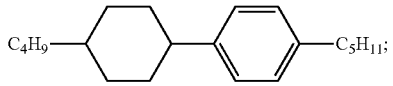
IV-2-13
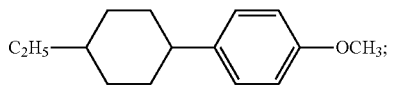
IV-2-14
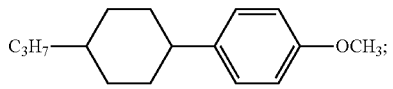
IV-2-15
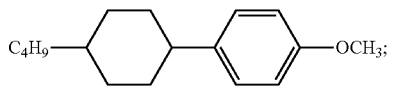
IV-2-16
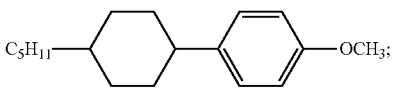
IV-2-17
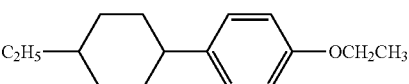
IV-2-18
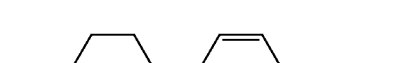
IV-2-19
IV-2-20
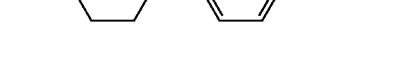
IV-2-21
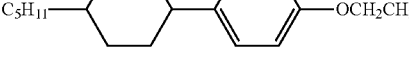 and
IV-2-22
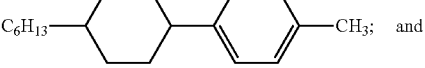
the compound of general formula IV-3 is selected from the group consisting of the following compounds:
IV-3-1
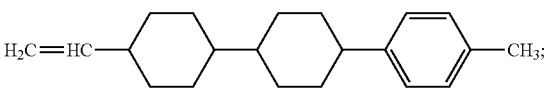
IV-3-2
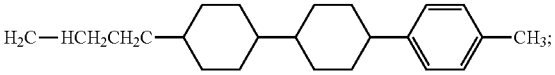

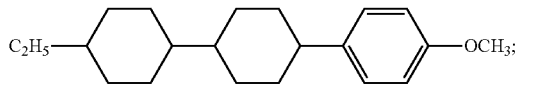
IV-3-3
IV-3-4
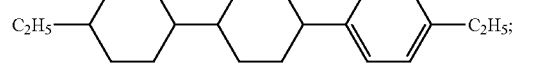
IV-3-5
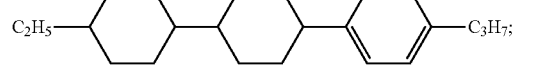
IV-3-6
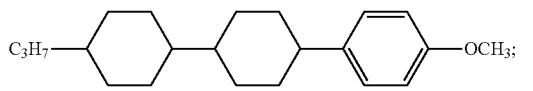
IV-3-7
IV-3-8
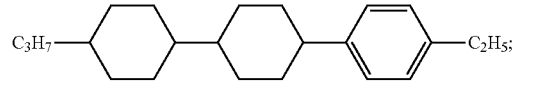
IV-3-9
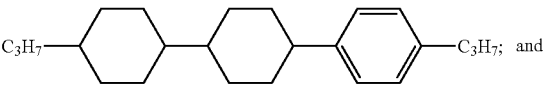
IV-3-10
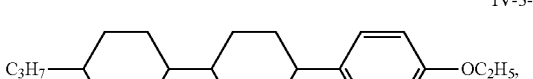
IV-3-11
the compound of general formula IV-4 is selected from the group consisting of the following compounds:
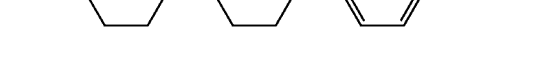
IV-4-1
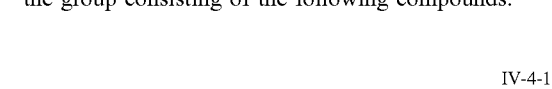
IV-4-2
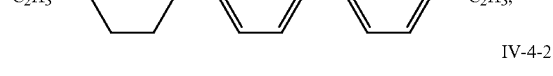
IV-4-3
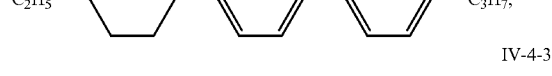
IV-4-4
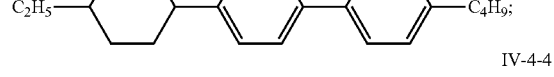
IV-4-5 (?)
IV-4-5
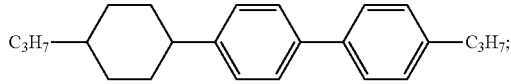
IV-4-6
IV-4-7
IV-4-8
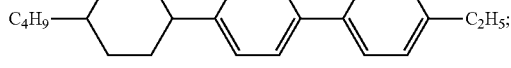
IV-4-9
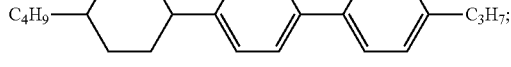
IV-4-10
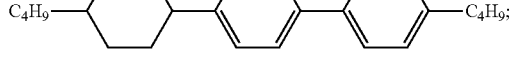
IV-4-11
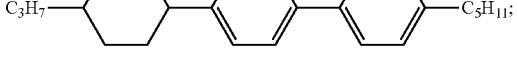
IV-4-12
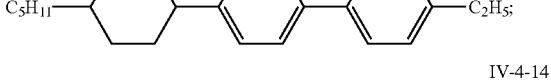
IV-4-13
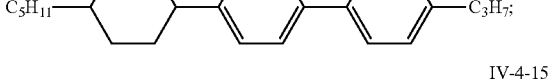
IV-4-14
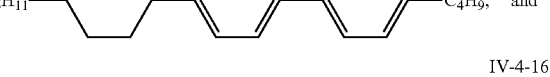
IV-4-15
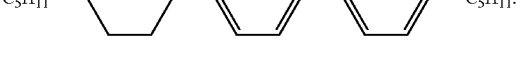
IV-4-16
10. The liquid crystal composition according to claim 1, wherein the compound of general formula V is selected from the group consisting of the following compounds:

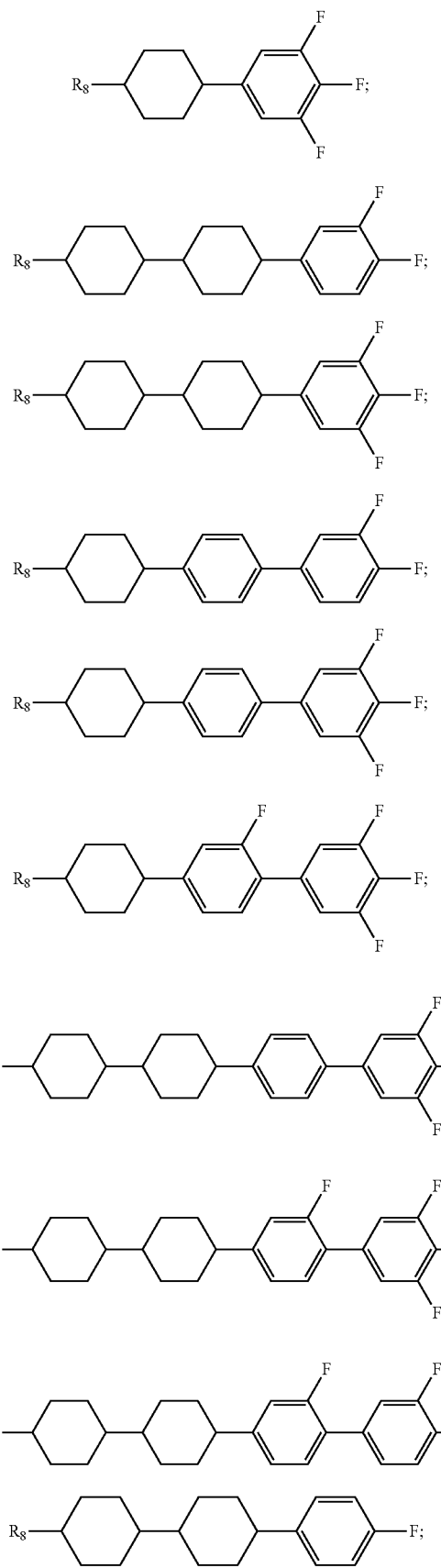
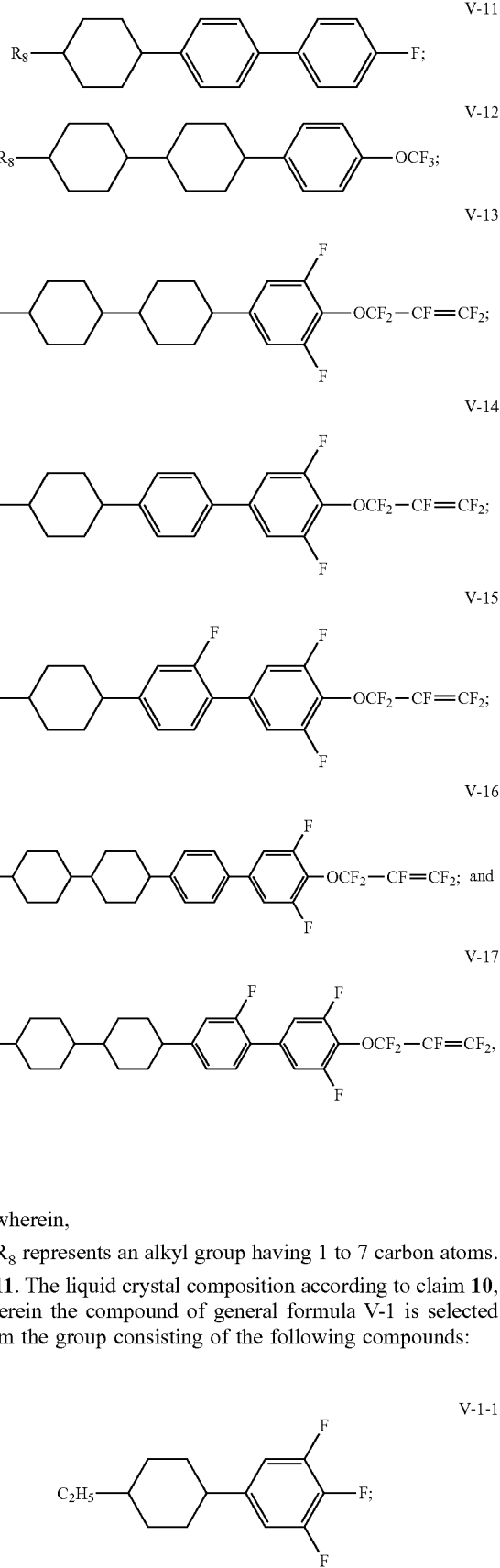
wherein,
R_8 represents an alkyl group having 1 to 7 carbon atoms.
11. The liquid crystal composition according to claim 10, wherein the compound of general formula V-1 is selected from the group consisting of the following compounds:
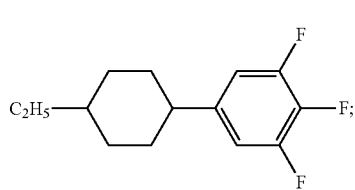

-continued

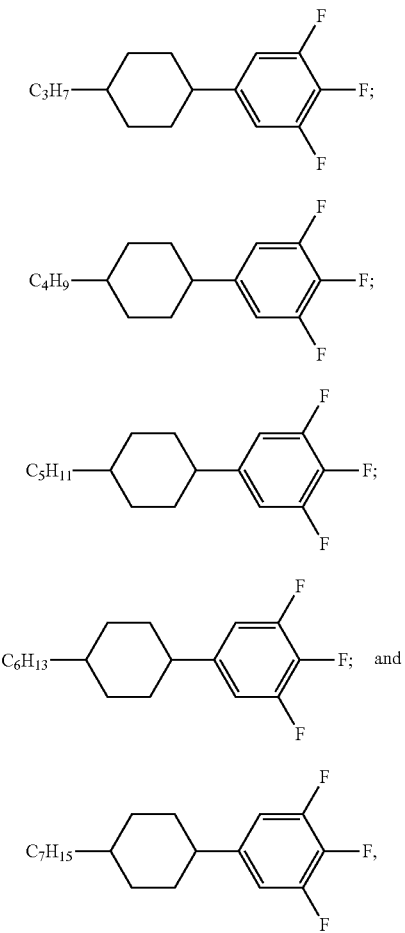

V-1-2

V-1-3

V-1-4

V-1-5

V-1-6 the compound of general formula V-2 is selected from the group consisting of the following compounds:

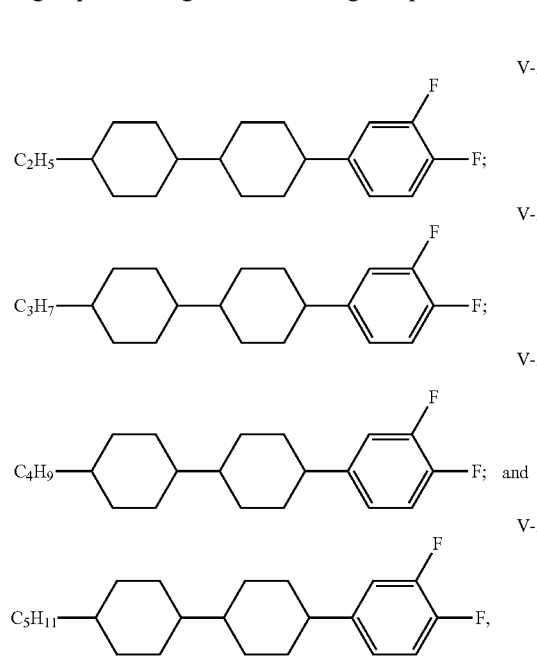

V-2-1

V-2-2

V-2-3

V-2-4 the compound of general formula V-3 is selected from the group consisting of the following compounds:

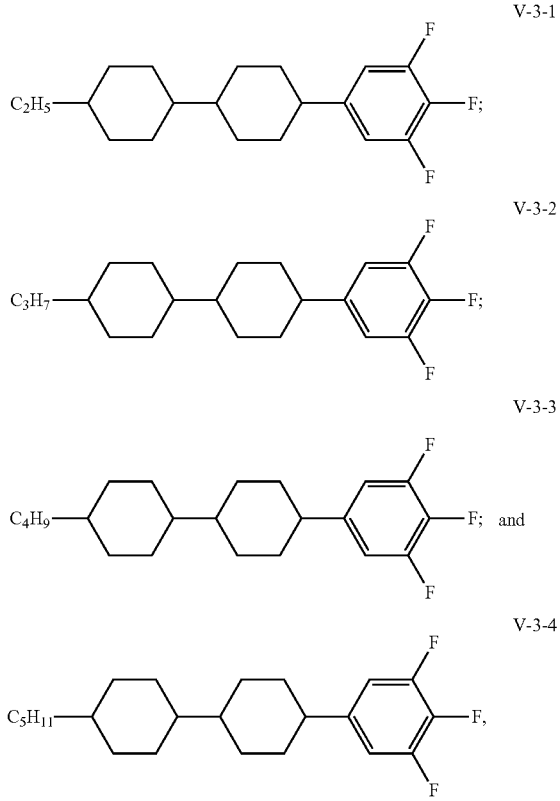

V-3-1

V-3-2

V-3-3

V-3-4 the compound of general formula V-4 is selected from the group consisting of the following compounds:

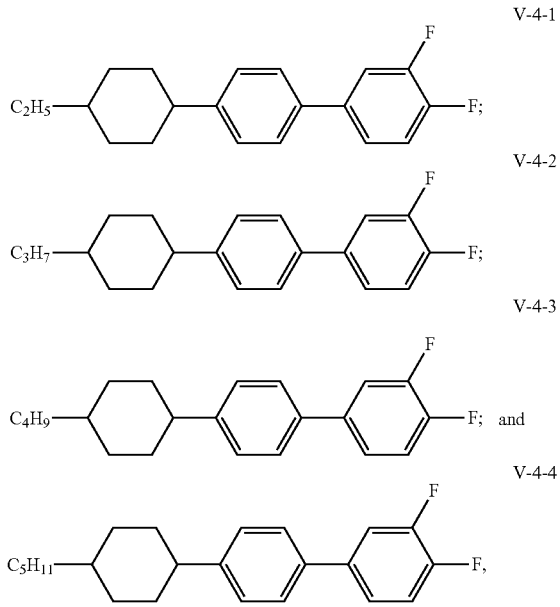

V-4-1

V-4-2

V-4-3

V-4-4 the compound of general formula V-5 is selected from the group consisting of the following compounds:

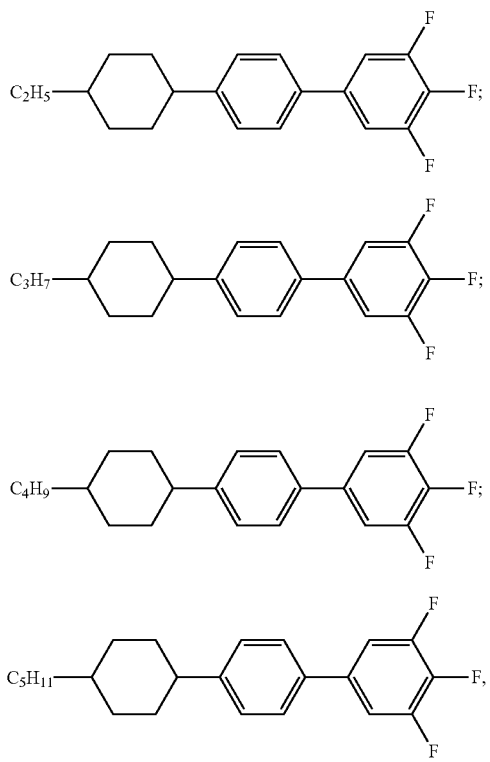
the compound of general formula V-6 is selected from the group consisting of the following compounds:
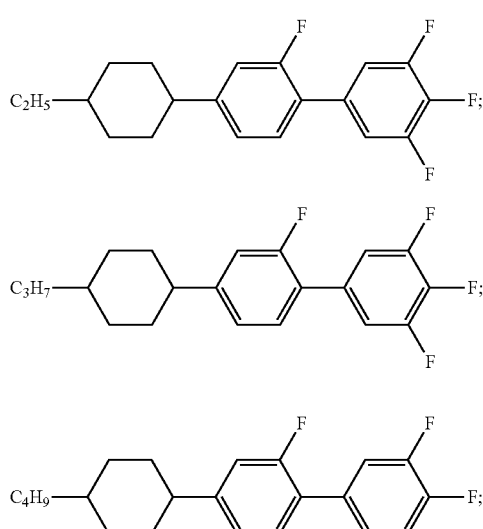
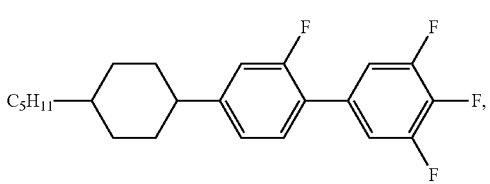
the compound of general formula V-7 is selected from the group consisting of the following compounds:
the compound of general formula V-8 is selected from the group consisting of the following compounds:
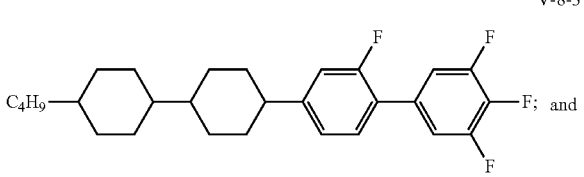

-continued

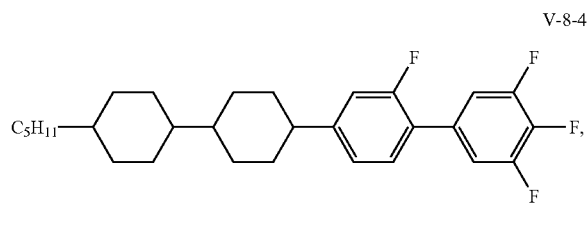
V-8-4 the compound of general formula V-9 is selected from the group consisting of the following compounds:

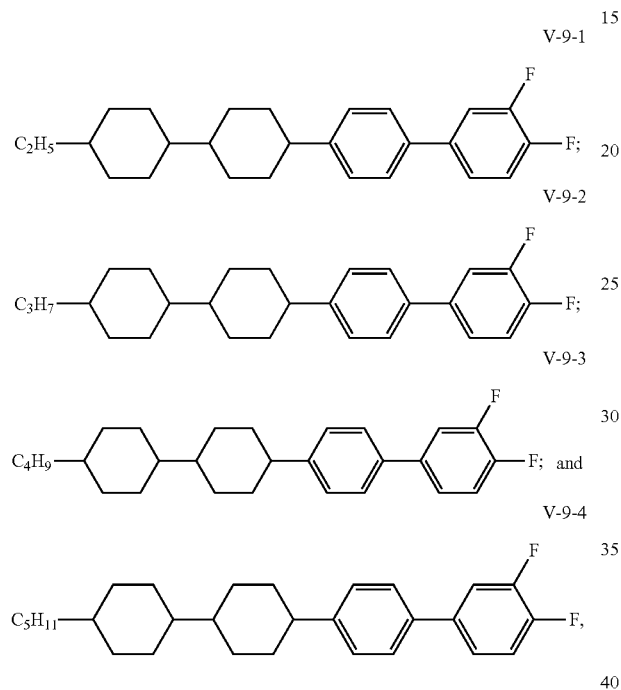
V-9-1
V-9-2
V-9-3
V-9-4 the compound of general formula V-10 is selected from the group consisting of the following compounds:

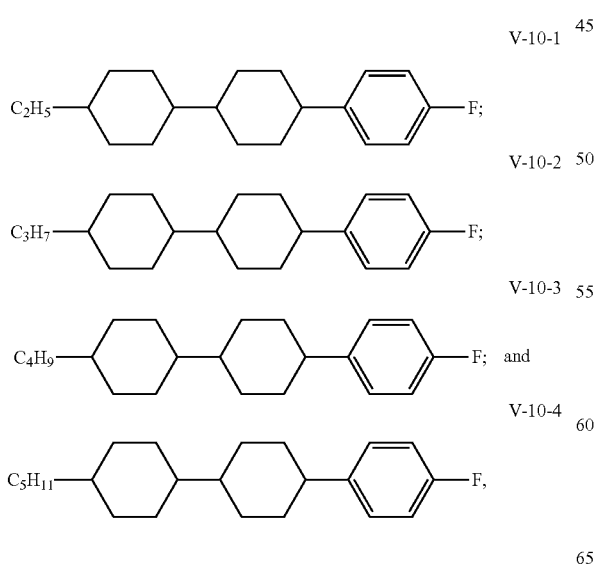
V-10-1
V-10-2
V-10-3
V-10-4 the compound of general formula V-11 is selected from the group consisting of the following compounds:

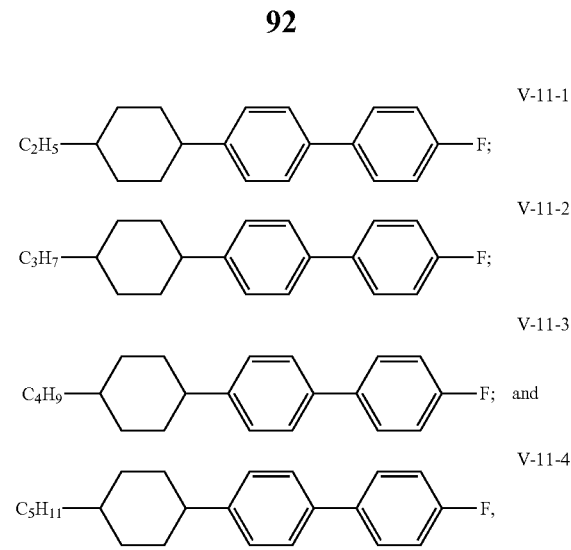
V-11-1
V-11-2
V-11-3
V-11-4 the compound of general formula V-12 is selected from the group consisting of the following compounds:

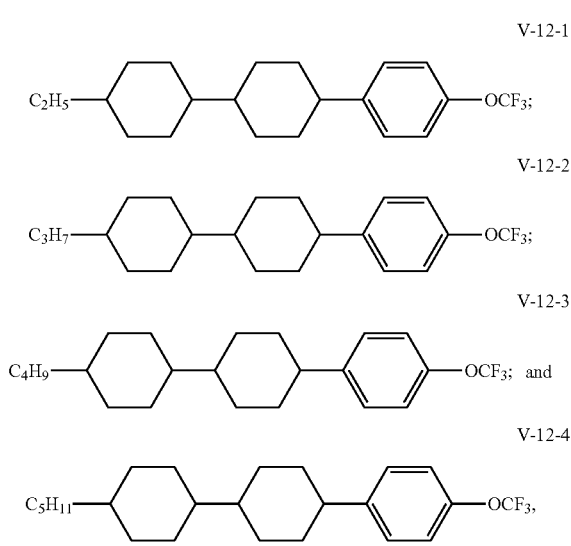
V-12-1
V-12-2
V-12-3
V-12-4 the compound of general formula V-13 is selected from the group consisting of the following compounds:

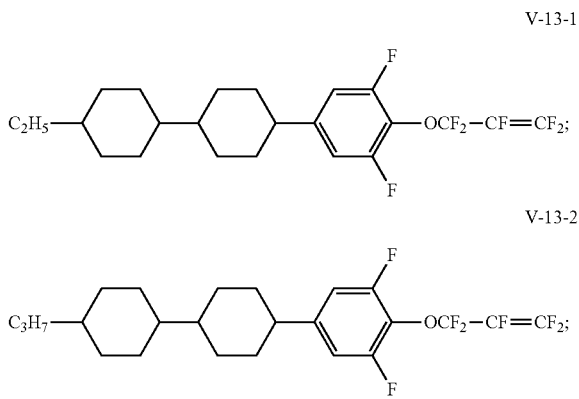
V-13-1
V-13-2

V-13-3
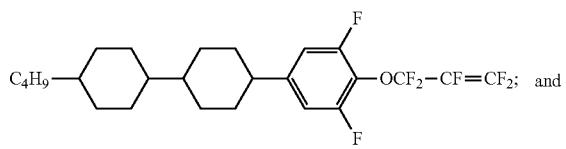
V-13-4
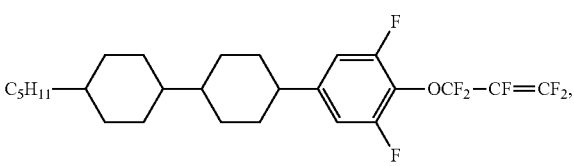
the compound of general formula V-14 is selected from the group consisting of the following compounds:
V-14-1
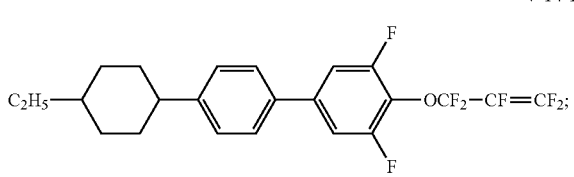
V-14-2
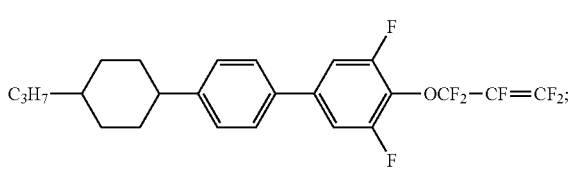
V-14-3
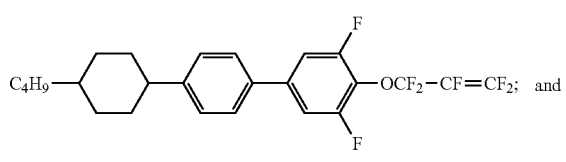
V-14-4
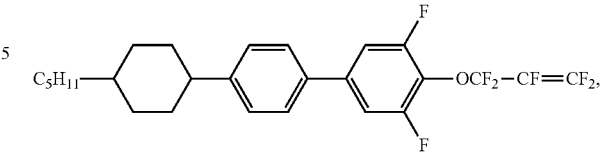
the compound of general formula V-15 is selected from the group consisting of the following compounds:
V-15-1
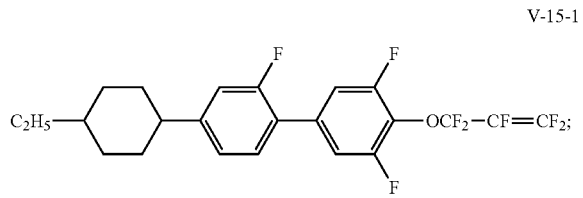
V-15-2
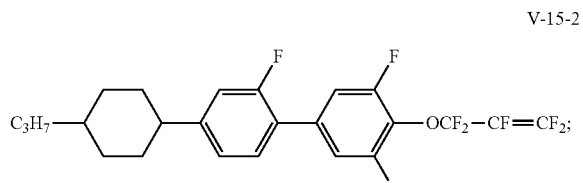
V-15-3
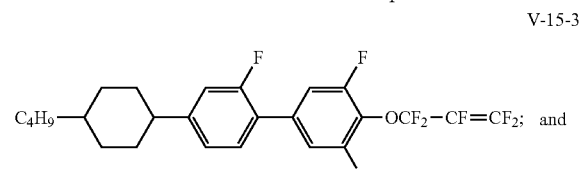
V-15-4
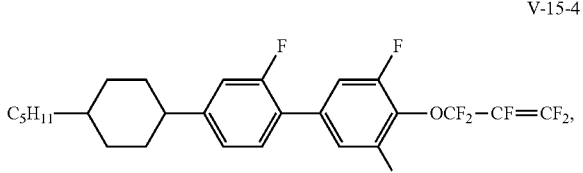
the compound of general formula V-16 is selected from the group consisting of the following compounds:
V-16-1
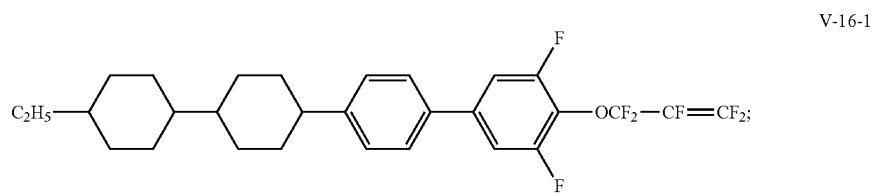
V-16-2
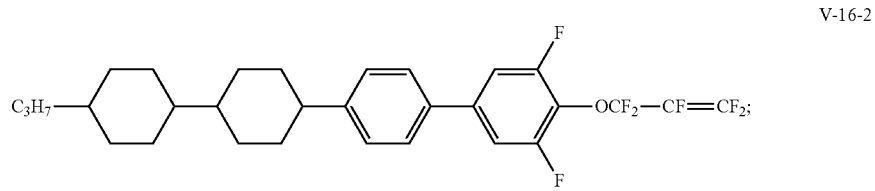

-continued

V-16-3
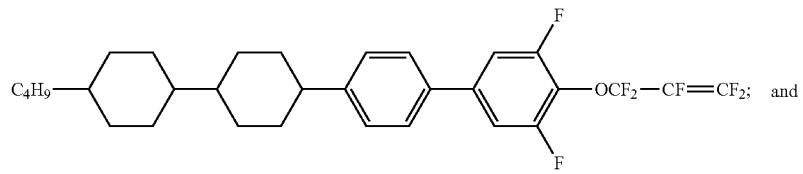
and

V-16-4
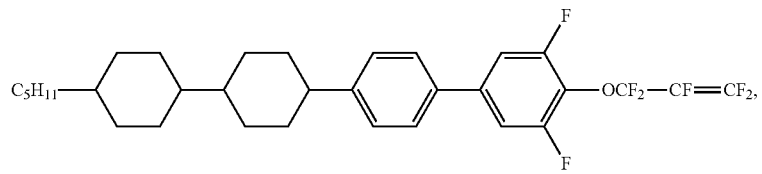

the compound of general formula V-17 is selected from the group consisting of the following compounds:

V-17-1
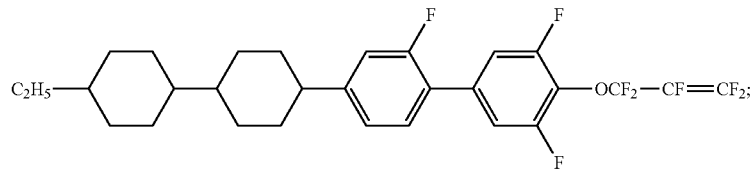

V-17-2
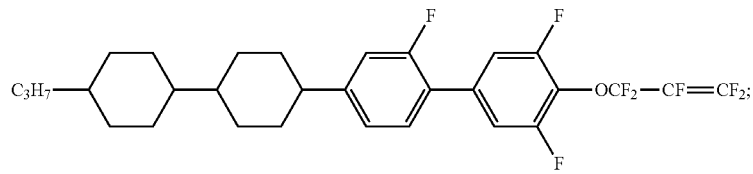

V-17-3
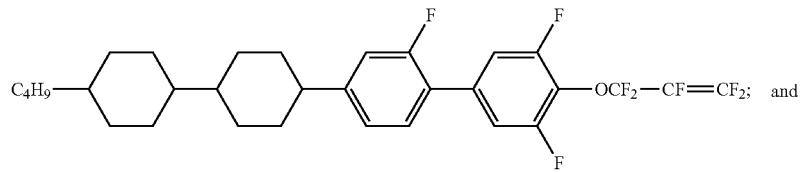
and

V-17-4
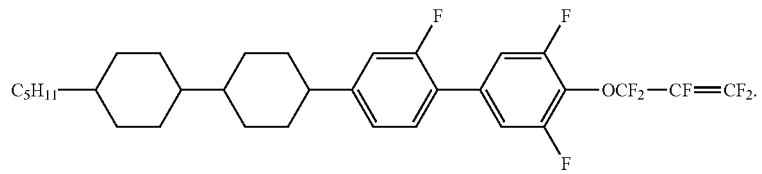

12. The liquid crystal composition according to claim 1, further comprising: 1-15% of one or more compounds of general formula VI based on the total weight of the liquid crystal composition VI
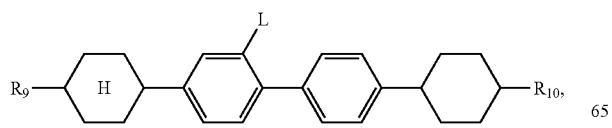

wherein, $R_9$ and $R_{10}$ are the same or different and each independently represent an alkyl group having 1 to 7 carbon atoms;

ring

represents

![cyclohexane or benzene ring structures]

L represents H or F.

13. The liquid crystal composition according to claim 12, wherein the compound of general formula VI is selected from the group consisting of the following compounds:

VI-1
R₉—[cyclohexane]—[benzene]—[benzene]—[cyclohexane]—R₁₀;

VI-2
R₉—[cyclohexane]—[benzene(F)]—[benzene]—[cyclohexane]—R₁₀; and

VI-3
R₉—[benzene]—[benzene(F)]—[benzene]—[cyclohexane]—R₁₀, wherein,
R₉ and R₁₀ are the same or different and each independently represent an alkyl group having 1 to 5 carbon atoms.

14. The liquid crystal composition according to claim 13, wherein the compound of general formula VI-1 is selected from the group consisting of the following compounds:

VI-1-1
C₂H₅—[cyclohexane]—[benzene]—[benzene]—[cyclohexane]—CH₃;

VI-1-2
C₂H₅—[cyclohexane]—[benzene]—[benzene]—[cyclohexane]—C₂H₅;

VI-1-3
C₃H₇—[cyclohexane]—[benzene]—[benzene]—[cyclohexane]—C₂H₅;

VI-1-4
C₃H₇—[cyclohexane]—[benzene]—[benzene]—[cyclohexane]—C₃H₇;

VI-1-5
C₄H₉—[cyclohexane]—[benzene]—[benzene]—[cyclohexane]—C₂H₅;

VI-1-6
C₄H₉—[cyclohexane]—[benzene]—[benzene]—[cyclohexane]—C₃H₇;

VI-1-7
C₄H₉—[cyclohexane]—[benzene]—[benzene]—[cyclohexane]—C₄H₉;

VI-1-8
C₅H₁₁—[cyclohexane]—[benzene]—[benzene]—[cyclohexane]—C₂H₅;

VI-1-9
C₅H₁₁—[cyclohexane]—[benzene]—[benzene]—[cyclohexane]—C₃H₇;

VI-1-10
C₅H₁₁—[cyclohexane]—[benzene]—[benzene]—[cyclohexane]—C₄H₉; and

VI-1-11
C₅H₁₁—[cyclohexane]—[benzene]—[benzene]—[cyclohexane]—C₅H₁₁, the compound of general formula VI-2 is selected from the group consisting of the following compounds:

VI-2-1
C₂H₅—[cyclohexane]—[benzene(F)]—[benzene]—[cyclohexane]—CH₃;

VI-2-2
C₂H₅—[cyclohexane]—[benzene(F)]—[benzene]—[cyclohexane]—C₂H₅;

VI-2-3
C₃H₇—[cyclohexane]—[benzene(F)]—[benzene]—[cyclohexane]—C₂H₅;

VI-2-4
C₃H₇—[cyclohexane]—[benzene(F)]—[benzene]—[cyclohexane]—C₃H₇;

VI-2-5
C₄H₉—[cyclohexane]—[benzene(F)]—[benzene]—[cyclohexane]—C₂H₅;

VI-2-6
C₄H₉—[cyclohexane]—[benzene(F)]—[benzene]—[cyclohexane]—C₃H₇;

-continued

VI-2-7
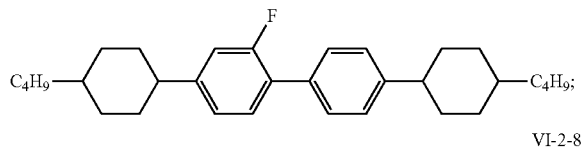

VI-2-8
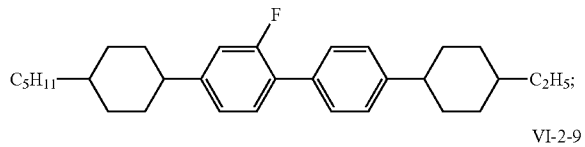

VI-2-9
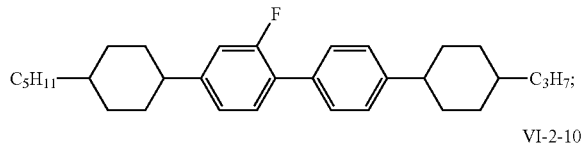

VI-2-10
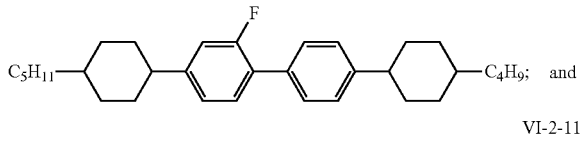

VI-2-11
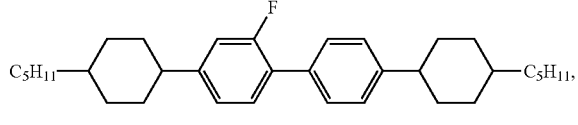

the compound of general formula VI-3 is selected from the group consisting of the following compounds:

VI-3-1
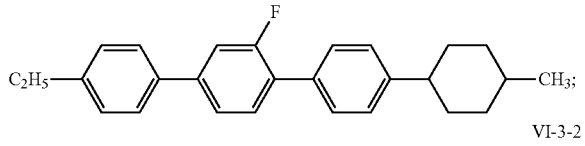

VI-3-2
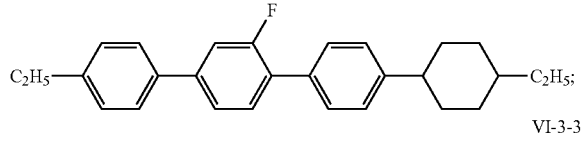

VI-3-3
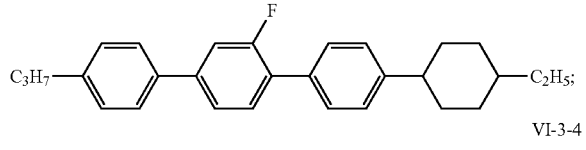

VI-3-4
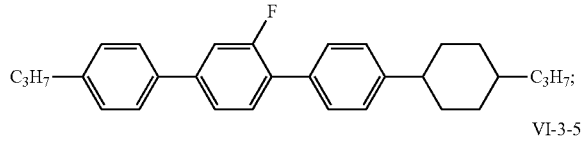

VI-3-5
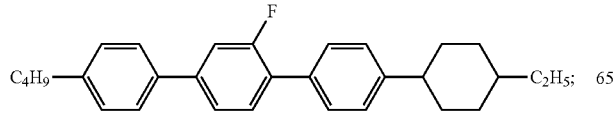

-continued

VI-3-6
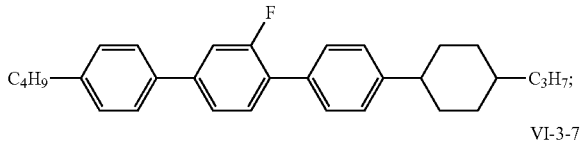

VI-3-7
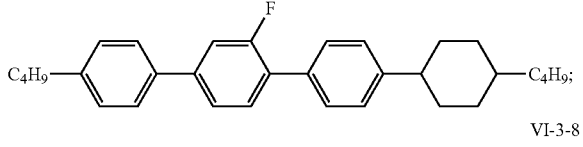

VI-3-8
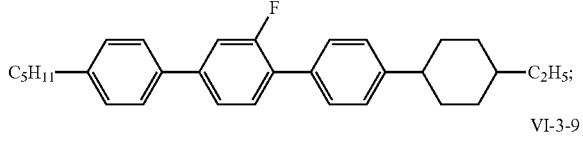

VI-3-9
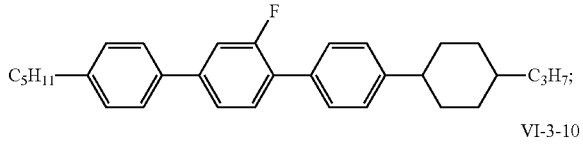

VI-3-10
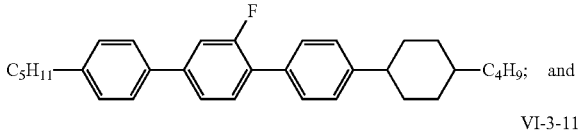

VI-3-11
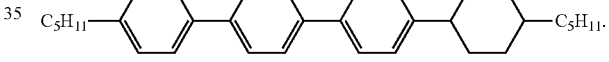

15. The liquid crystal composition according to claim 1, wherein the liquid crystal composition comprises:

4% of the compound II-9-2 based on the total weight of the liquid crystal composition II-9-2
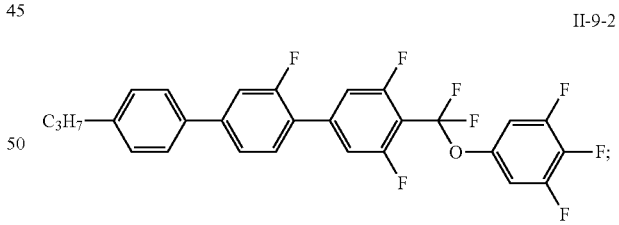

30% of the compound IV-1-12 based on the total weight of the liquid crystal composition IV-1-12
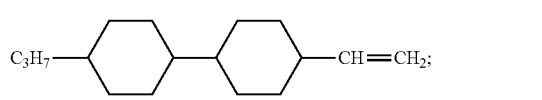

3% of the compound IV-2-22 based on the total weight of the liquid crystal composition

IV-2-22

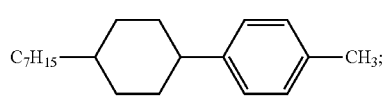

3% of the compound IV-2-18 based on the total weight of the liquid crystal composition

IV-2-18

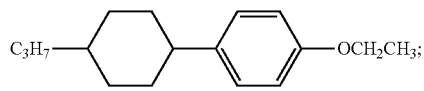

5% of the compound III-2-5 based on the total weight of the liquid crystal composition

III-2-5

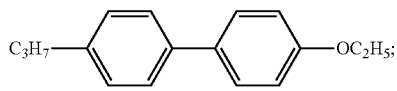

12% of the compound IV-4-5 based on the total weight of the liquid crystal composition

IV-4-5

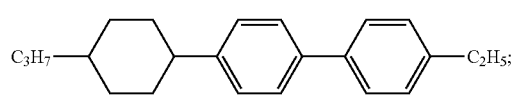

3% of the compound VI-1-4 based on the total weight of the liquid crystal composition

VI-1-4

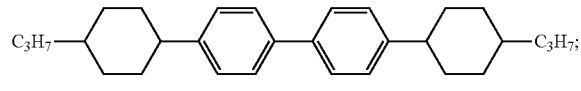

10% of the compound III-4-1 based on the total weight of the liquid crystal composition

III-4-1

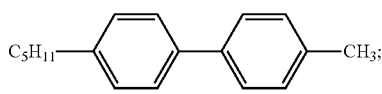

12% of the compound IV-3-8 based on the total weight of the liquid crystal composition

IV-3-8

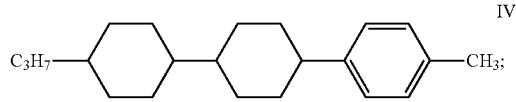

3% of the compound Ib-3 based on the total weight of the liquid crystal composition Ib-3

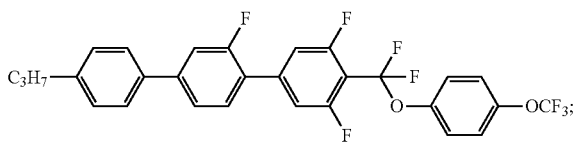

7% of the compound V-7-2 based on the total weight of the liquid crystal composition

V-7-2

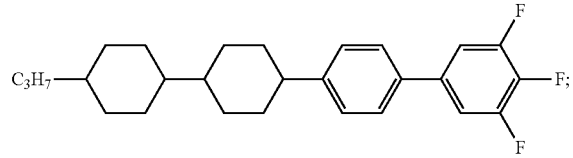

4% of the compound Ib-4 based on the total weight of the liquid crystal composition Ib-4

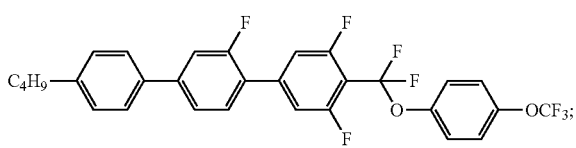

and

4% of the compound Ia-3 based on the total weight of the liquid crystal composition Ia-3

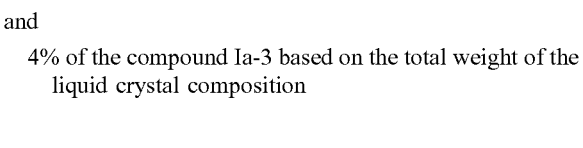

or the liquid crystal composition comprises:

4% of the compound II-9-2 based on the total weight of the liquid crystal composition

II-9-2

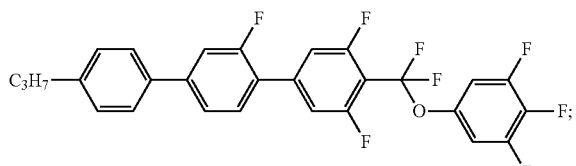

10% of the compound II-9-3 based on the total weight of the liquid crystal composition

II-9-3

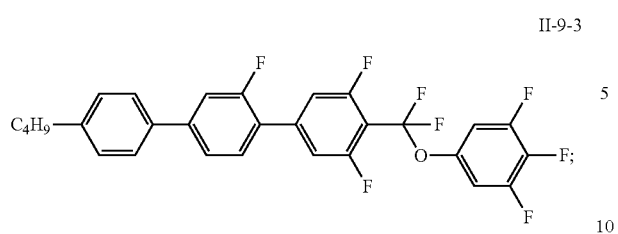

9% of the compound Ib-3 based on the total weight of the liquid crystal composition Ib-3

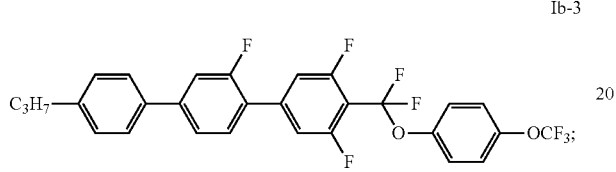

15% of the compound IV-1-12 based on the total weight of the liquid crystal composition

IV-1-12

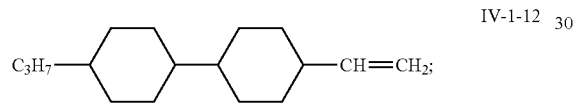

3% of the compound IV-1-16 based on the total weight of the liquid crystal composition

IV-1-16

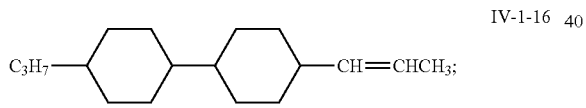

8% of the compound III-4-1 based on the total weight of the liquid crystal composition

III-4-1

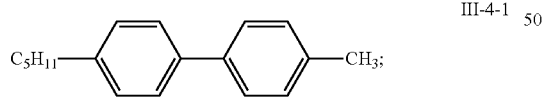

4% of the compound IV-3-1 based on the total weight of the liquid crystal composition

IV-3-1

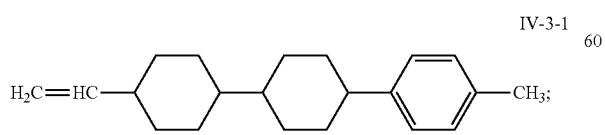

3% of the compound IV-4-5 based on the total weight of the liquid crystal composition

IV-4-5

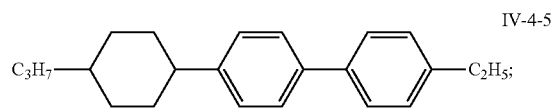

3% of the compound VI-1-8 based on the total weight of the liquid crystal composition

VI-1-8

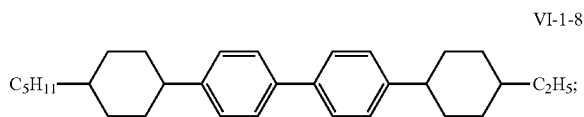

6% of the compound V-1-6 based on the total weight of the liquid crystal composition

V-1-6

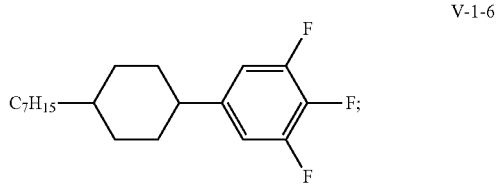

6% of the compound II-1-4 based on the total weight of the liquid crystal composition

II-1-4

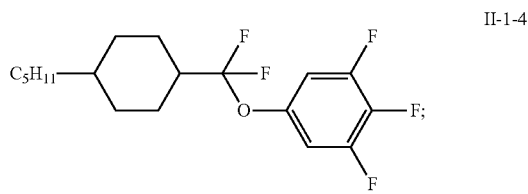

5% of the compound II-3-2 based on the total weight of the liquid crystal composition

II-3-2

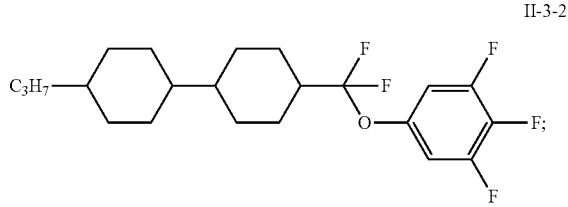

3% of the compound V-3-1 based on the total weight of the liquid crystal composition

V-3-1

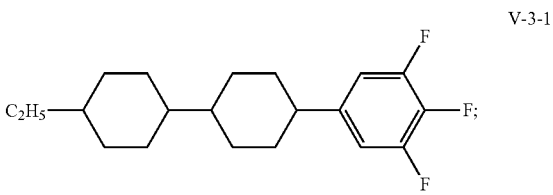

3% of the compound V-3-2 based on the total weight of the liquid crystal composition

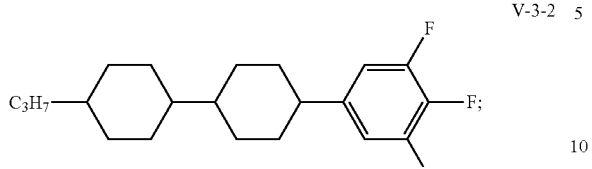
V-3-2

5% of the compound V-5-2 based on the total weight of the liquid crystal composition

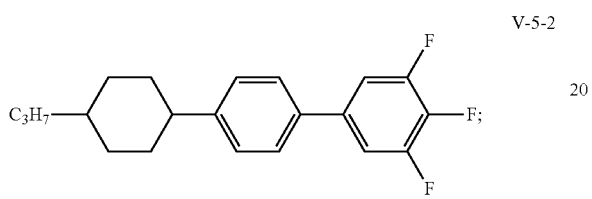
V-5-2

7% of the compound II-8-2 based on the total weight of the liquid crystal composition

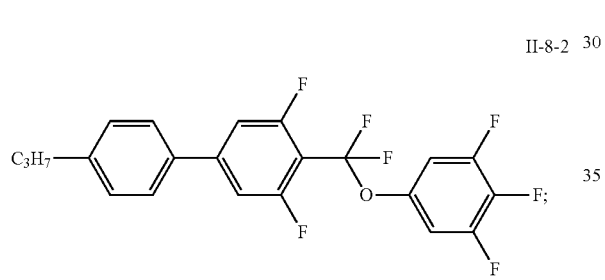
II-8-2

3% of the compound V-7-2 based on the total weight of the liquid crystal composition

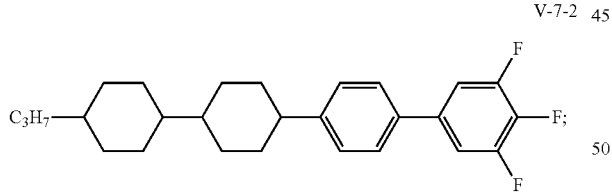
V-7-2 and
3% of the compound V-7-3 based on the total weight of the liquid crystal composition

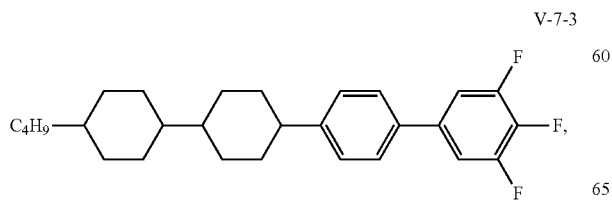
V-7-3 or the liquid crystal composition comprises:
5% of the compound IV-4-5 based on the total weight of the liquid crystal composition

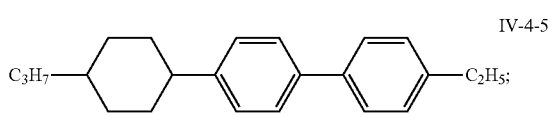
IV-4-5

5% of the compound Ia-2 based on the total weight of the liquid crystal composition

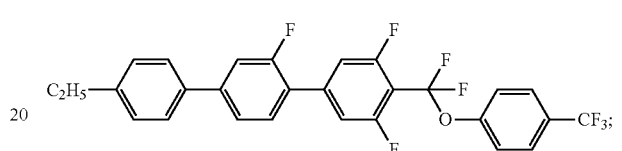
Ia-2

5% of the compound VI-1-4 based on the total weight of the liquid crystal composition

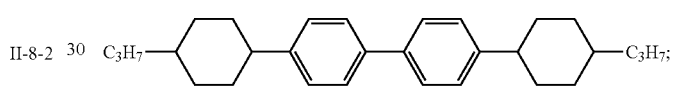
VI-1-4

5% of the compound Ib-3 based on the total weight of the liquid crystal composition

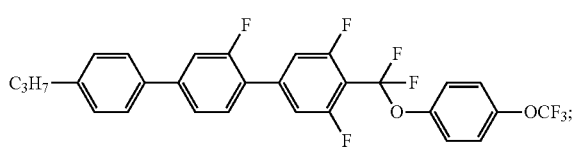
Ib-3

5% of the compound V-10-2 based on the total weight of the liquid crystal composition

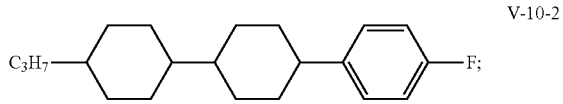
V-10-2

8% of the compound V-3-2 based on the total weight of the liquid crystal composition

V-3-2

10% of the compound II-3-1 based on the total weight of the liquid crystal composition

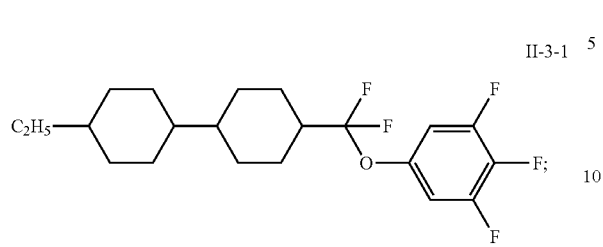

II-3-1

15% of the compound II-3-2 based on the total weight of the liquid crystal composition

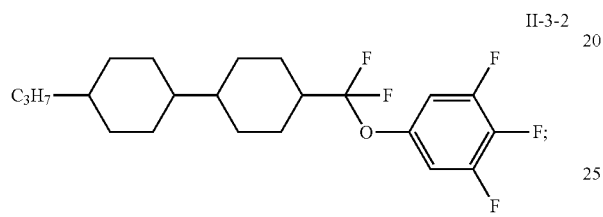

II-3-2

22% of the compound IV-1-12 based on the total weight of the liquid crystal composition

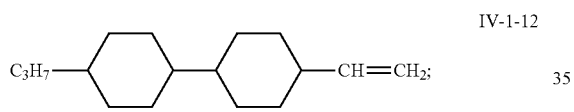

IV-1-12

5% of the compound 2-2 based on the total weight of the liquid crystal composition

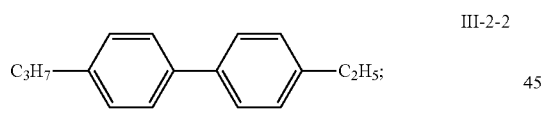

III-2-2

5% of the compound II-8-2 based on the total weight of the liquid crystal composition

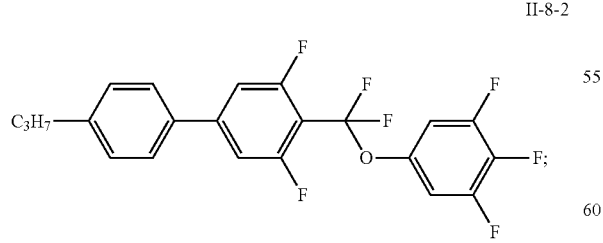

II-8-2

5% of the compound II-8-1 based on the total weight of the liquid crystal composition

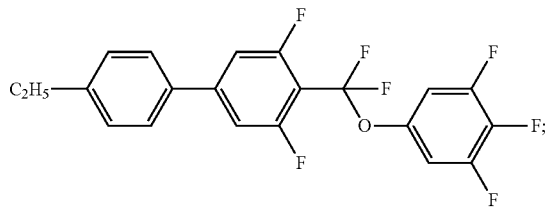

II-8-1 and

5% of the compound II-16-2 based on the total weight of the liquid crystal composition

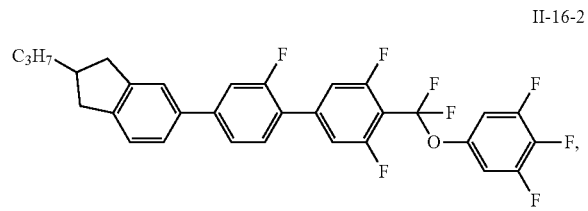

II-16-2 or the liquid crystal composition comprises:

5% of the compound VI-1-4 based on the total weight of the liquid crystal composition

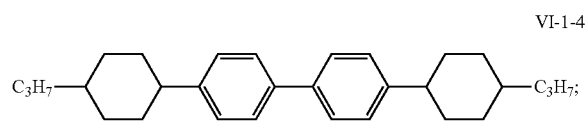

VI-1-4

10% of the compound Ia-3 based on the total weight of the liquid crystal composition

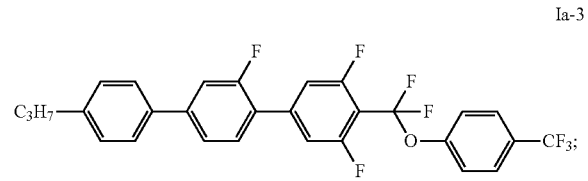

Ia-3

10% of the compound IV-1-4 based on the total weight of the liquid crystal composition

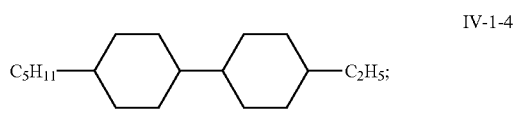

IV-1-4

3% of the compound IV-3-8 based on the total weight of the liquid crystal composition

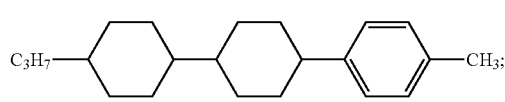
IV-3-8

3% of the compound V-10-3 based on the total weight of the liquid crystal composition

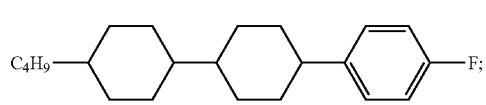
V-10-3

40% of the compound IV-1-12 based on the total weight of the liquid crystal composition

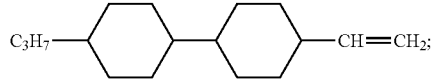
IV-1-12

4% of the compound II-8-2 based on the total weight of the liquid crystal composition

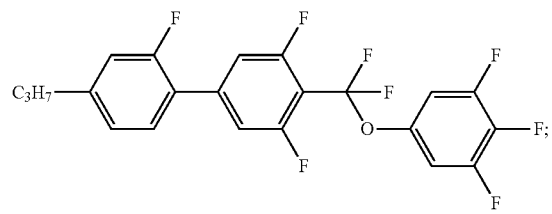
II-8-2

5% of the compound III-4-1 based on the total weight of the liquid crystal composition

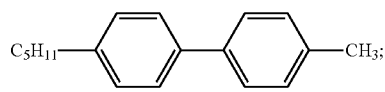
III-4-1

5% of the compound II-14-1 based on the total weight of the liquid crystal composition

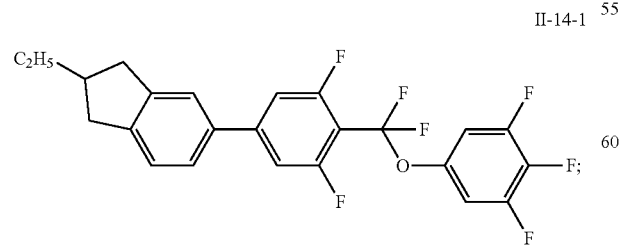
II-14-1

5% of the compound II-14-2 based on the total weight of the liquid crystal composition

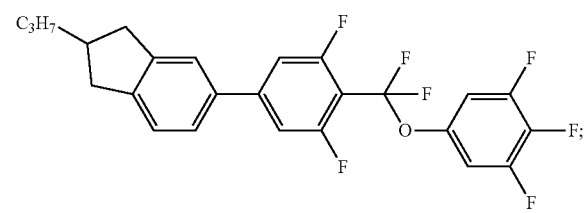
II-14-2

5% of the compound II-9-2 based on the total weight of the liquid crystal composition

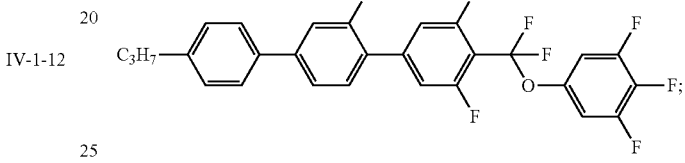
II-9-2 and

5% of the compound II-9-4 based on the total weight of the liquid crystal composition

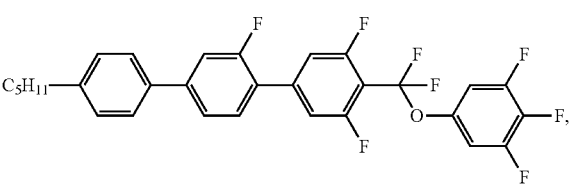
II-9-4 or the liquid crystal composition comprises:

5% of the compound IV-2-5 based on the total weight of the liquid crystal composition

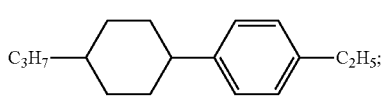
IV-2-5

6% of the compound IV-2-18 based on the total weight of the liquid crystal composition

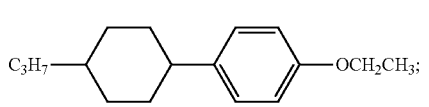
IV-2-18

5% of the compound VI-1-3 based on the total weight of the liquid crystal composition

VI-1-3

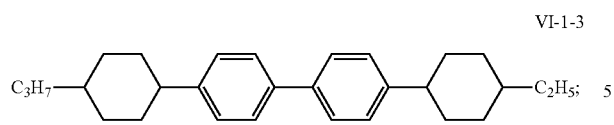

5% of the compound VI-1-4 based on the total weight of the liquid crystal composition

VI-1-4

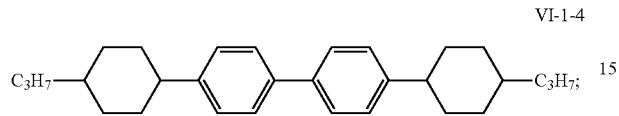

5% of the compound V-10-2 based on the total weight of the liquid crystal composition

V-10-2

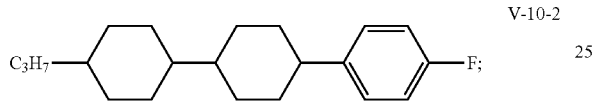

9% of the compound V-3-2 based on the total weight of the liquid crystal composition

V-3-2

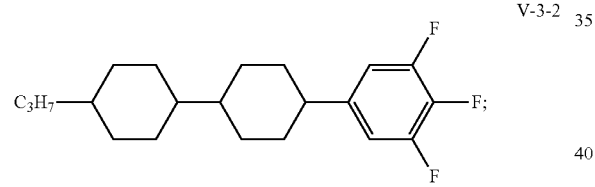

10% of the compound Ib-3 based on the total weight of the liquid crystal composition Ib-3

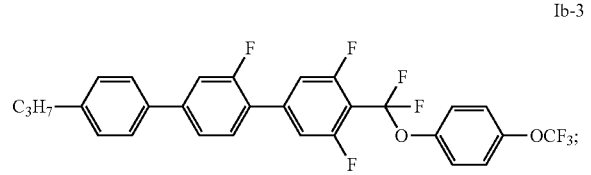

30% of the compound IV-1-12 based on the total weight of the liquid crystal composition

IV-1-12

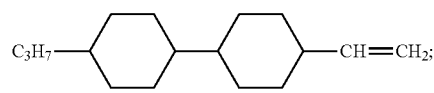

5% of the compound III-2-5 based on the total weight of the liquid crystal composition

III-2-5

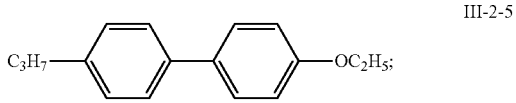

5% of the compound II-8-1 based on the total weight of the liquid crystal composition

II-8-1

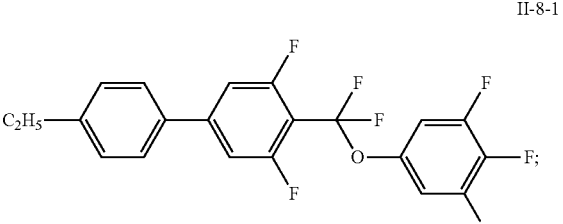

5% of the compound II-14-1 based on the total weight of the liquid crystal composition

II-14-1

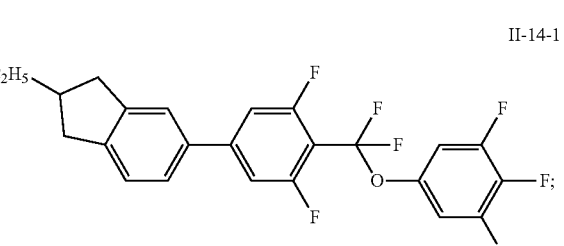

5% of the compound II-14-2 based on the total weight of the liquid crystal composition

II-14-2

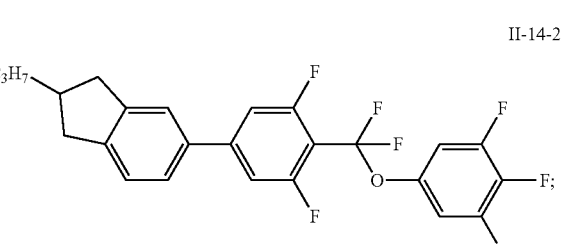

and

5% of the compound II-9-2 based on the total weight of the liquid crystal composition

II-9-2

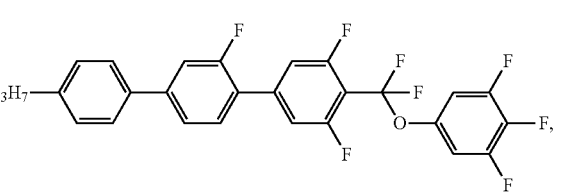

or the liquid crystal composition comprises:

2% of the compound Ia-4 based on the total weight of the liquid crystal composition

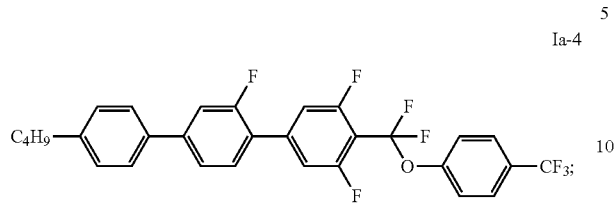

Ia-4

8% of the compound V-4-2 based on the total weight of the liquid crystal composition

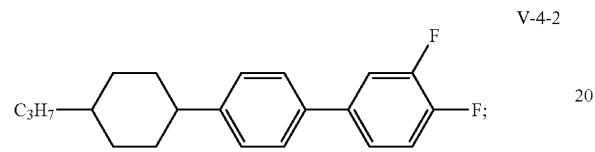

V-4-2

13% of the compound Ib-5 based on the total weight of the liquid crystal composition

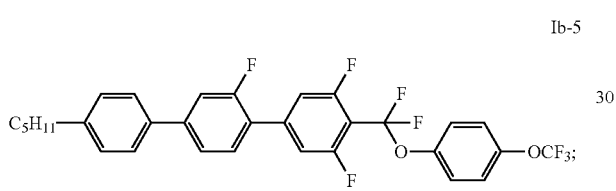

Ib-5

10% of the compound V-1-6 based on the total weight of the liquid crystal composition

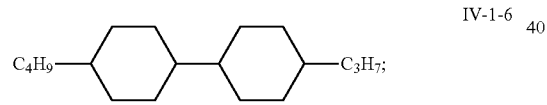

IV-1-6

42% of the compound IV-1-12 based on the total weight of the liquid crystal composition

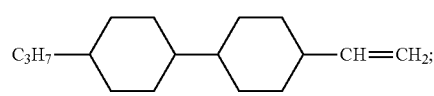

IV-1-12

5% of the compound V-3-2 based on the total weight of the liquid crystal composition

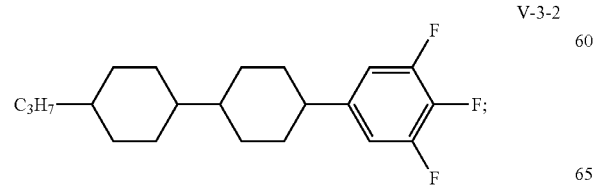

V-3-2

5% of the compound II-14-2 based on the total weight of the liquid crystal composition

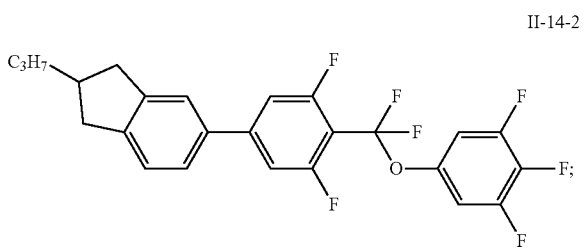

II-14-2

5% of the compound III-2-5 based on the total weight of the liquid crystal composition

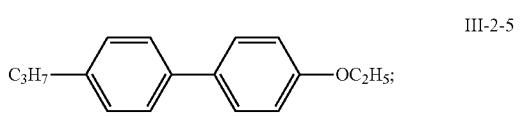

III-2-5

5% of the compound III-4-1 based on the total weight of the liquid crystal composition

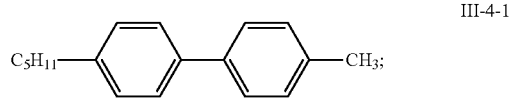

III-4-1 and

5% of the compound II-9-4 based on the total weight of the liquid crystal composition

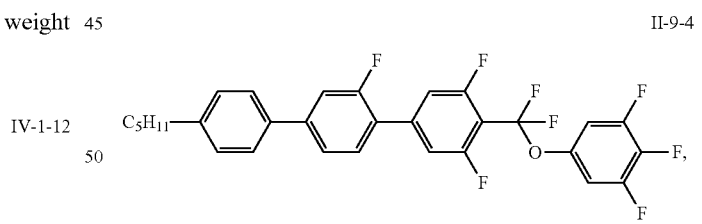

II-9-4 or the liquid crystal composition comprises:

10% of the compound IV-2-18 based on the total weight of the liquid crystal composition

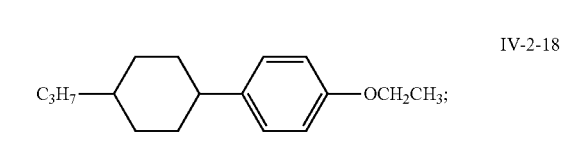

IV-2-18

2% of the compound Ib-4 based on the total weight of the liquid crystal composition Ib-4

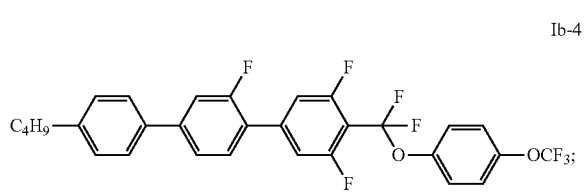

8% of the compound V-4-2 based on the total weight of the liquid crystal composition

V-4-2

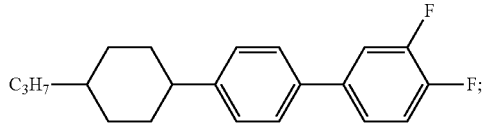

13% of the compound Ia-3 based on the total weight of the liquid crystal composition Ia-3

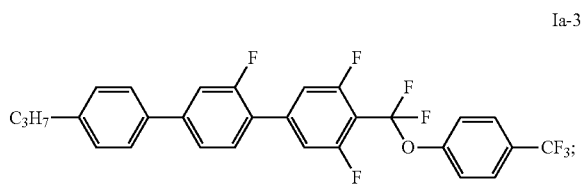

15% of the compound IV-1-2 based on the total weight of the liquid crystal composition

IV-1-2

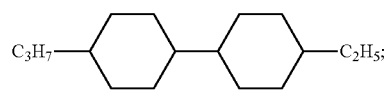

10% of the compound IV-1-4 based on the total weight of the liquid crystal composition

IV-1-4

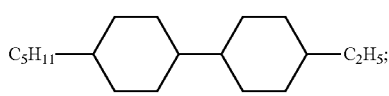

12% of the compound IV-1-12 based on the total weight of the liquid crystal composition

IV-1-12

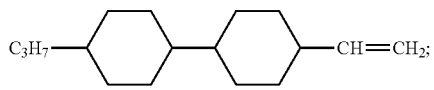

5% of the compound III-3-6 based on the total weight of the liquid crystal composition

III-3-6

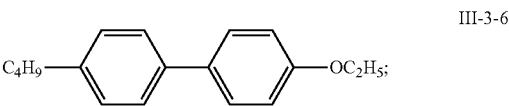

5% of the compound II-8-2 based on the total weight of the liquid crystal composition

II-8-2

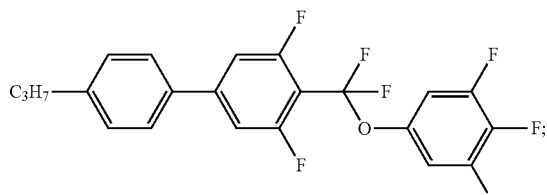

5% of the compound II-14-2 based on the total weight of the liquid crystal composition

II-14-2

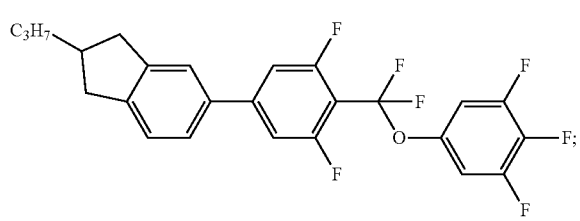

10% of the compound II-9-2 based on the total weight of the liquid crystal composition

II-9-2

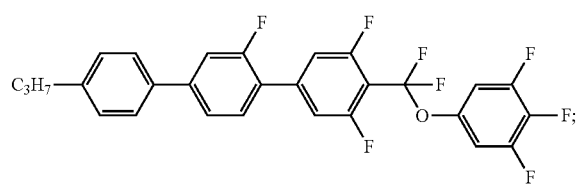

and
5% of the compound II-9-4 based on the total weight of the liquid crystal composition

II-9-4

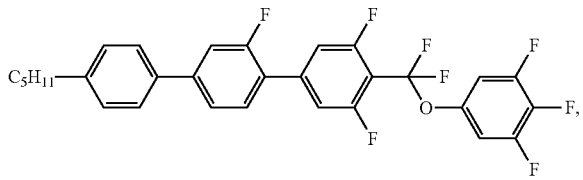

or the liquid crystal composition comprises:
5% of the compound Ia-2 based on the total weight of the liquid crystal composition

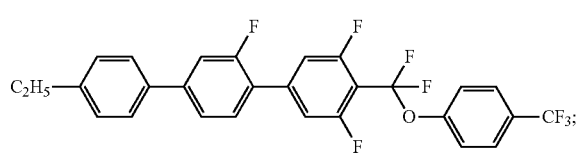
Ia-2

5% of the compound VI-1-4 based on the total weight of the liquid crystal composition

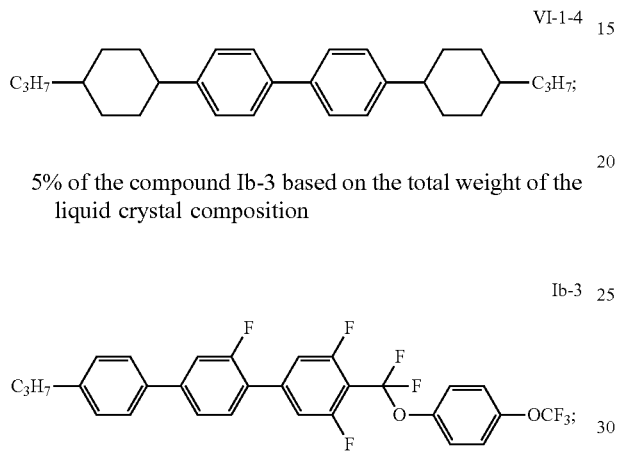

5% of the compound Ib-3 based on the total weight of the liquid crystal composition 5% of the compound V-10-2 based on the total weight of the liquid crystal composition

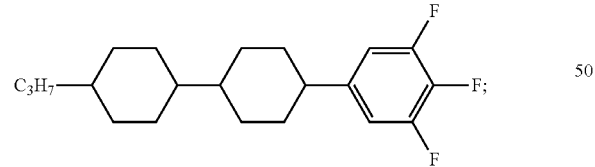
V-10-2

10% of the compound V-3-2 based on the total weight of the liquid crystal composition

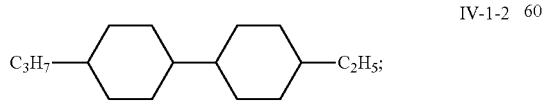
V-3-2

10% of the compound IV-1-2 based on the total weight of the liquid crystal composition

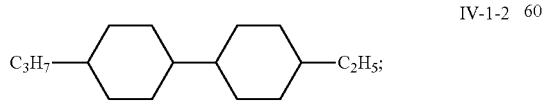
IV-1-2

5% of the compound II-3-1 based on the total weight of the liquid crystal composition

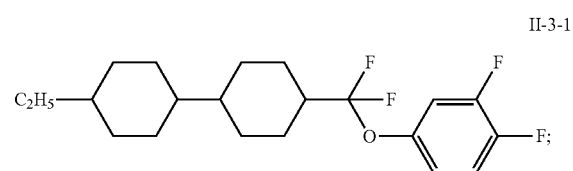
II-3-1

5% of the compound II-3-2 based on the total weight of the liquid crystal composition

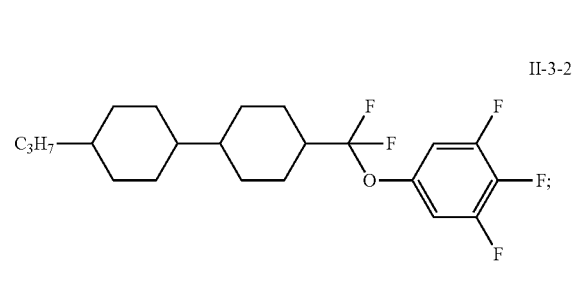
II-3-2

25% of the compound IV-1-12 based on the total weight of the liquid crystal composition

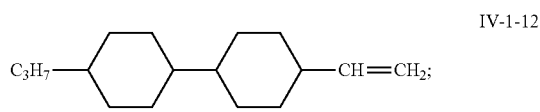
IV-1-12

10% of the compound III-4-6 based on the total weight of the liquid crystal composition

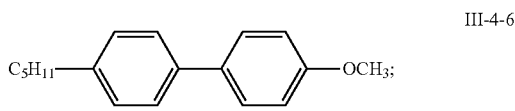
III-4-6

5% of the compound II-8-2 based on the total weight of the liquid crystal composition

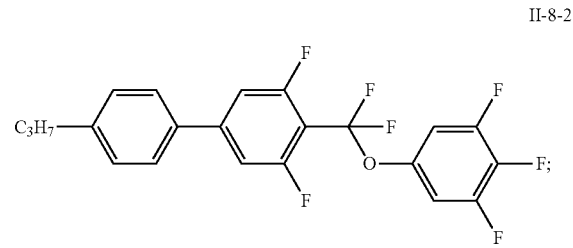
II-8-2

5% of the compound II-8-1 based on the total weight of the liquid crystal composition

II-8-1

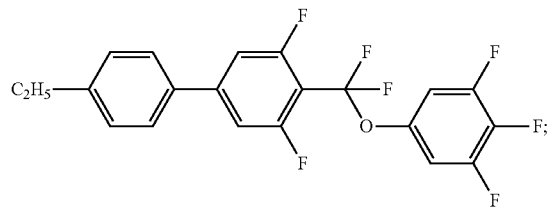

and

5% of the compound II-16-2 based on the total weight of the liquid crystal composition

II-16-2

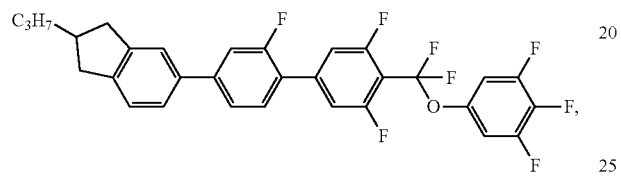

or the liquid crystal composition comprises:

8% of the compound Ib-2 based on the total weight of the liquid crystal composition Ib-2

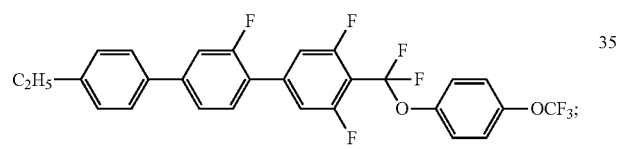

5% of the compound Ib-3 based on the total weight of the liquid crystal composition Ib-3

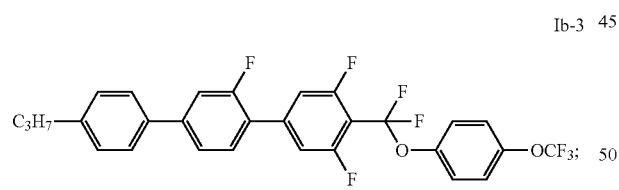

4% of the compound Ib-4 based on the total weight of the liquid crystal composition Ib-4

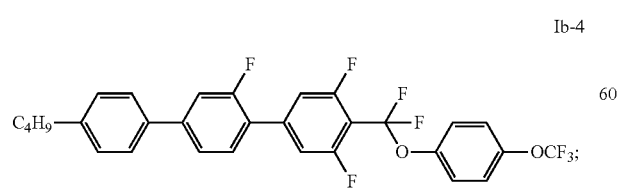

5% of the compound Ib-5 based on the total weight of the liquid crystal composition Ib-5

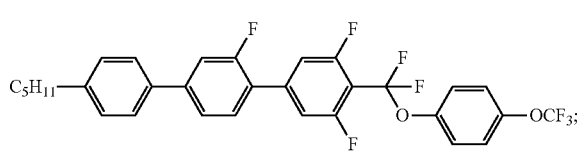

36% of the compound IV-1-12 based on the total weight of the liquid crystal composition

IV-1-12

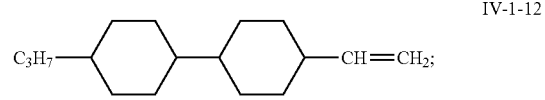

3% of the compound IV-3-1 based on the total weight of the liquid crystal composition

IV-3-1

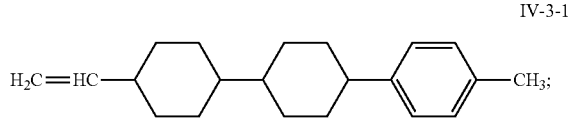

4% of the compound IV-3-11 based on the total weight of the liquid crystal composition

IV-3-11

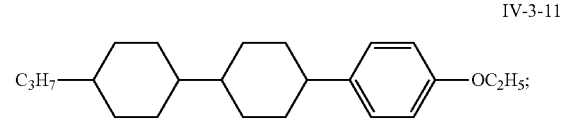

4% of the compound III-4-1 based on the total weight of the liquid crystal composition

III-4-1

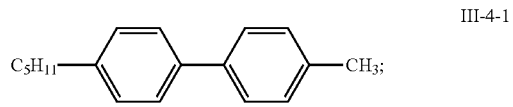

3% of the compound V-12-1 based on the total weight of the liquid crystal composition

V-12-1

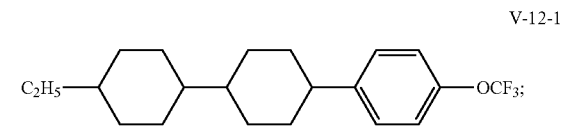 [SMILES: CCC1CCC(C2CCC(c3ccc(OC(F)(F)F)cc3)CC2)CC1]

3% of the compound V-2-4 based on the total weight of the liquid crystal composition

V-2-4

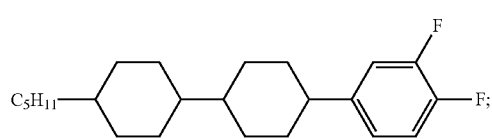

4% of the compound V-5-2 based on the total weight of the liquid crystal composition

V-5-2

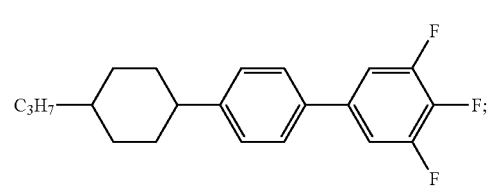

4% of the compound V-6-1 based on the total weight of the liquid crystal composition

V-6-1

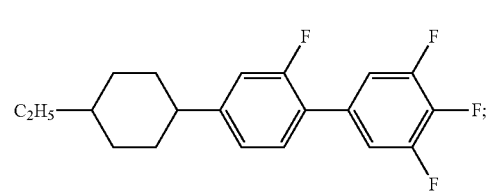

7% of the compound II-8-1 based on the total weight of the liquid crystal composition

II-8-1

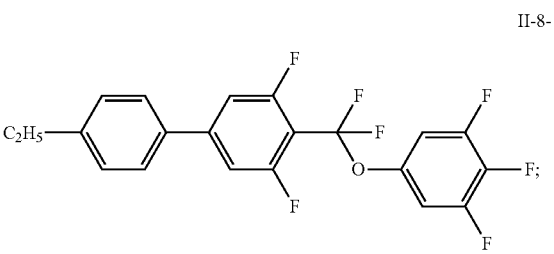

and
10% of the compound II-8-2 based on the total weight of the liquid crystal composition

II-8-2

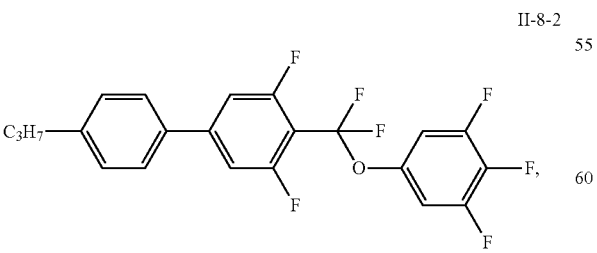

or the liquid crystal composition comprises:
8% of the compound Ia-2 based on the total weight of the liquid crystal composition Ia-2

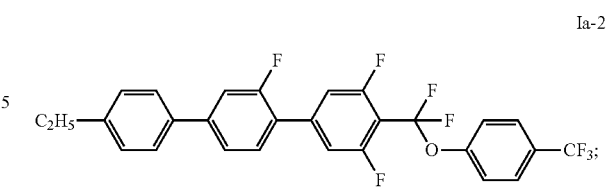

5% of the compound Ia-3 based on the total weight of the liquid crystal composition Ia-3

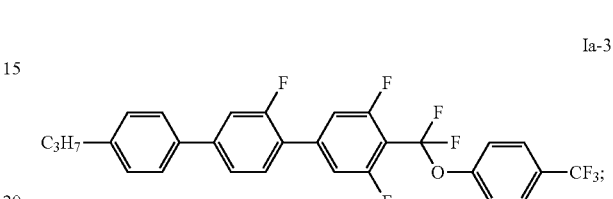

4% of the compound Ia-4 based on the total weight of the liquid crystal composition Ia-4

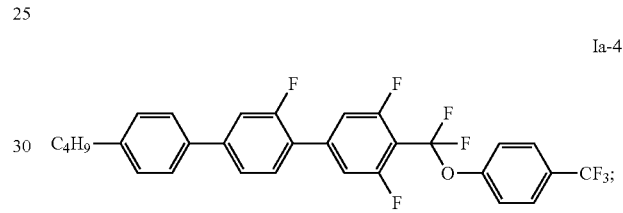

5% of the compound Ia-5 based on the total weight of the liquid crystal composition Ia-5

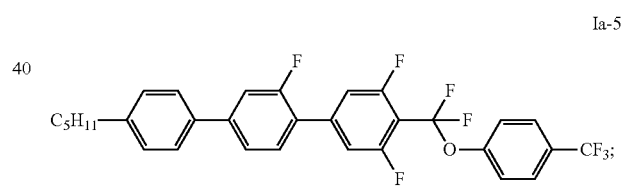

44% of the compound IV-1-12 based on the total weight of the liquid crystal composition

IV-1-12

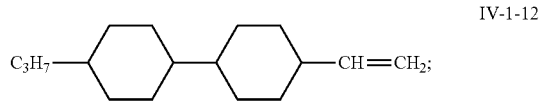

4% of the compound IV-3-11 based on the total weight of the liquid crystal composition

IV-3-11

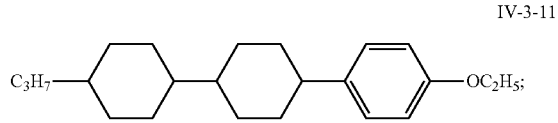

3% of the compound VI-3-6 based on the total weight of the liquid crystal composition

VI-3-6

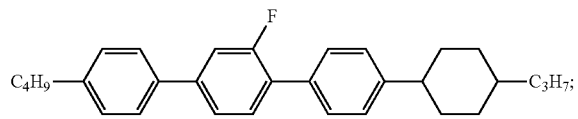

6% of the compound III-4-7 based on the total weight of the liquid crystal composition

III-4-7

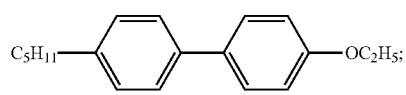

4% of the compound V-9-2 based on the total weight of the liquid crystal composition

V-9-2

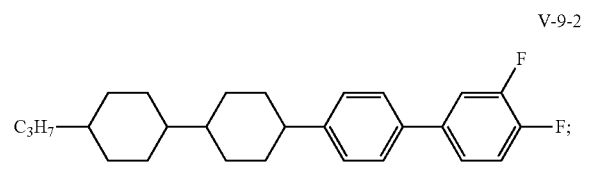

3% of the compound V-7-3 based on the total weight of the liquid crystal composition

V-7-3

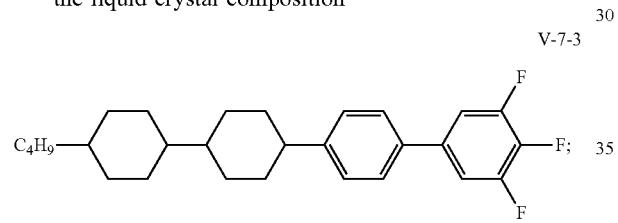

4% of the compound V-8-2 based on the total weight of the liquid crystal composition

V-8-2

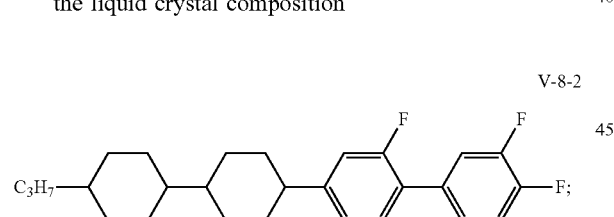

5% of the compound II-8-1 based on the total weight of the liquid crystal composition

II-8-1

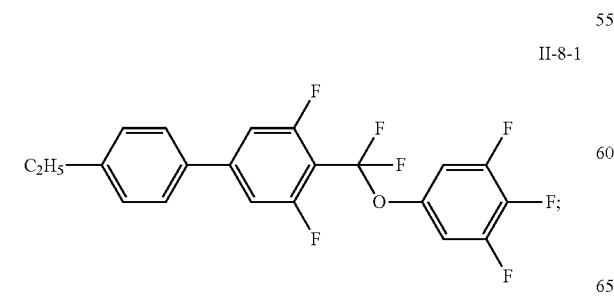

and
5% of the compound II-8-2 based on the total weight of the liquid crystal composition

II-8-2

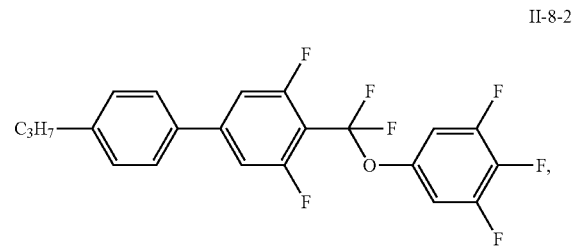

or the liquid crystal composition comprises:
7% of the compound Ib-2 based on the total weight of the liquid crystal composition Ib-2

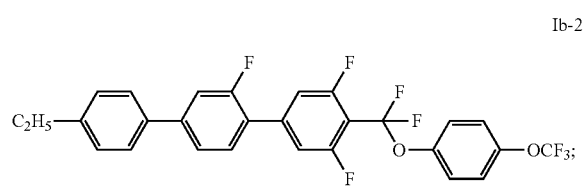

8% of the compound Ib-3 based on the total weight of the liquid crystal composition Ib-3

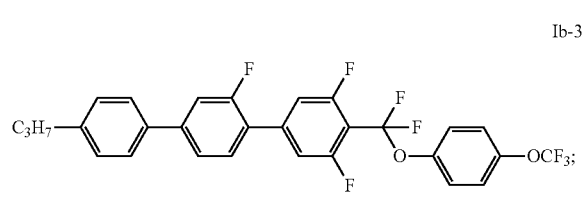

7% of the compound Ia-2 based on the total weight of the liquid crystal composition Ia-2

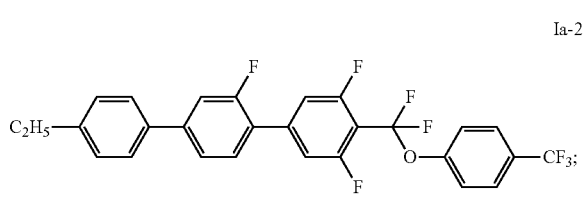

8% of the compound Ia-3 based on the total weight of the liquid crystal composition Ia-3

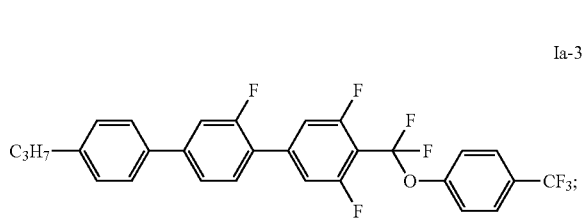

2% of the compound II-11-1 based on the total weight of the liquid crystal composition 3% of the compound II-13-1 based on the total weight of the liquid crystal composition

II-11-1

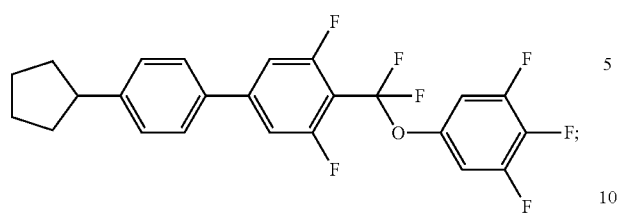

3% of the compound II-10-1 based on the total weight of the liquid crystal composition

II-13-1

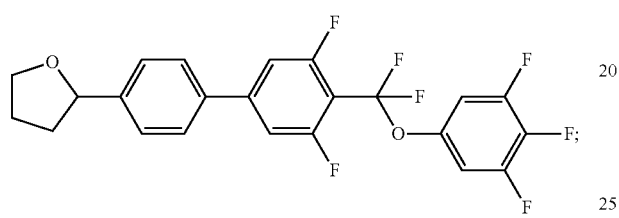

3% of the compound II-4-2 based on the total weight of the liquid crystal composition

II-10-1

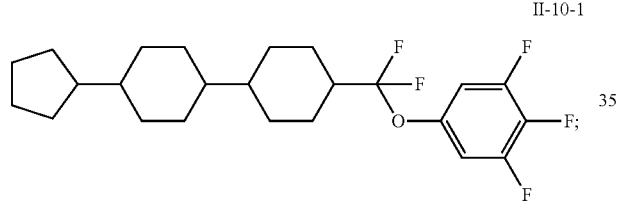

4% of the compound II-5-2 based on the total weight of the liquid crystal composition

II-4-2

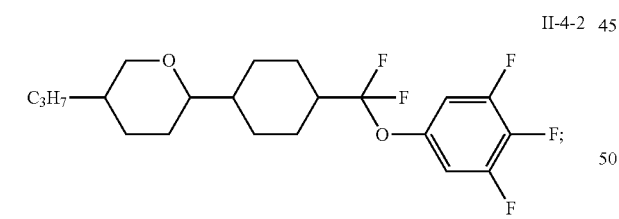

II-5-2

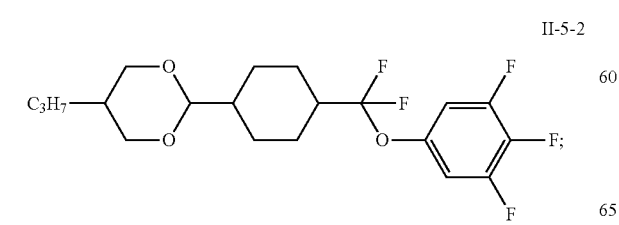

2% of the compound II-6-3 based on the total weight of the liquid crystal composition

II-6-3

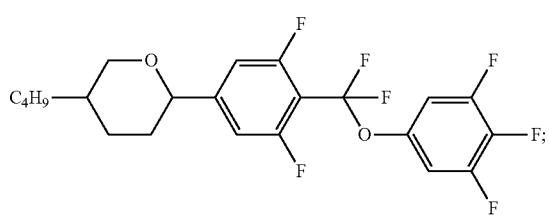

3% of the compound II-7-1 based on the total weight of the liquid crystal composition

II-7-1

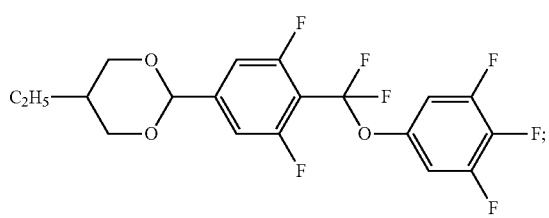

5% of the compound V-3-1 based on the total weight of the liquid crystal composition

IV-3-1

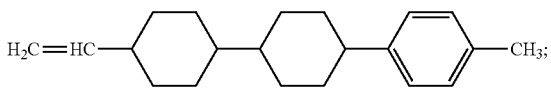

5% of the compound V-3-2 based on the total weight of the liquid crystal composition

V-3-2

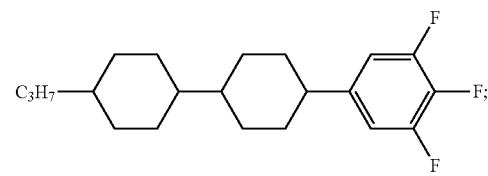

10% of the compound III-4-1 based on the total weight of the liquid crystal composition

III-4-1

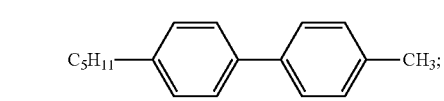

and

30% of the compound IV-1-12 based on the total weight of the liquid crystal composition

IV-1-12

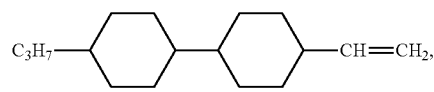

or the liquid crystal composition comprises:
8% of the compound Ia-2 based on the total weight of the liquid crystal composition Ia-2

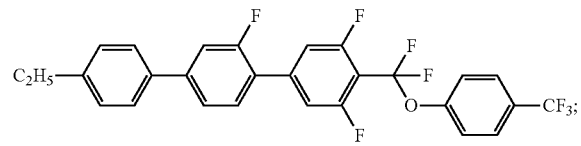

5% of the compound Ia-3 based on the total weight of the liquid crystal composition Ia-3

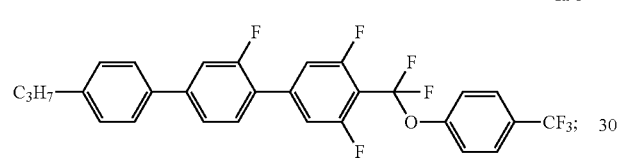

4% of the compound Ia-4 based on the total weight of the liquid crystal composition Ia-4

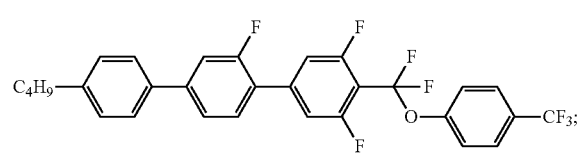

5% of the compound Ia-5 based on the total weight of the liquid crystal composition Ia-5

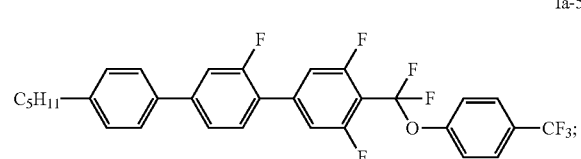

44% of the compound IV-1-12 based on the total weight of the liquid crystal composition

IV-1-12

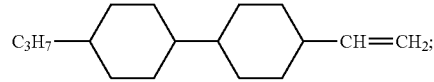

4% of the compound IV-3-11 based on the total weight of the liquid crystal composition

IV-3-11

3% of the compound VI-3-6 based on the total weight of the liquid crystal composition

VI-3-6

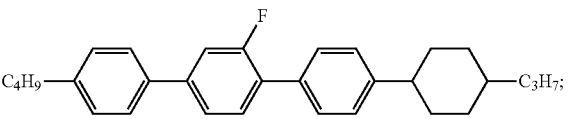

6% of the compound III-4-7 based on the total weight of the liquid crystal composition

III-4-7

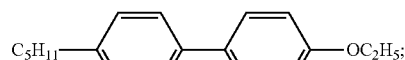

4% of the compound V-9-2 based on the total weight of the liquid crystal composition

V-9-2

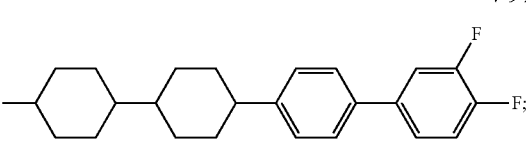

3% of the compound V-16-3 based on the total weight of the liquid crystal composition

V-16-3

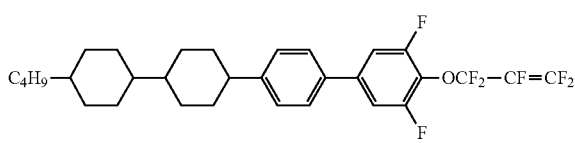

4% of the compound V-17-2 based on the total weight of the liquid crystal composition

V-17-2

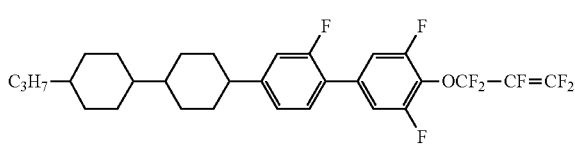

5% of the compound II-8-1 based on the total weight of the liquid crystal composition

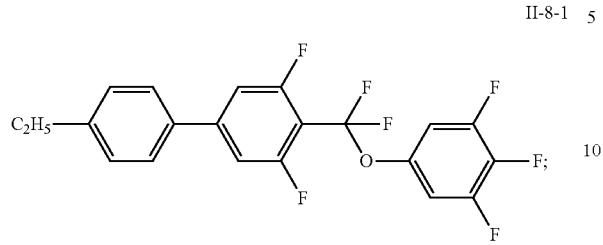

and
5% of the compound II-8-2 based on the total weight of the liquid crystal composition

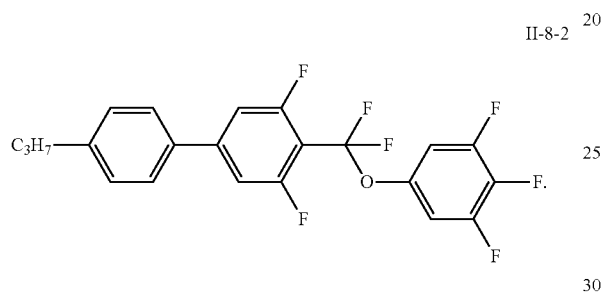

16. A liquid crystal display device, comprising the liquid crystal composition of any one of claim 1.

17. The liquid crystal composition according to claim 12, wherein the liquid crystal composition comprises:
4% of the compound II-9-2 based on the total weight of the liquid crystal composition

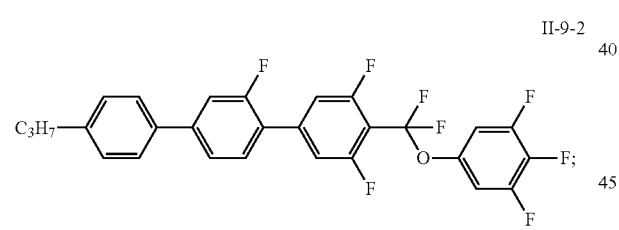

30% of the compound IV-1-12 based on the total weight of the liquid crystal composition

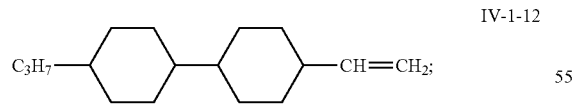

3% of the compound IV-2-22 based on the total weight of the liquid crystal composition

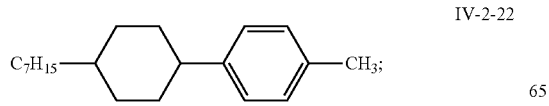

3% of the compound IV-2-18 based on the total weight of the liquid crystal composition

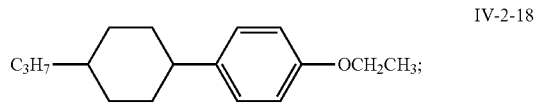

5% of the compound III-2-5 based on the total weight of the liquid crystal composition

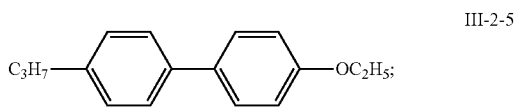

12% of the compound IV-4-5 based on the total weight of the liquid crystal composition

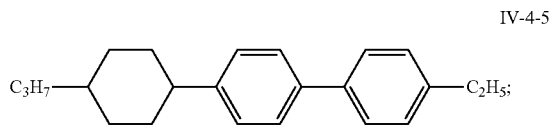

3% of the compound VI-1-4 based on the total weight of the liquid crystal composition

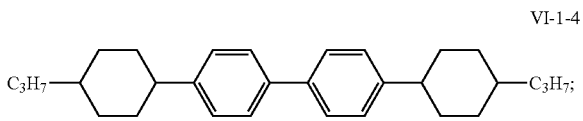

10% of the compound III-4-1 based on the total weight of the liquid crystal composition

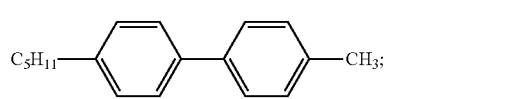

12% of the compound IV-3-8 based on the total weight of the liquid crystal composition

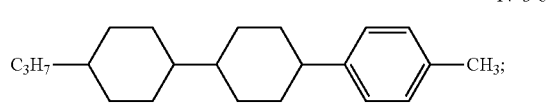

3% of the compound Ib-3 based on the total weight of the liquid crystal composition

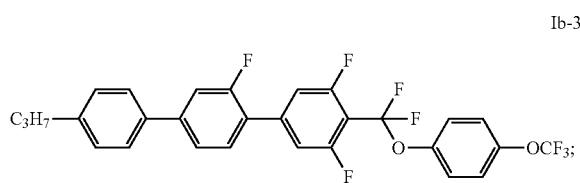
Ib-3

7% of the compound V-7-2 based on the total weight of the liquid crystal composition

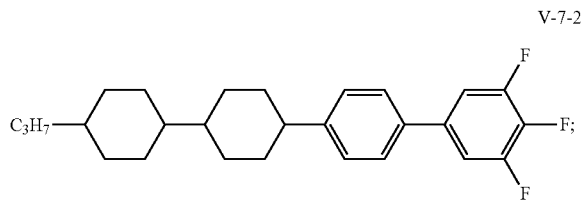
V-7-2

4% of the compound Ib-4 based on the total weight of the liquid crystal composition

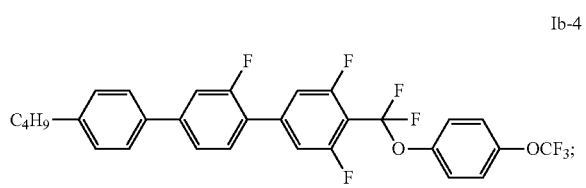
Ib-4 and
4% of the compound Ia-3 based on the total weight of the liquid crystal composition

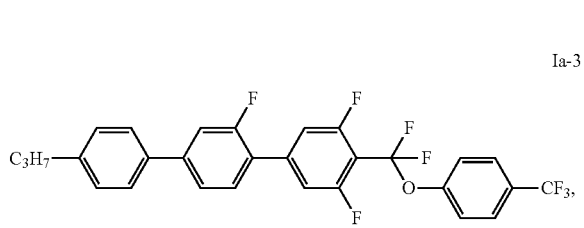
Ia-3 or the liquid crystal composition comprises:
4% of the compound II-9-2 based on the total weight of the liquid crystal composition

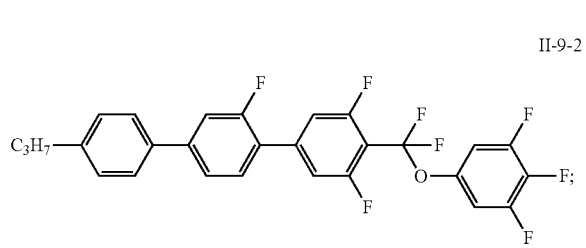
II-9-2

10% of the compound II-9-3 based on the total weight of the liquid crystal composition

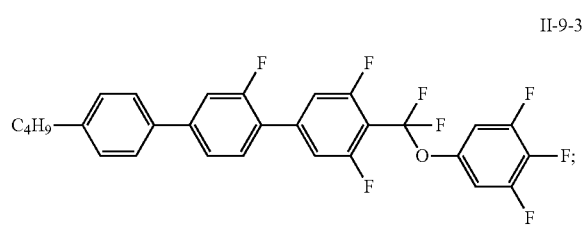
II-9-3

9% of the compound Ib-3 based on the total weight of the liquid crystal composition

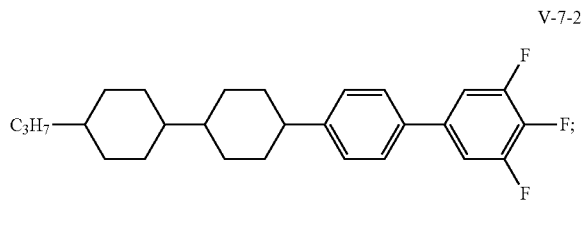
Ib-3

15% of the compound IV-1-12 based on the total weight of the liquid crystal composition

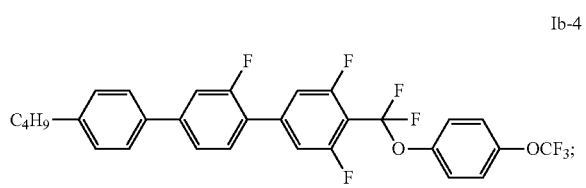
IV-1-12

3% of the compound IV-1-16 based on the total weight of the liquid crystal composition

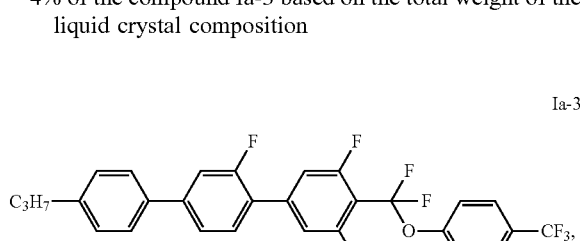
IV-1-16

8% of the compound III-4-1 based on the total weight of the liquid crystal composition

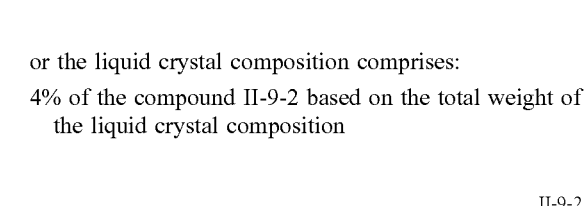
III-4-1

4% of the compound IV-3-1 based on the total weight of the liquid crystal composition

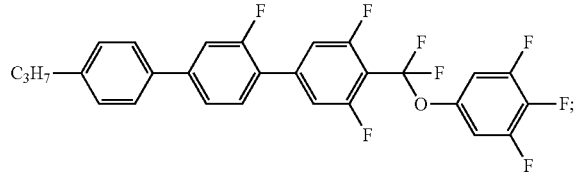
IV-3-1

3% of the compound IV-4-5 based on the total weight of the liquid crystal composition

IV-4-5

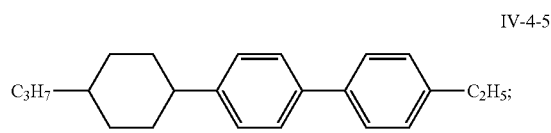

3% of the compound VI-1-8 based on the total weight of the liquid crystal composition

VI-1-8

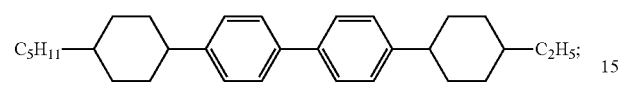

6% of the compound V-1-6 based on the total weight of the liquid crystal composition

V-1-6

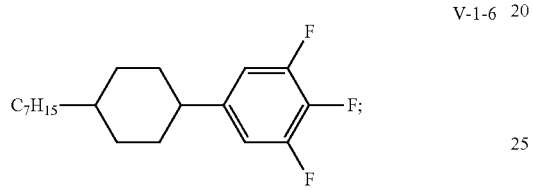

6% of the compound II-1-4 based on the total weight of the liquid crystal composition

II-1-4

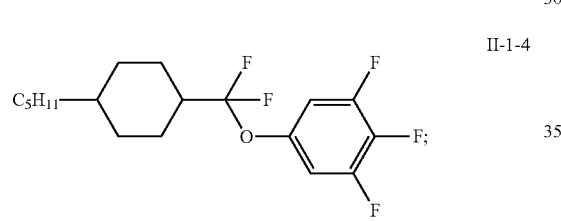

5% of the compound II-3-2 based on the total weight of the liquid crystal composition

II-3-2

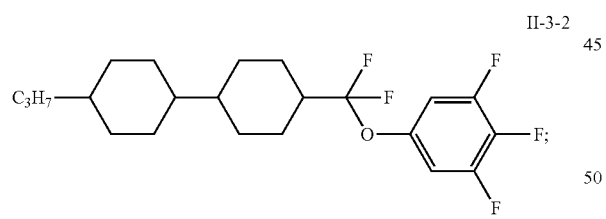

3% of the compound V-3-1 based on the total weight of the liquid crystal composition

V-3-1

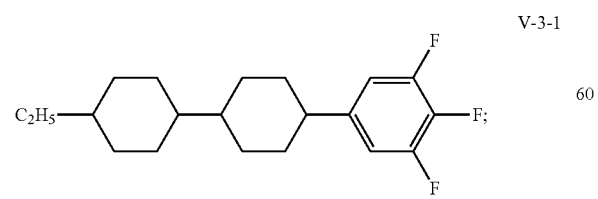

3% of the compound V-3-2 based on the total weight of the liquid crystal composition

V-3-2

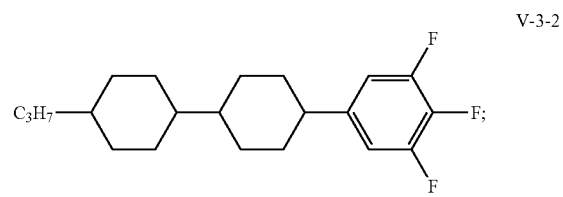

5% of the compound V-5-2 based on the total weight of the liquid crystal composition

V-5-2

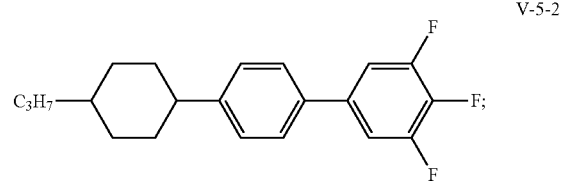

7% of the compound II-8-2 based on the total weight of the liquid crystal composition

II-8-2

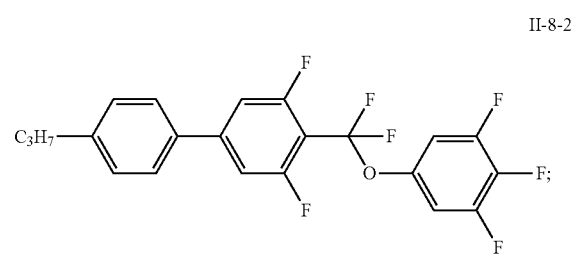

3% of the compound V-7-2 based on the total weight of the liquid crystal composition

V-7-2

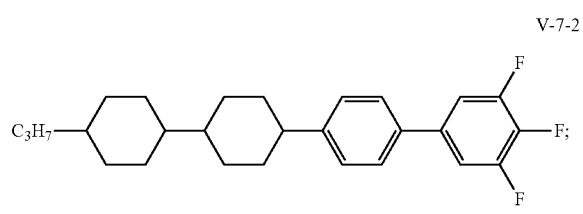

and

3% of the compound V-7-3 based on the total weight of the liquid crystal composition

V-7-3

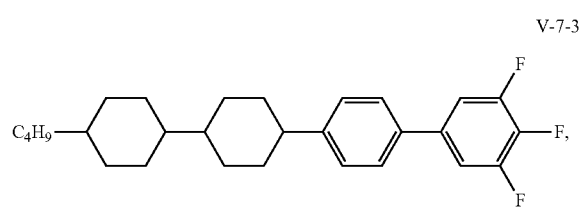

or the liquid crystal composition comprises:

5% of the compound IV-4-5 based on the total weight of the liquid crystal composition

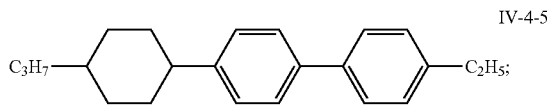

IV-4-5

5% of the compound Ia-2 based on the total weight of the liquid crystal composition

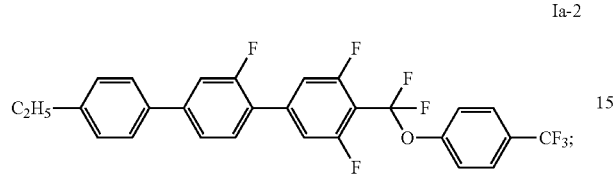

Ia-2

5% of the compound VI-1-4 based on the total weight of the liquid crystal composition

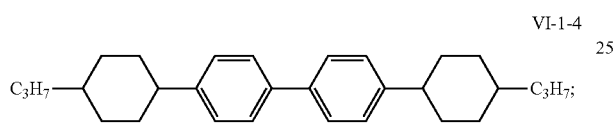

VI-1-4

5% of the compound Ib-3 based on the total weight of the liquid crystal composition

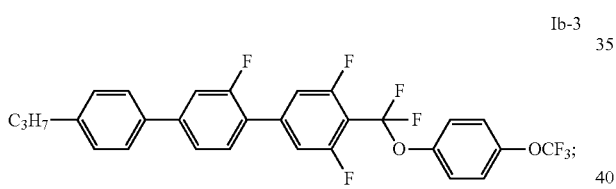

Ib-3

5% of the compound V 0-2 based on the total weight of the liquid crystal composition

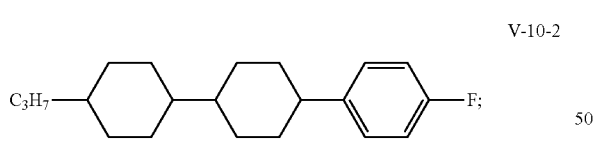

V-10-2

8% of the compound V-3-2 based on the total weight of the liquid crystal composition

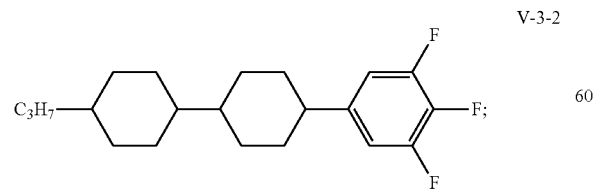

V-3-2

10% of the compound II-3-1 based on the total weight of the liquid crystal composition

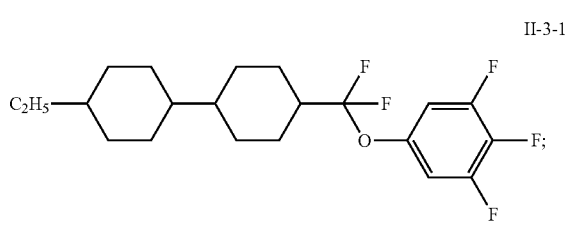

II-3-1

15% of the compound II-3-2 based on the total weight of the liquid crystal composition

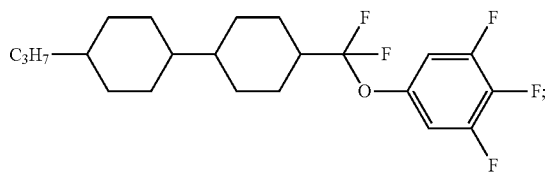

II-3-2

22% of the compound IV-1-12 based on the total weight of the liquid crystal composition

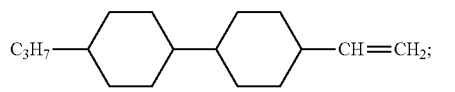

IV-1-12

5% of the compound III-2-2 based on the total weight of the liquid crystal composition

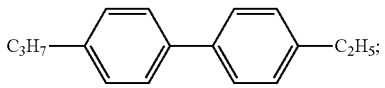

III-2-2

5% of the compound II-8-2 based on the total weight of the liquid crystal composition

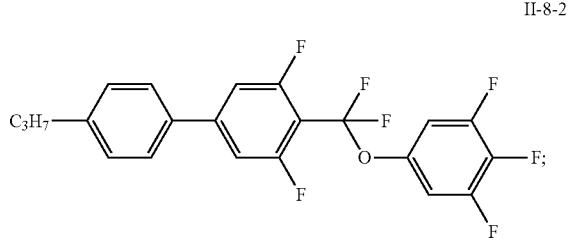

II-8-2

5% of the compound II-8-1 based on the total weight of the liquid crystal composition

II-8-1

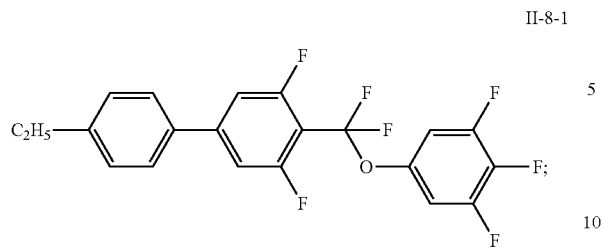

and

5% of the compound II-16-2 based on the total weight of the liquid crystal composition

II-16-2

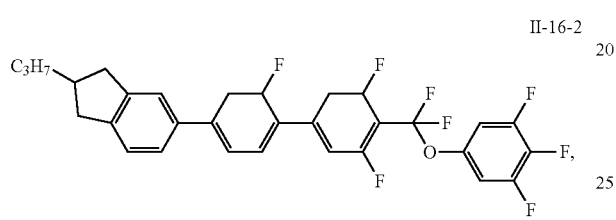

or the liquid crystal composition comprises:

5% of the compound VI-1-4 based on the total weight of the liquid crystal composition

VI-1-4

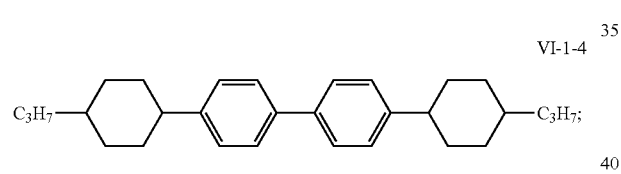

10% of the compound Ia-3 based on the total weight of the liquid crystal composition Ia-3

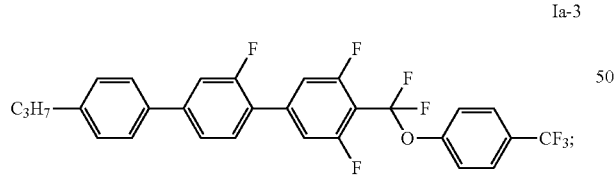

10% of the compound IV-1-4 based on the total weight of the liquid crystal composition

IV-1-4

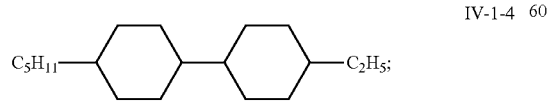

3% of the compound IV-3-8 based on the total weight of the liquid crystal composition

IV-3-8

3% of the compound V-10-3 based on the total weight of the liquid crystal composition

V-10-3

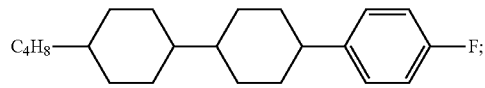

40% of the compound IV-1-12 based on the total weight of the liquid crystal composition

IV-1-12

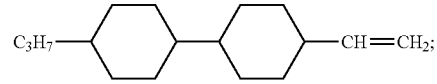

4% of the compound II-8-2 based on the total weight of the liquid crystal composition

II-8-2

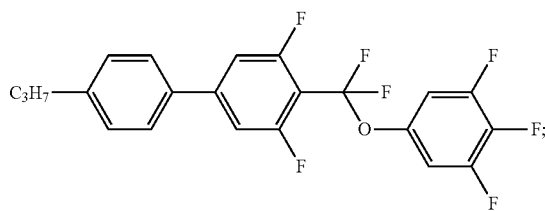

5% of the compound III-4-1 based on the total weight of the liquid crystal composition

III-4-1

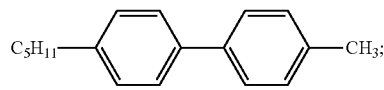

5% of the compound II-14-1 based on the total weight of the liquid crystal composition

II-14-1

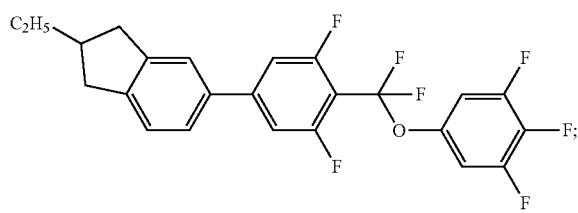

5% of the compound II-14-2 based on the total weight of the liquid crystal composition

II-14-2

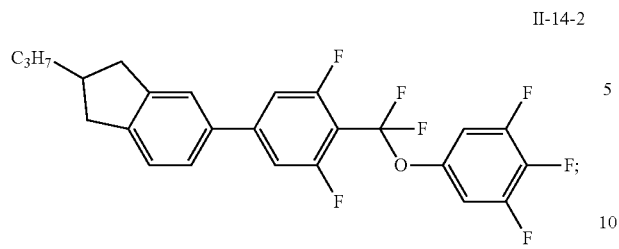

5% of the compound II-9-2 based on the total weight of the liquid crystal composition

II-9-2

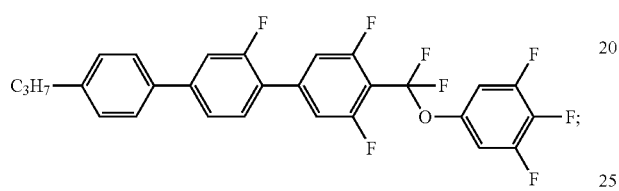

and
5% of the compound II-9-4 based on the total weight of the liquid crystal composition

II-9-4

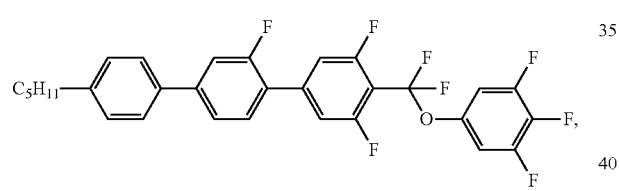

or the liquid crystal composition comprises:
5% of the compound IV-2-5 based on the total weight of the liquid crystal composition

IV-2-5

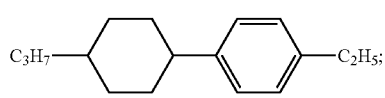

6% of the compound IV-2-18 based on the total weight of the liquid crystal composition

IV-2-18

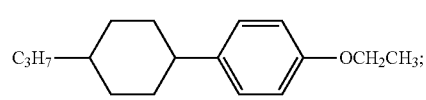

5% of the compound VI-1-3 based on the total weight of the liquid crystal composition

VI-1-3

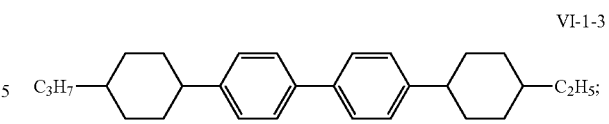

5% of the compound VI-1-4 based on the total weight of the liquid crystal composition

VI-1-4

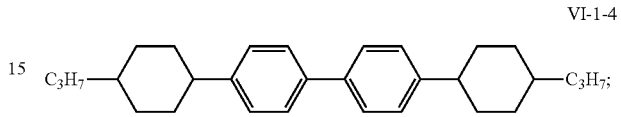

5% of the compound V-10-2 based on the total weight of the liquid crystal composition

V-10-2

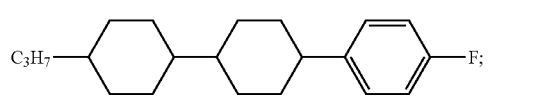

9% of the compound V-3-2 based on the total weight of the liquid crystal composition

V-3-2

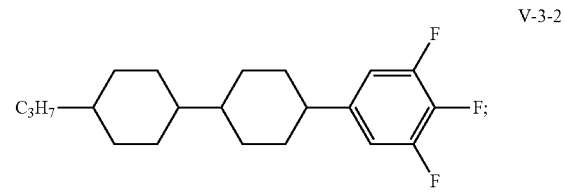

10% of the compound Ib-3 based on the total weight of the liquid crystal composition Ib-3

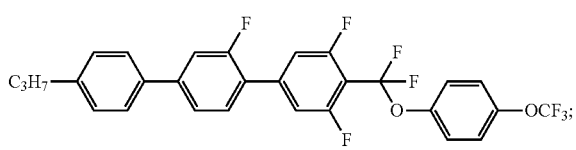

30% of the compound IV-1-12 based on the total weight of the liquid crystal composition

IV-1-12

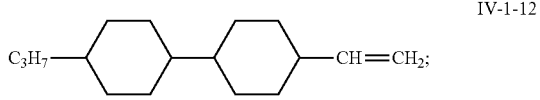

5% of the compound III-2-5 based on the total weight of the liquid crystal composition

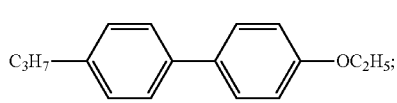
III-2-5

5% of the compound II-8-1 based on the total weight of the liquid crystal composition

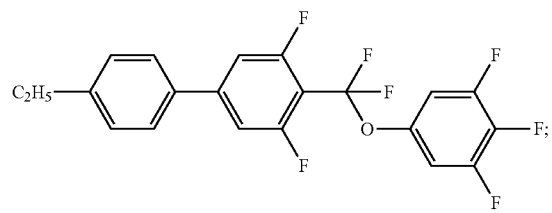
II-8-1

5% of the compound II-14-1 based on the total weight of the liquid crystal composition

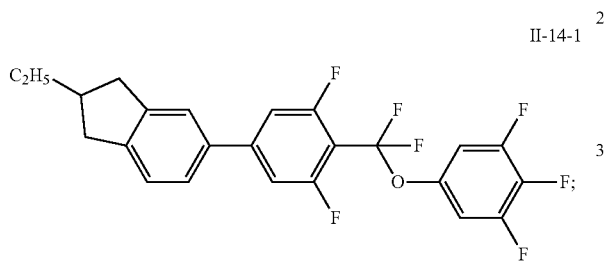
II-14-1

5% of the compound II-14-2 based on the total weight of the liquid crystal composition

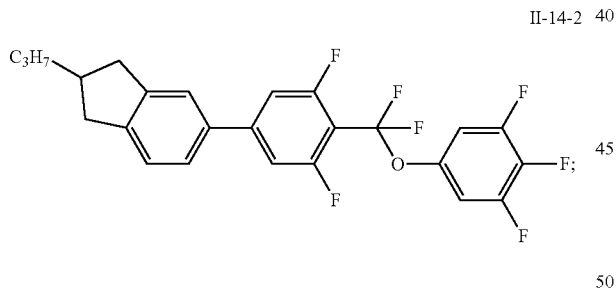
II-14-2 and
5% of the compound II-9-2 based on the total weight of the liquid crystal composition

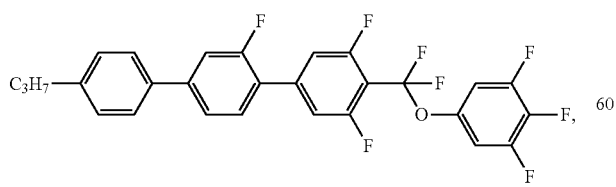
II-9-2 or the liquid crystal composition comprises:
2% of the compound Ia-4 based on the total weight of the liquid crystal composition

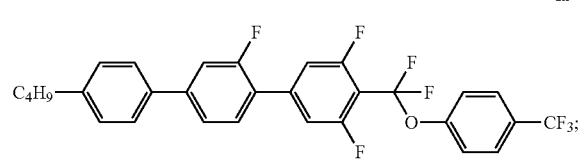
Ia-4

8% of the compound V-4-2 based on the total weight of the liquid crystal composition

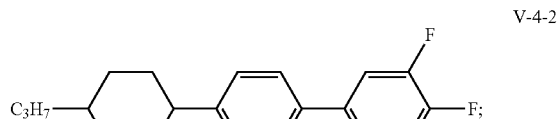
V-4-2

13% of the compound Ib-5 based on the total weight of the liquid crystal composition

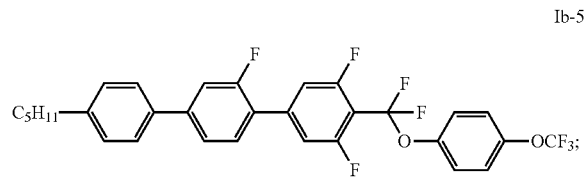
Ib-5

10% of the compound IV-1-6 based on the total weight of the liquid crystal composition

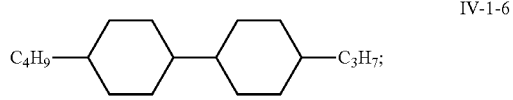
IV-1-6

42% of the compound IV-1-12 based on the total weight of the liquid crystal composition

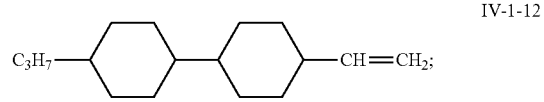
IV-1-12

5% of the compound V-3-2 based on the total weight of the liquid crystal composition

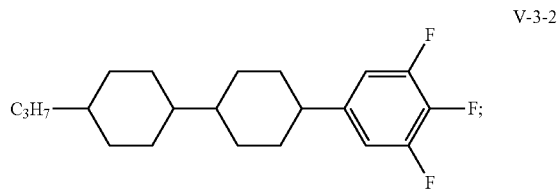
V-3-2

5% of the compound II-14-2 based on the total weight of the liquid crystal composition

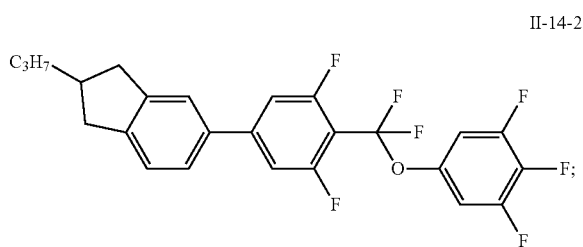
II-14-2

5% of the compound III-2-5 based on the total weight of the liquid crystal composition

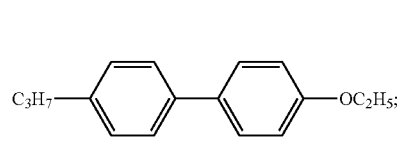
III-2-5

5% of the compound III-4-1 based on the total weight of the liquid crystal composition

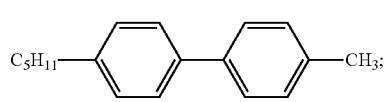
III-4-1 and
5% of the compound II-9-4 based on the total weight of the liquid crystal composition

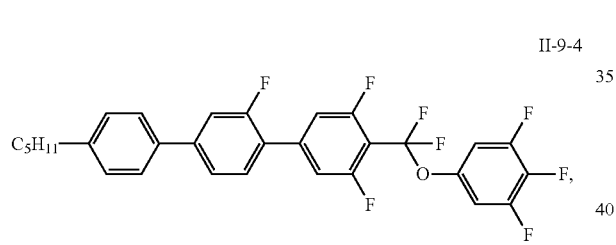
II-9-4 or the liquid crystal composition comprises:
10% of the compound IV-2-18 based on the total weight of the liquid crystal composition

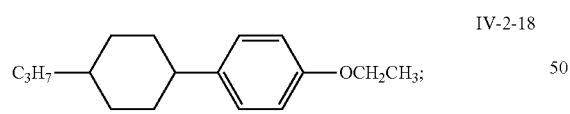
IV-2-18

2% of the compound Ib-4 based on the total weight of the liquid crystal composition

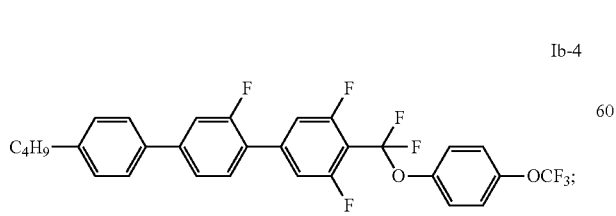
Ib-4

8% of the compound V-4-2 based on the total weight of the liquid crystal composition

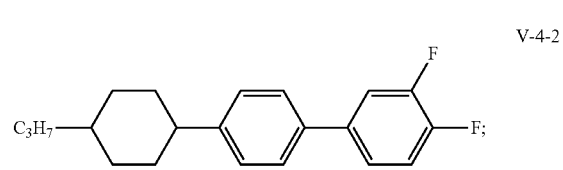
V-4-2

13% of the compound Ia-3 based on the total weight of the liquid crystal composition

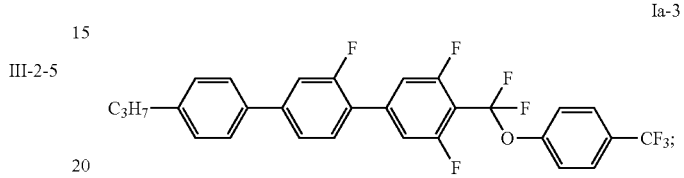
Ia-3

15% of the compound IV-1-2 based on the total weight of the liquid crystal composition

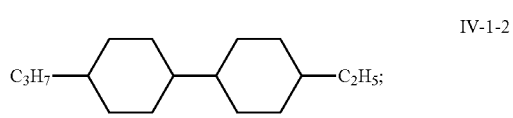
IV-1-2

10% of the compound IV-1-4 based on the total weight of the liquid crystal composition

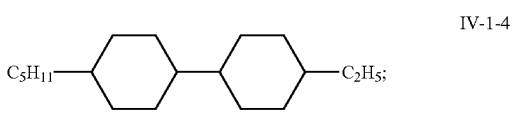
IV-1-4

12% of the compound IV-1-12 based on the total weight of the liquid crystal composition

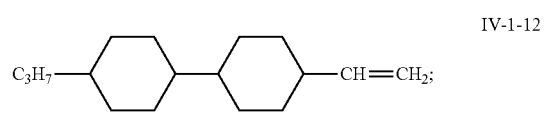
IV-1-12

5% of the compound III-3-6 based on the total weight of the liquid crystal composition

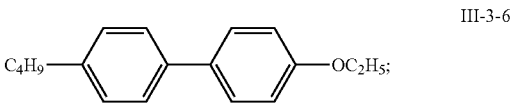
III-3-6

5% of the compound II-8-2 based on the total weight of the liquid crystal composition 5% of the compound II-14-2 based on the total weight of the liquid crystal composition

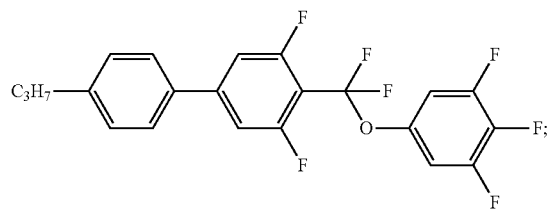

II-8-2

10% of the compound II-9-2 based on the total weight of the liquid crystal composition

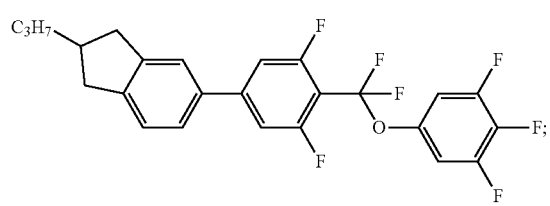

II-14-2 and
5% of the compound II-9-4 based on the total weight of the liquid crystal composition

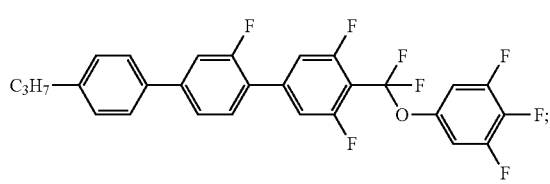

II-9-2 or the liquid crystal composition comprises:
5% of the compound Ia-2 based on the total weight of the liquid crystal composition

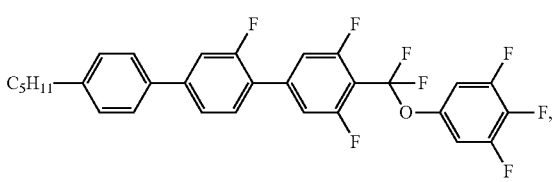

II-9-4

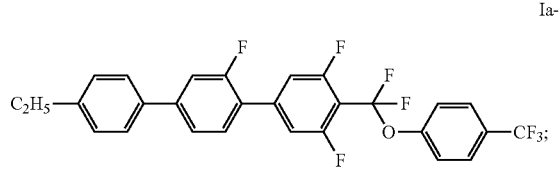

Ia-2

5% of the compound VI-1-4 based on the total weight of the liquid crystal composition

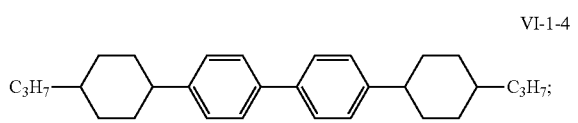

VI-1-4

5% of the compound Ib-3 based on the total weight of the liquid crystal composition

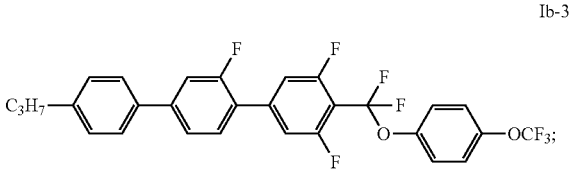

Ib-3

5% of the compound V-10-2 based on the total weight of the liquid crystal composition

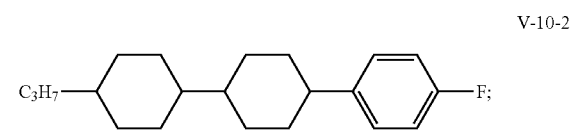

V-10-2

10% of the compound V-3-2 based on the total weight of the liquid crystal composition

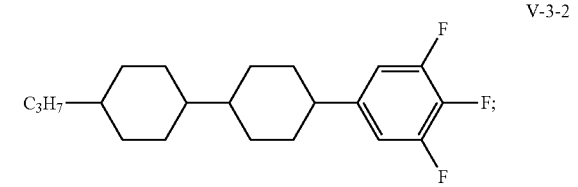

V-3-2

10% of the compound IV-1-2 based on the total weight of the liquid crystal composition

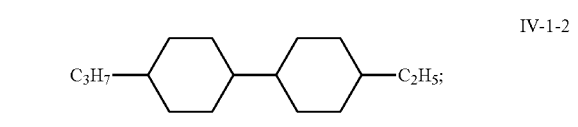

IV-1-2

5% of the compound 3 based on the total weight of the liquid crystal composition

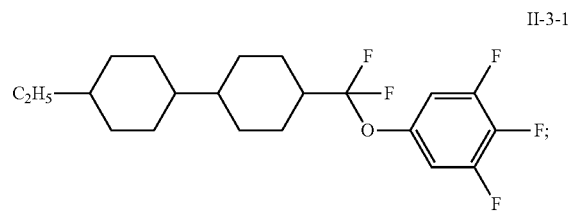

II-3-1

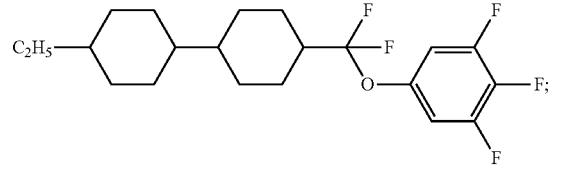

5% of the compound II-3-2 based on the total weight of the liquid crystal composition

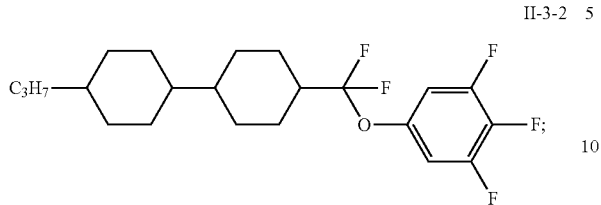
II-3-2

25% of the compound IV-1-12 based on the total weight of the liquid crystal composition

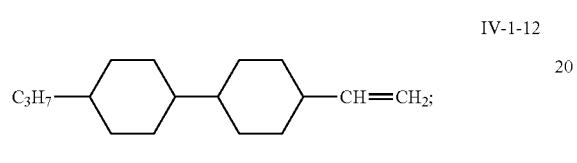
IV-1-12

10% of the compound III-4-6 based on the total weight of the liquid crystal composition

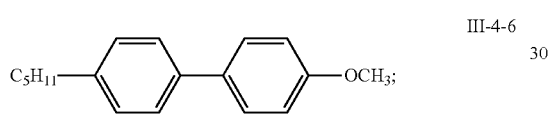
III-4-6

5% of the compound II-8-2 based on the total weight of the liquid crystal composition

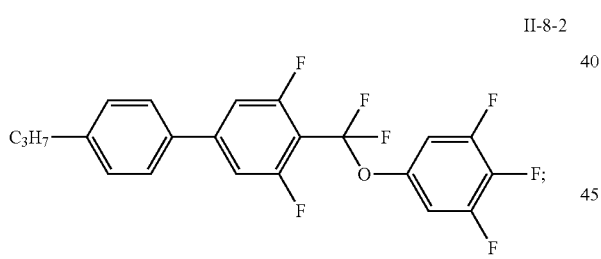
II-8-2

5% of the compound II-8-1 based on the total weight of the liquid crystal composition

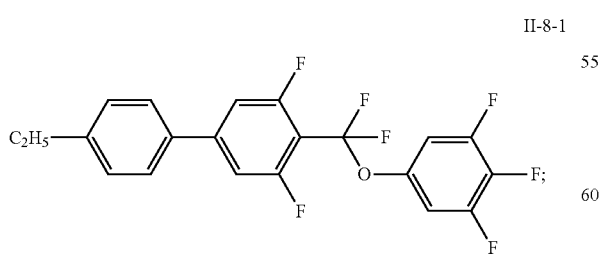
II-8-1 and

5% of the compound II-16-2 based on the total weight of the liquid crystal composition

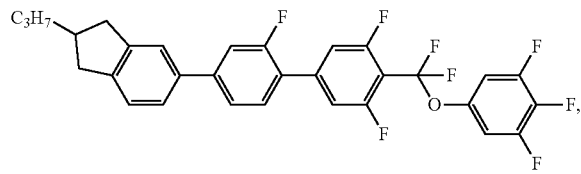
II-16-2 or the liquid crystal composition comprises:

8% of the compound Ib-2 based on the total weight of the liquid crystal composition

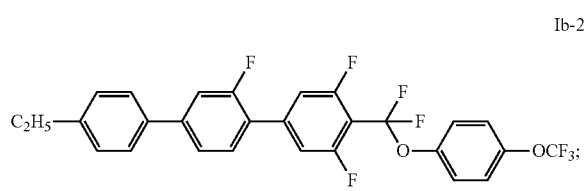
Ib-2

5% of the compound Ib-3 based on the total weight of the liquid crystal composition

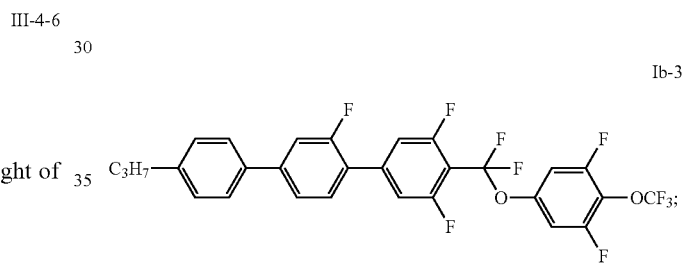
Ib-3

4% of the compound Ib-4 based on the total weight of the liquid crystal composition

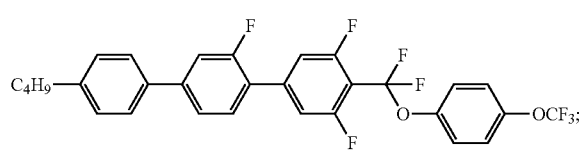
Ib-4

5% of the compound Ib-5 based on the total weight of the liquid crystal composition

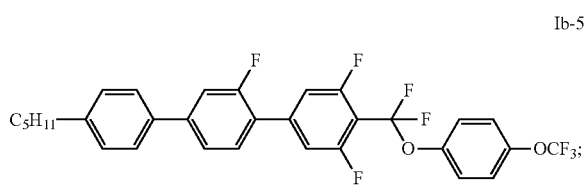
Ib-5

36% of the compound IV-1-12 based on the total weight of the liquid crystal composition

IV-1-12

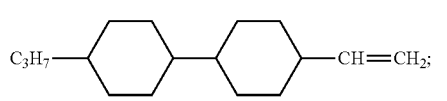

3% of the compound IV-3-1 based on the total weight of the liquid crystal composition

IV-3-1

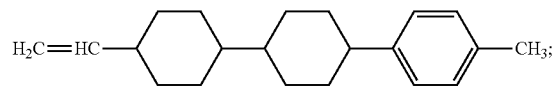

4% of the compound IV-3-11 based on the total weight of the liquid crystal composition

IV-3-11

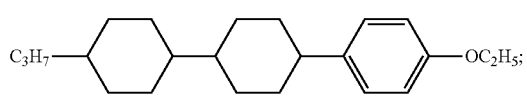

4% of the compound III-4-1 based on the total weight of the liquid crystal composition

III-4-1

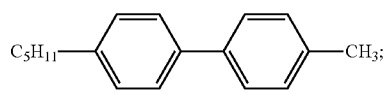

3% of the compound V-12-1 based on the total weight of the liquid crystal composition

V-12-1

3% of the compound V-2-4 based on the total weight of the liquid crystal composition

V-2-4

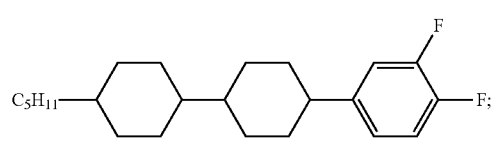

4% of the compound V-5-2 based on the total weight of the liquid crystal composition

V-5-2

4% of the compound V-6-1 based on the total weight of the liquid crystal composition

V-6-1

7% of the compound II-8-1 based on the total weight of the liquid crystal composition

II-8-1 and
10% of the compound II-8-2 based on the total weight of the liquid crystal composition

II-8-2 or the liquid crystal composition comprises:
8% of the compound Ia-2 based on the total weight of the liquid crystal composition Ia-2

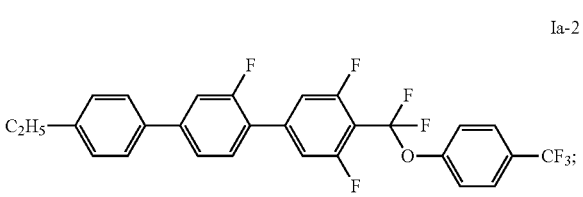

5% of the compound Ia-3 based on the total weight of the liquid crystal composition

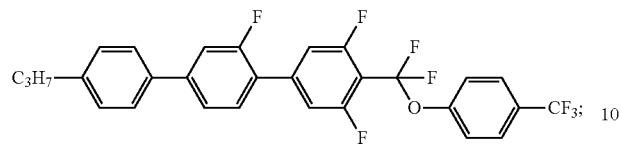
Ia-3

4% of the compound Ia-4 based on the total weight of the liquid crystal composition

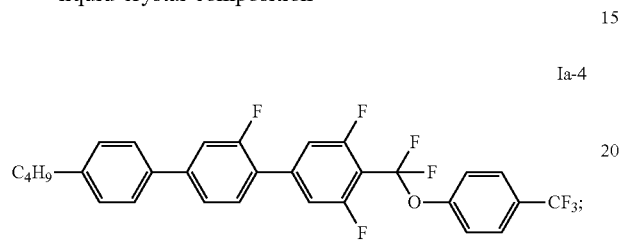
Ia-4

5% of the compound Ia-5 based on the total weight of the liquid crystal composition

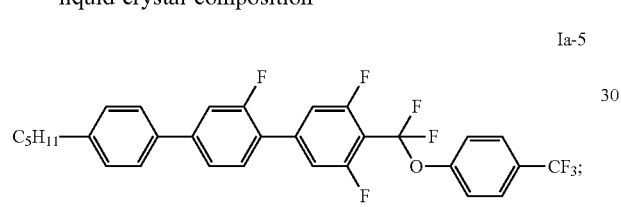
Ia-5

44% of the compound IV-1-12 based on the total weight of the liquid crystal composition

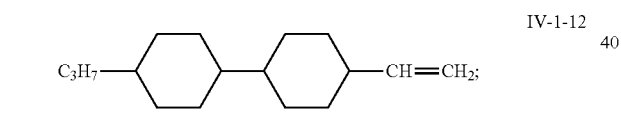
IV-1-12

4% of the compound IV-3-11 based on the total weight of the liquid crystal composition

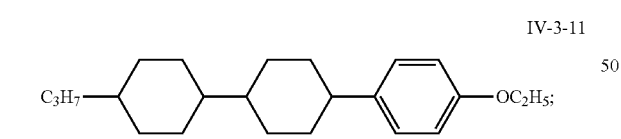
IV-3-11

3% of the compound VI-3-6 based on the total weight of the liquid crystal composition

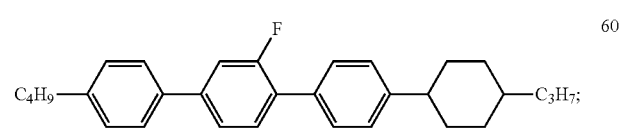
VI-3-6

6% of the compound III-4-7 based on the total weight of the liquid crystal composition

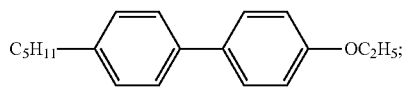
III-4-7

4% of the compound V-9-2 based on the total weight of the liquid crystal composition

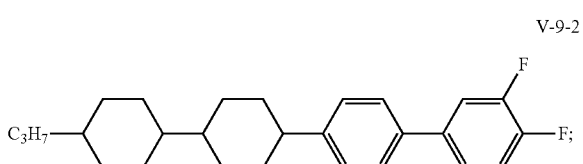
V-9-2

3% of the compound V-7-3 based on the total weight of the liquid crystal composition

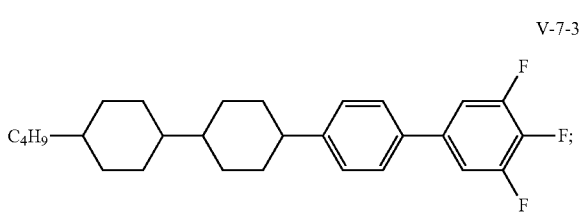
V-7-3

4% of the compound V-8-2 based on the total weight of the liquid crystal composition

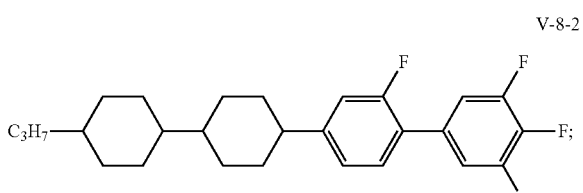
V-8-2

5% of the compound II-8-1 based on the total weight of the liquid crystal composition

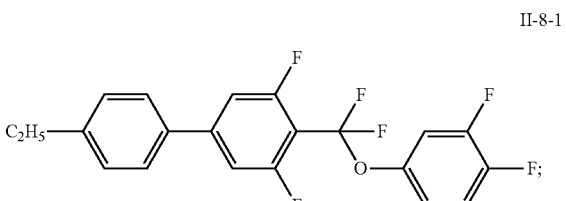
II-8-1 and

5% of the compound II-8-2 based on the total weight of the liquid crystal composition

II-8-2

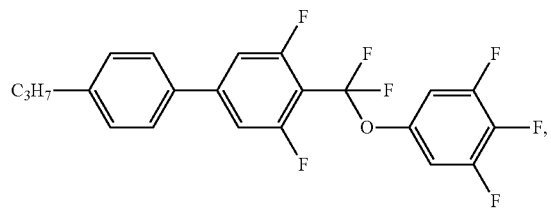

or the liquid crystal composition comprises:
7% of the compound Ib-2 based on the total weight of the liquid crystal composition Ib-2

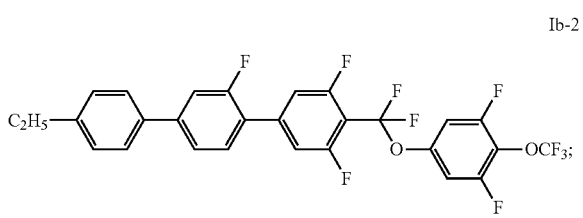 [SMILES: CCc1ccc(-c2ccc(-c3cc(F)c(C(F)(F)Oc4cc(F)c(OC(F)(F)F)c(F)c4)c(F)c3)c(F)c2)cc1]

8% of the compound Ib-3 based on the total weight of the liquid crystal composition Ib-3

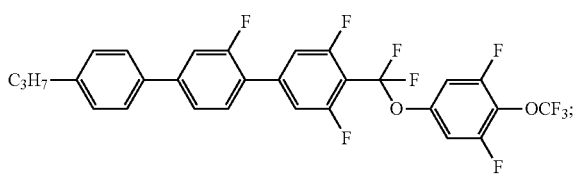

7% of the compound Ia-2 based on the total weight of the liquid crystal composition Ia-2

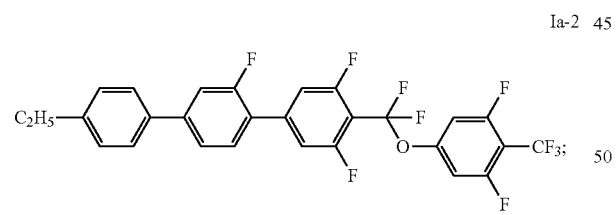

8% of the compound Ia-3 based on the total weight of the liquid crystal composition Ia-3

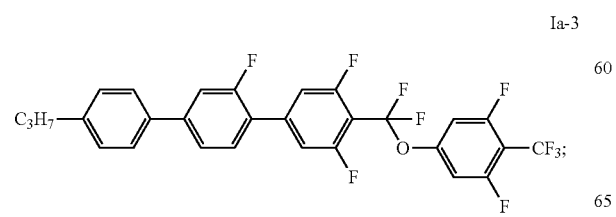

2% of the compound II-11-1 based on the total weight of the liquid crystal composition

II-11-1

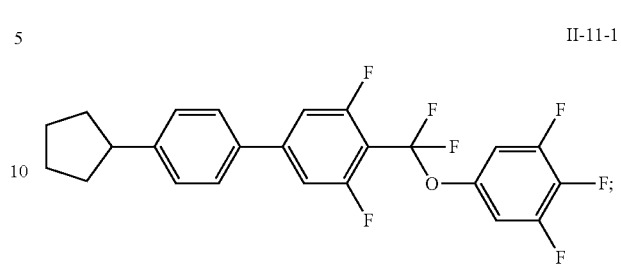

3% of the compound II-13-1 based on the total weight of the liquid crystal composition

II-13-1

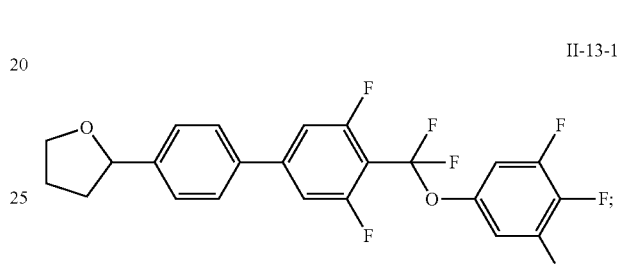

3% of the compound II-10-1 based on the total weight of the liquid crystal composition

II-10-1

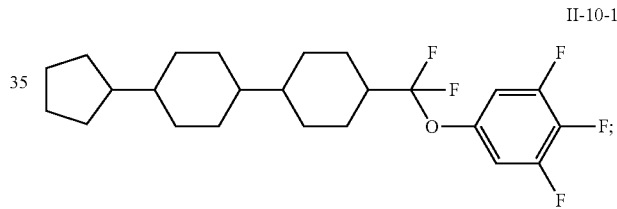

3% of the compound II-4-2 based on the total weight of the liquid crystal composition

II-4-2

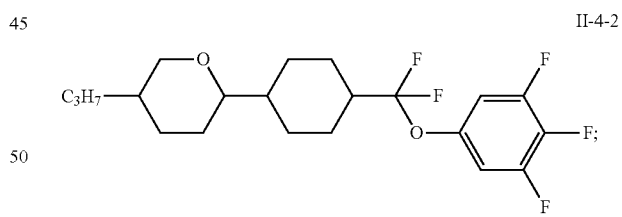

4% of the compound II-5-2 based on the total weight of the liquid crystal composition

II-5-2

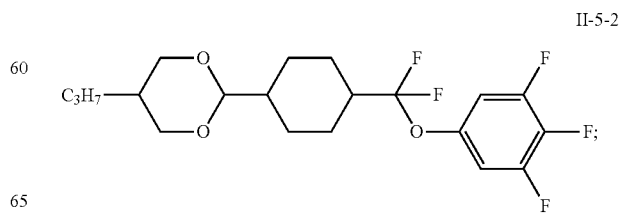

2% of the compound II-6-3 based on the total weight of the liquid crystal composition

II-6-3

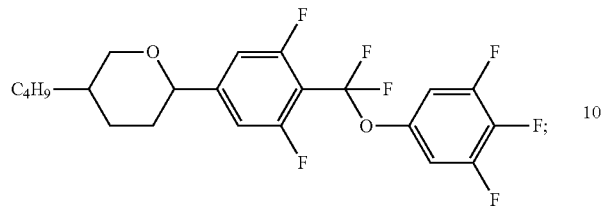

3% of the compound II-7-1 based on the total weight of the liquid crystal composition

II-7-1

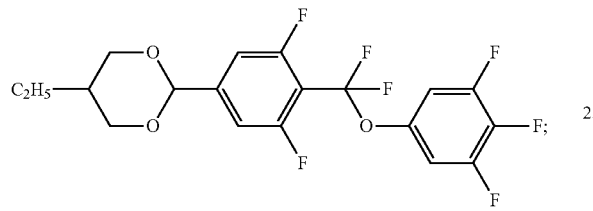

5% of the compound V-3-1 based on the total weight of the liquid crystal composition

IV-3-1

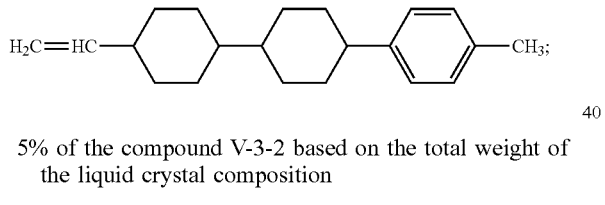

5% of the compound V-3-2 based on the total weight of the liquid crystal composition

V-3-2

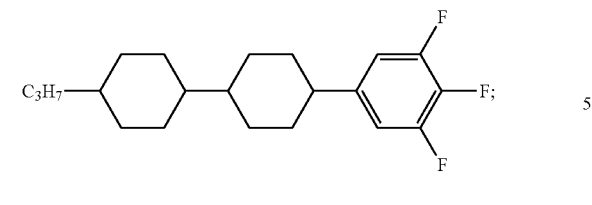

10% of the compound III-4-1 based on the total weight of the liquid crystal composition

III-4-1

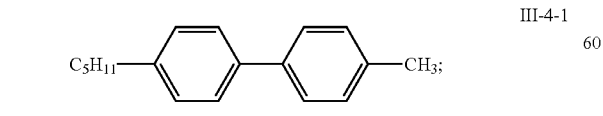

and

30% of the compound IV-1-12 based on the total weight of the liquid crystal composition

IV-1-12

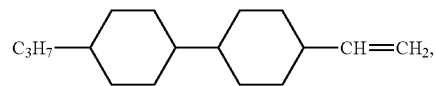

or the liquid crystal composition comprises:

8% of the compound Ia-2 based on the total weight of the liquid crystal composition Ia-2

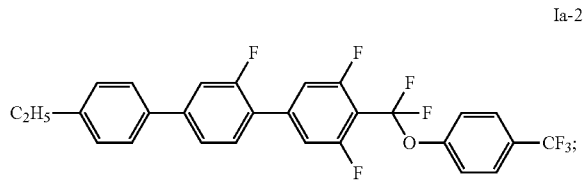

5% of the compound Ia-3 based on the total weight of the liquid crystal composition Ia-3

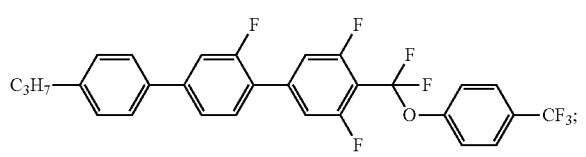

4% of the compound Ia-4 based on the total weight of the liquid crystal composition Ia-4

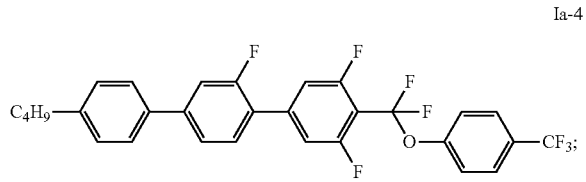

5% of the compound Ia-5 based on the total weight of the liquid crystal composition Ia-5

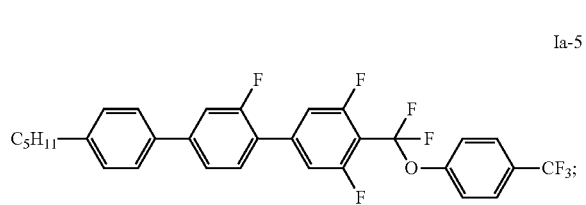

44% of the compound IV-1-12 based on the total weight of the liquid crystal composition

IV-1-12

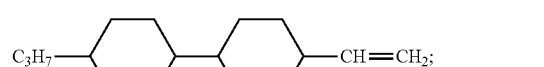

4% of the compound IV-3-11 based on the total weight of the liquid crystal composition

IV-3-11

3% of the compound VI-3-6 based on the total weight of the liquid crystal composition

VI-3-6

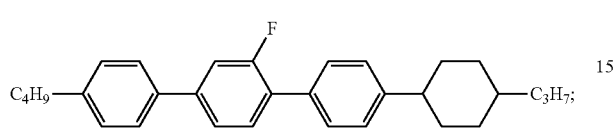

6% of the compound III-4-7 based on the total weight of the liquid crystal composition

III-4-7

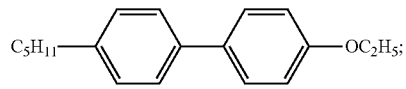

4% of the compound V-9-2 based on the total weight of the liquid crystal composition

V-9-2

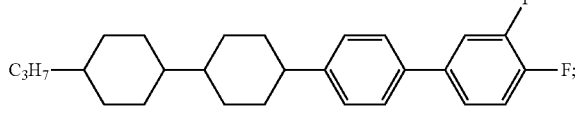

3% of the compound V-16-3 based on the total weight of the liquid crystal composition

V-16-3

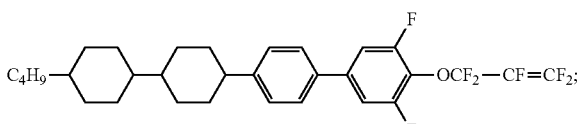

4% of the compound V-17-2 based on the total weight of the liquid crystal composition

V-17-2

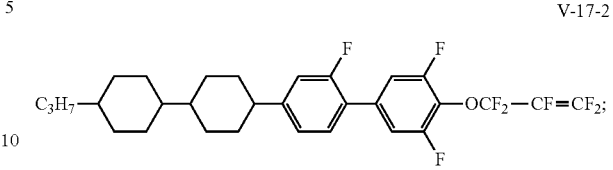

5% of the compound II-8-1 based on the total weight of the liquid crystal composition

II-8-1

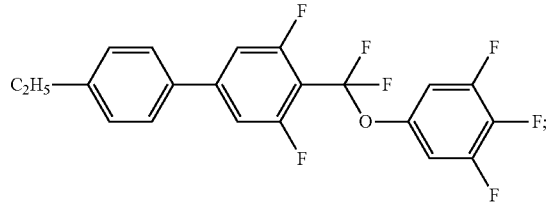

and

5% of the compound II-8-2 based on the total weight of the liquid crystal composition

II-8-2

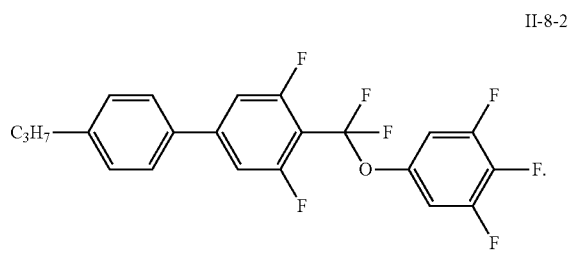

18. A liquid crystal display element, comprising the liquid crystal composition of claim 12.

19. A liquid crystal display element, comprising the liquid crystal composition of claim 15.

20. A liquid crystal display element, comprising the liquid crystal composition of claim 17.

* * * * *